United States Patent
Rosenberg

(10) Patent No.: US 11,351,680 B1
(45) Date of Patent: Jun. 7, 2022

(54) SYSTEMS AND METHODS FOR ENHANCING ROBOT/HUMAN COOPERATION AND SHARED RESPONSIBILITY

(71) Applicant: Knowledge Initiatives LLC, The Sea Ranch, CA (US)

(72) Inventor: Barr Rosenberg, The Sea Ranch, CA (US)

(73) Assignee: KNOWLEDGE INITIATIVES LLC, The Sea Ranch, CA (US)

( * ) Notice: Subject to any disclaimer, the term of this patent is extended or adjusted under 35 U.S.C. 154(b) by 0 days.

(21) Appl. No.: 16/916,232

(22) Filed: Jun. 30, 2020

Related U.S. Application Data

(63) Continuation-in-part of application No. 16/394,281, filed on Apr. 25, 2019, now abandoned, which is a continuation of application No. 15/909,869, filed on Mar. 1, 2018, now Pat. No. 10,335,962.

(60) Provisional application No. 62/869,492, filed on Jul. 1, 2019, provisional application No. 62/465,640, filed on Mar. 1, 2017.

(51) Int. Cl.
*B25J 19/00* (2006.01)
*B25J 9/16* (2006.01)

(52) U.S. Cl.
CPC ......... *B25J 19/0095* (2013.01); *B25J 9/1674* (2013.01); *Y10S 901/46* (2013.01)

(58) Field of Classification Search
CPC ..... B25J 19/0095; B25J 9/1674; Y10S 901/46
See application file for complete search history.

(56) References Cited

U.S. PATENT DOCUMENTS

| | | |
|---|---|---|
| 5,495,410 A | 2/1996 | Graf |
| 9,050,723 B1 | 6/2015 | Elazary et al. |
| 10,335,962 B1 | 7/2019 | Rosenberg |
| 2009/0132085 A1* | 5/2009 | Sjostrand ........... G05B 19/4063 901/50 |

(Continued)

OTHER PUBLICATIONS

Co-pending U.S. Appl. No. 16/394,281, filed Apr. 25, 2019.

(Continued)

*Primary Examiner* — Manuel A Rivera Vargas
(74) *Attorney, Agent, or Firm* — Wilson Sonsini Goodrich & Rosati

(57) ABSTRACT

Methods, systems, and apparatus, including computer programs encoded on a computer storage medium, employed within a robotics system. In one aspect, a robotics system includes an interface; an output; a processor; and a computer-readable storage device coupled to the processor and having instructions stored thereon which, when executed by the processor, cause processor to perform operations comprising: providing, through the interface, a simulation of the robotics system described by a Ubiquitous Simulation Model (USM) and depicted within a simulated environment; receiving a command through the interface; determining an applicable module configured to operate skills and knowledge for the command based on the USM and the simulated environment; processing the command with the module and the USM to determine an appropriate action, wherein the action is determined based on a coherent mode of conduct and self-presentation modeled for the robotics system; and performing the action with the output.

29 Claims, 16 Drawing Sheets

(56) References Cited

U.S. PATENT DOCUMENTS

| | | | |
|---|---|---|---|
| 2009/0210220 A1* | 8/2009 | Mitsuyoshi | G10L 25/90 704/207 |
| 2013/0073387 A1* | 3/2013 | Heath | G06Q 30/02 705/14.53 |
| 2018/0169864 A1 | 6/2018 | Haddadin | |

OTHER PUBLICATIONS

U.S. Appl. No. 15/909,969 Notice of Allowance dated May 15, 2019.
U.S. Appl. No. 15/909,869 Notice of Allowance dated Feb. 5, 2019.
U.S. Appl. No. 15/909,869 Office Action dated Jul. 30, 2018.
U.S. Appl. No. 16/394,281 Office Action dated Feb. 24, 2020.

* cited by examiner

SYSTEMS AND METHODS FOR ENHANCING ROBOT/HUMAN COOPERATION AND SHARED RESPONSIBILITY

CROSS-REFERENCE

This application claims the benefit of U.S. Provisional Patent Application No. 62/896,492, filed Jul. 1, 2019, and is a continuation-in-part of U.S. application Ser. No. 16/394,281, filed Apr. 25, 2019, which is a continuation of U.S. application Ser. No. 15/909,869, filed Mar. 1, 2018, now U.S. Pat. No. 10,335,962, which claims the benefit of U.S. Provisional Application No. 62/465,640, filed Mar. 1, 2017, each of which is entirely incorporated herein by reference.

BACKGROUND

It is desirable for a robot to communicate effectively with humans. To do so, a robot needs to, for example, learn from humans, understand their wishes, receive their guidance, explain to them what it is doing and for what purpose, and discuss the process with them along the way. To perform satisfactorily, a robot may earn the trust of the humans it serves and learn from them quickly and reliably. For example, a robot needs to find a way to interpret ambiguous phrases correctly and to know when and how to ask for further clarification and guidance. All this is imperative for a general purpose, mobile robot that is active in the mainstream of our human culture. As an example of the need for effect communication and cooperation between humans and robots, the area of joint undertakings, in which responsibility is shared by the robot and humans and the robot relies on simulation modeling of both of their roles and their common tasks, is defined by purpose and by necessity. This form of cooperation might apply, for example, between the pilot of an aircraft and a robotic system overseeing the autopilot. The intention is strong in the sense that there is a parallel understanding between the person and the robot in terms of what they are doing. Although the robot and human may have different points of view, they have a common understanding of the fundamental purpose of the undertaking. For example, from the robot's perspective, this means an assimilation that includes what the human and robot are doing, what the result will be, and why the result is important. Moreover, within a joint undertaking, a robot and human may have independent postures, but each of them can also understand and potentially perform the other's role. In this sense, because each one can stand in for the other in, for example, an emergency, the roles for each are less clear. They may have different knowledge bases, but they can also share their knowledge with each other through the established channels of effective communication and cooperation.

SUMMARY

Recognized herein is a need to establish and maintain effective communication channels between robots and humans. Systems and related methods described herein may include a combination of sensor systems and interfaces that can be applicable to one or more robotic systems and apparatus and employed to facilitate communication with humans and to implement effects determined based on the established communication.

The systems and related methods described herein provide numerous benefits for robot operations and operators of robots. The methods may be applicable to various types of robot and robotic systems, regardless of their design. For example, the fault detection and diagnostic exercises disclosed herein may aid in fault detection and diagnosis for a variety of types of robots and various aspects of robotic machines. The systems and methods may also be applicable to a plurality of robots. Furthermore, the methods described herein enable continued operations of robots with faulty components in some conditions. For example, the system enables adjustments to commands, parameters, and various operations of the robot in order for it to continue operating and continue to monitor its condition while one or more components of the robot are faulty.

The systems and related methods described herein may also provide additional benefits to the user. For example, the systems and methods can reliably monitor the physical and operating integrity of a complex and multi-functional robot, allowing the robot to operate in circumstances where any undetected or undiagnosed fault might otherwise endanger its mission and potentially lead to harm to the robot and the users. Additionally, the disclosed methods may enable characterization of fault across multiple types of robots through various fault detection and diagnosis exercises, which may or may not be specific to a single type of robot. The disclosed methods may promptly detect faults as soon as they show up in operations and preventively detect faults and minor flaws before they manifest in operations. Fault diagnostic capabilities that help to determine fault causation and make temporary compensating adjustments may increase maintenance efficiency. Improved reliability due to fault detection and diagnosis may extend the range of capabilities and missions that robotic systems can attain.

In one aspect, disclosed herein are robotics systems that include: an interface; one or more processors; and a computer-readable storage device coupled to the one or more processors and having instructions stored thereon which, when executed by the one or more processors, cause the one or more processors to perform operations. The operations include providing, through the interface, a simulation of the robotics system described by a Ubiquitous Simulation Model (USM) and depicted within a simulated environment; receiving a command through the interface; determining an applicable module configured to operate skills and knowledge for the command based on the USM and the simulated environment; processing the command with the module and the USM to determine an appropriate effect, wherein the effect is determined based on a coherent mode of conduct and self-presentation modeled for the robotics system; and implementing the effect. In some embodiments, the module is developed based on a model simulating joint projects and conducting the joint projects in a collaborative setting that involves roles played by humans and the robotics system. In some embodiments, the model simulating joint projects comprises delineation of emergency circumstances where ordinary roles are overridden. In some embodiments, the simulation of the robotics system describes physical components and a structured assembly of the robotics system and calculates interactions among the physical components and the structured assembly of the robotics system. In some embodiments, the robotics systems include a structural system, a sensory system, an internal communication system, and an information processing system. In some embodiments, the USM models the structural system, the sensory system, the internal communication system, and the information processing system and provides detailed status and dynamic changing status for the robotics system. In some embodiments, the operations include: receiving descriptions of the physical components and the structured assembly of the robotics system; and updating the USM based on the received descriptions when at least one prediction dynamically generated by the USM is inaccurate. In some embodiments, the operations include: receiving descriptions of capabilities of the robot system and an external environment where the robotics system is functioning; and updating the USM based on the descriptions of the capabilities and the external environment when at least one prediction dynamically generated by the USM is inaccurate. In some embodiments, the simulated environment is an approximation of the external environment. In some embodiments, the simulation of the robotics system highlights discrepancies between aspects of the external environment and the simulated environment. In some embodiments, the discrepancies are updated in real-time or at a successive interval. In some embodiments, the command comprises a sequence of commands. In some embodiments, the operations include: evaluating External Recognition, Description, and Simulation (XRDS) performance based on a result of implementing the effect. In some embodiments, the robotics systems include an output. In some embodiments, the effect is effectuated by performing an action with an output. In some embodiments, the output comprises a motor, a servo, an engine, a device that emits sound waves, or a device that emits electromagnetic radiation. In some embodiments, the interface comprises a display, a device that receives sound waves, or a device that receives electromagnetic radiation. In some embodiments, the command is received in natural language. In some embodiments, the operations include: receiving, through the interface and after implementing the effect, a corrective command; and updating the USM based on the corrective command. In some embodiments, the simulation of the robotics system interweaves simulations of assemblies that include both simulated designs of some components of the robotics system not yet fabricated and simulations of actual performance of other fabricated components of the robotic system. In some embodiments, during a diagnosis process, the simulation of the robotics system compares actual movements of the robotics system with movements dictated by an operations control, and the operations control simultaneously determines simulated signals to be provided through the display as correct movements. In some embodiments, the robotics systems include: a sensor system. In some embodiments, the operations include: receiving sensor data from the sensory system; comparing the simulation of the robotics system described by a USM with the sensor data; and updating the USM based on the comparison. In some embodiments, the simulated environment comprises a three-dimensional (3D) virtual representation. In some embodiments, the operations include: performing a comprehensive diagnosis with an Active Validating Knowledge Base (AVKB) and an active learning tool Replay with Learning (RwL). In some embodiments, the AVKB includes information from a Robot Ecosystem for Security, Support and Integrity (RESSI) including expectations and requirements for the robot system and a library of behaviors that RESSI requires from the robotic system. In some embodiments, the command comprises a suggested modification to a plan or a new approach in sequential detail to restructure the plan. In some embodiments, the module provides coordinated resources on a specialized procedure or topic that includes Conceptual Mappings (CMp). In some embodiments, the CMp comprises factual context, mistakes to avoid, and resources for learning, such as layouts of common subjects of dialogue between the robotic system and human with suggestions for communications, knowhow about performing tasks in this area, acquiring resources, researching special topics, or proposed formats and visual display materials. In some embodiments, the operations include: providing, through the interface, a tier that corresponds to a detected problem that has given rise to a fault. In some embodiments, the interface comprises a Virtual Robot Environment (VRE) that depicts activities within the simulated environment.

In another aspect, disclosed herein are computer-implemented methods for implementing an effect with a robotic system based on a command. The methods include: providing, through an interface of a robotics system, a simulation of the robotics system described by a USM and depicted within a simulated environment; receiving a command through the interface; determining an applicable module configured to operate skills and knowledge for the command based on the USM and the simulated environment; processing the command with the module and the USM to determine an appropriate effect, wherein the effect is determined based on a coherent mode of conduct and self-presentation modeled for the robotics system; and implementing the effect with the robotic system. In some embodiments, the module is developed based on a model simulating joint projects and conducting the joint projects in a collaborative setting that involves roles played by humans and the robotics system. In some embodiments, the model simulating joint projects comprises delineation of emergency circumstances where ordinary roles are overridden. In some embodiments, the simulation of the robotics system describes physical components and a structured assembly of the robotics system and calculates interactions among the physical components and the structured assembly of the robotics system. In some embodiments, the USM models a structural system, a sensory system, an internal communication system, and an information processing system and provides detailed status and dynamic changing status for the robotics system. In some embodiments, the methods include: receiving descriptions of the physical components and the structured assembly of the robotics system; and updating the USM based on the received descriptions when at least one prediction dynamically generated by the USM is inaccurate. In some embodiments, the methods include: receiving descriptions of capabilities of the robot system and an external environment where the robotics system is functioning; and updating the USM based on the descriptions of the capabilities and the external environment when at least one prediction dynamically generated by the USM is inaccurate. In some embodiments, the simulated environment is an approximation of the external environment. In some embodiments, the simulation of the robotics system highlights discrepancies between aspects of the external environment and the simulated environment. In some embodiments, the discrepancies are updated in real-time or at a successive interval. In some embodiments, the command comprises a sequence of commands. In some embodiments, the methods include: evaluating XRDS performance based on a result of implementing the effect. In some embodiments, the effect is effectuated by performing an action with an output. In some embodiments, the output comprises a motor, a servo, an engine, a device that emits sound waves, or a device that emits electromagnetic radiation. In some embodiments, the interface comprises a display, a device that receives sound waves, or a device that receives electromagnetic radiation. In some embodiments, the command is received in natural language. In some embodiments, the methods include: receiving, through the interface and after implementing the effect, a corrective command; and updating the USM based on the corrective command. In some embodiments, the simulation of the robotics system interweaves simulations of assemblies that include both simulated designs of some components of the robotics system not yet fabricated and simulations of actual performance of other fabricated components of the robotic system. In some embodiments, during a diagnosis process, the simulation of the robotics system compares actual movements of the robotics system with movements dictated by an operations control, and the operations control simultaneously determines simulated signals to be provided through the display as correct movements. In some embodiments, the methods include: receiving sensor data from a sensory system; comparing the simulation of the robotics system described by a USM with the sensor data; and updating the USM based on the comparison. In some embodiments, the simulated environment comprises a 3D virtual representation. In some embodiments, the methods include: performing a comprehensive diagnosis with an AVKB and an active learning tool RwL. In some embodiments, the AVKB includes information from a RESSI including expectations and requirements for the robot system and a library of behaviors that RESSI requires from the robotic system. In some embodiments, the command comprises a suggested modification to a plan or a new approach in sequential detail to restructure the plan. In some embodiments, the module provides coordinated resources on a specialized procedure or topic that includes CMp. In some embodiments, the CMp comprises factual context, mistakes to avoid, and resources for learning, such as layouts of common subjects of dialogue between the robotic system and human with suggestions for communications, knowhow about performing tasks in this area, acquiring resources, researching special topics, or proposed formats and visual display materials. In some embodiments, the methods include: providing, through the interface, a tier that corresponds to a detected problem that has given rise to a fault. In some embodiments, the interface comprises a VRE that depicts activities within the simulated environment.

In another aspect, disclosed herein are one or more non-transitory computer-readable storage media coupled to one or more processors and having instructions stored thereon which, when executed by the one or more processors, cause the one or more processors to perform operations. The operations include: providing, through an interface of a robotics system, a simulation of a robotics system described by a USM and depicted within a simulated environment; receiving a command through the interface; determining an applicable module configured to operate skills and knowledge for the command based on the USM and the simulated environment; processing the command with the module and the USM to determine an appropriate effect, wherein the effect is determined based on a coherent mode of conduct and self-presentation modeled for the robotics system; and implementing the effect with the robotic system. In some embodiments, the module is developed based on a model simulating joint projects and conducting the joint projects in a collaborative setting that involves roles played by humans and the robotics system. In some embodiments, the model simulating joint projects comprises delineation of emergency circumstances where ordinary roles are overridden. In some embodiments, the simulation of the robotics system describes physical components and a structured assembly of the robotics system and calculates interactions among the physical components and the structured assembly of the robotics system. In some embodiments, the USM models a structural system, a sensory system, an internal communication system, and an information processing system and provides detailed status and dynamic changing status for the robotics system. In some embodiments, the operations include: receiving descriptions of the physical components and the structured assembly of the robotics system; and updating the USM based on the received descriptions when at least one prediction dynamically generated by the USM is inaccurate. In some embodiments, the operations include: receiving descriptions of capabilities of the robot system and an external environment where the robotics system is functioning; and updating the USM based on the descriptions of the capabilities and the external environment when at least one prediction dynamically generated by the USM is inaccurate. In some embodiments, the simulated environment is an approximation of the external environment. In some embodiments, the simulation of the robotics system highlights discrepancies between aspects of the external environment and the simulated environment. In some embodiments, the discrepancies are updated in real-time or at a successive interval. In some embodiments, the command comprises a sequence of commands. In some embodiments, the operations include: evaluating XRDS performance based on a result of implementing the effect. In some embodiments, the effect is effectuated by performing an action with an output. In some embodiments, the output comprises a motor, a servo, an engine, a device that emits sound waves, or a device that emits electromagnetic radiation. In some embodiments, the interface comprises a display, a device that receives sound waves, or a device that receives electromagnetic radiation. In some embodiments, the command is received in natural language. In some embodiments, the operations include: receiving, through the interface and after implementing the effect, a corrective command; and updating the USM based on the corrective command. In some embodiments, the simulation of the robotics system interweaves simulations of assemblies that include both simulated designs of some components of the robotics system not yet fabricated and simulations of actual performance of other fabricated components of the robotic system. In some embodiments, during a diagnosis process, the simulation of the robotics system compares actual movements of the robotics system with movements dictated by an operations control, and the operations control simultaneously determines simulated signals to be provided through the display as correct movements. In some embodiments, the operations include: receiving sensor data from a sensory system; comparing the simulation of the robotics system described by a USM with the sensor data; and updating the USM based on the comparison. In some embodiments, the simulated environment comprises a 3D virtual representation. In some embodiments, the operations include: performing a comprehensive diagnosis with an AVKB and an active learning tool RwL. In some embodiments, the AVKB includes information from a RESSI including expectations and requirements for the robot system and a library of behaviors that RESSI requires from the robotic system. In some embodiments, the command comprises a suggested modification to a plan or a new approach in sequential detail to restructure the plan. In some embodiments, the module provides coordinated resources on a specialized procedure or topic that includes CMp. In some embodiments, the CMp comprises factual context, mistakes to avoid, and resources for learning, such as layouts of common subjects of dialogue between the robotic system and human with suggestions for communications, knowhow about performing tasks in this area, acquiring resources, researching special topics, or proposed formats and visual display materials. In some embodiments, the operations include: providing, through the interface, a tier that corresponds to a detected problem that has given rise to a fault. In some embodiments, the interface comprises a VRE that depicts activities within the simulated environment.

In another aspect, disclosed herein are robotics systems that include: an interface providing for a joint undertaking between the robotics system and a human actor; one or more processors; and a computer-readable storage device coupled to the one or more processors and having instructions stored thereon which, when executed by the one or more processors, cause the one or more processors to perform operations. The operations include: simulating elements of a project for the joint undertaking, where the simulation includes separate approaches and natures of responsibility for the elements taken on by the robotics system and the elements taken on by the human actor, and circumstances in which contributions by the robotics system or the human actor can be interrupted or mistaken; determining a scope for the robotics system within the joint undertaking and methods for optimizing the joint undertaking based on the simulation; and engaging, through the interface, in the joint undertaking with the human actor based on the determined scope and methods. In some embodiments, the operations include: conducting, through the interface, real-time interaction with the human actor to engage in the joint undertaking. In some embodiments, the real-time interactions comprise communication of advance preparations for the joint undertaking determined according to the simulation. In some embodiments, the joint undertaking comprises sharing, through the interface, an overall plan and agreeing on an aggregate-level description of the plan and a range of trajectories envisaged in the plan with the human actor. In some embodiments, the operations include: providing, through the interface, indications of any circumstances that threaten an excursion beyond the range of trajectories determined according to the simulation. In some embodiments, the interface is configured to empower the human actor and the robotics system to initiate and follow through on a preventive course of action whenever the circumstances manifest. In some embodiments, the operations include: generating a Topic and Term Map (ToTeM) by attaching relevant terms and prescription to situations based upon the usage by the human actor and other human actors in the presence of the human actor; and assisting the human actor with a task based on the ToTeM.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
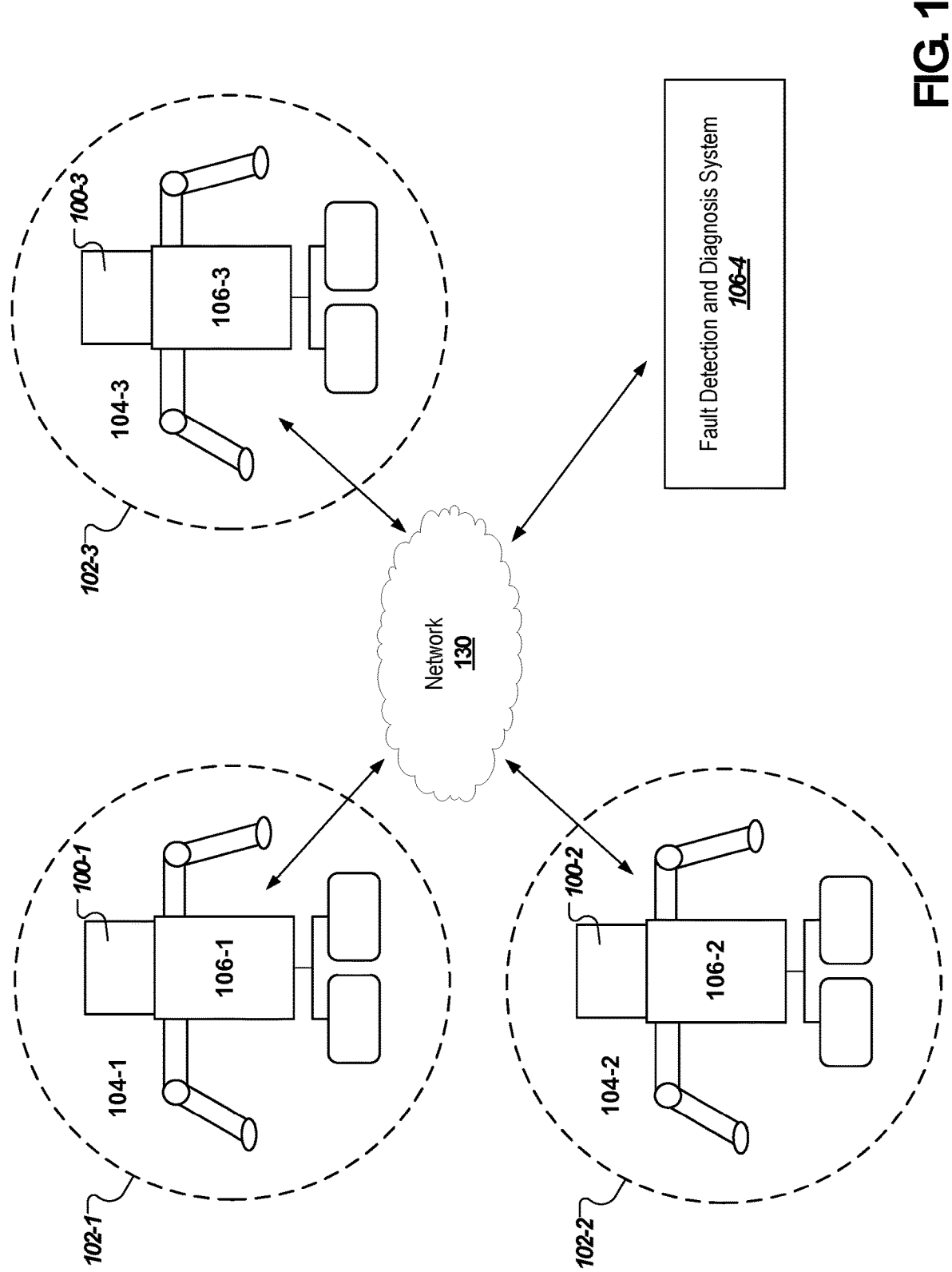
FIG. 1 illustrates an exemplary environment in which a plurality of robots and a fault detection and diagnosis system operate.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Described herein, in certain embodiments, are robotics systems that include: an interface; one or more processors; and a computer-readable storage device coupled to the one or more processors and having instructions stored thereon which, when executed by the one or more processors, cause the one or more processors to perform operations. The operations include providing, through the interface, a simulation of the robotics system described by a USM and depicted within a simulated environment; receiving a command through the interface; determining an applicable module configured to operate skills and knowledge for the command based on the USM and the simulated environment; processing the command with the module and the USM to determine an appropriate effect, wherein the effect is determined based on a coherent mode of conduct and self-presentation modeled for the robotics system; and implementing the effect.

Also described herein, in certain embodiments, are computer-implemented methods for implementing an effect with a robotic system based on a command. The methods include: providing, through an interface of a robotics system, a simulation of the robotics system described by a USM and depicted within a simulated environment; receiving a command through the interface; determining an applicable module configured to operate skills and knowledge for the command based on the USM and the simulated environment; processing the command with the module and the USM to determine an appropriate effect, wherein the effect is determined based on a coherent mode of conduct and self-presentation modeled for the robotics system; and implementing the effect with the robotic system.

Also described herein, in certain embodiments, are one or more non-transitory computer-readable storage media coupled to one or more processors and having instructions stored thereon which, when executed by the one or more processors, cause the one or more processors to perform operations. The operations include: providing, through an interface of a robotics system, a simulation of a robotics system described by a USM and depicted within a simulated environment; receiving a command through the interface; determining an applicable module configured to operate skills and knowledge for the command based on the USM and the simulated environment; processing the command with the module and the USM to determine an appropriate effect, wherein the effect is determined based on a coherent mode of conduct and self-presentation modeled for the robotics system; and implementing the effect with the robotic system.

Also described herein, in certain embodiments, are robotics systems that include: an interface providing for a joint undertaking between the robotics system and a human actor; one or more processors; and a computer-readable storage device coupled to the one or more processors and having instructions stored thereon which, when executed by the one or more processors, cause the one or more processors to perform operations. The operations include: simulating elements of a project for the joint undertaking, where the simulation includes separate approaches and natures of responsibility for the elements taken on by the robotics system and the elements taken on by the human actor, and circumstances in which contributions by the robotics system or the human actor can be interrupted or mistaken; determining a scope for the robotics system within the joint undertaking and methods for optimizing the joint undertaking based on the simulation; and engaging, through the interface, in the joint undertaking with the human actor based on the determined scope and methods Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "real-time" generally refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure. In some instances, "real-time" may refer to a response time of less than 1 second, a tenth of a second, a hundredth of a second, or a millisecond. In some instances, "real-time" may refer to a simultaneous or substantially simultaneous occurrence of a first event (e.g., processing) relative to the occurrence of a second event (e.g., sensing).

As used herein, "integrity" generally refers to a system functioning as intended according to an approved design. Loss of integrity may refer to deviation from expected behavior or an approved design. Loss of integrity may also be referred to herein as "fault." Fault may relate to both physical fault and operational fault. Physical fault may refer to fault in physical components of the robot, while operational fault may refer to fault in the operation of the robot.

As used herein, "fault monitoring" generally refers to both the process of detecting faults in a robot and diagnosing the causes of a fault. Fault monitoring may also include removing or correcting the detected fault, or adjusting the robot based on the fault.

As used herein, a "session" generally refers to a series of actions serving a common purpose and maintaining a consistent focus.

As used herein, "precise" generally refers to definitely or strictly stated, defined, or fixed.

As used herein, "approximate" generally refers to nearly correct or exact, close in value or amount but not necessarily precise.

Provided herein are robotics systems. In some examples, the robotic systems provided herein may comprise a plurality of properties. The properties of the robotics system provided herein may comprise the following: first, design for comprehensive fault detection and diagnosis, supported by a ubiquitous simulation and monitoring system; second, communication with humans about aspects of the robotics system's operations, condition, tasks, and environment via visual displays or in natural language or other modes of information sharing; third, a six-tiered structure for development, operations, cooperating with humans, autonomous decision making in certain circumstances, and fault detection and diagnosis; fourth, applying simulation systems for (i) maintenance of operating integrity and (ii) cooperating with humans for the sake of mutual support and sharing responsibility in projects that are jointly undertaken.

The robotic system may be designed to maximize the benefits of robot-human cooperation, such as by partitioning functions and responsibilities in ways that take advantage of the innate strengths of humans and robots. In some cases, humans may be better at seeing the big picture, understanding the primary purposes and needs of a project, fitting what they are doing and what the robot is doing into context, and understanding how to communicate with other humans and robotic systems in unstructured ways that permit the resource they contact to figure out what their needs are and how to cope with them. Humans may be able to sense that something is wrong without knowing what the problem is. Humans naturally start from the top and proceed to details and underlying factors. In some cases, tobotic systems, may be strongest when operating at the detail level, and making use of hierarchical structures that may extend from the detail level to higher levels of aggregation. Robots can also compare and contrast large arrays of information, search for discrepancies rapidly, and apply mappings and hierarchical structures to support processes of inference. Elaborate logic and attention to every detail may be easier for robots than for humans. Robots may be more skilled than humans at retaining many things in the foreground of their attention in readiness for immediate response whenever an action is triggered in regard to any one thing, without being distracted from their immediate focus on present activities.

In some examples, in the robotic systems provided herein, comprehensive information from the detail level upward to actual implementations may be given to the robot. For example, if the robot has an active physical form, the robotic system may be provided with a detailed simulation model of physical components and physical activities. The robotic system may also be provided with simulation modeling of its modes of operation in various aspects comprising the calculations in the Integrity Tier, which in some cases may be exploratory and/or unstructured.

Several factors may contribute to fault. These factors may include internal factors such as the control system and the physical components of the robot that may affect various functions of the robot, and external factors such as payload, force, temperature and various other environmental factors that may have, for example, transitory influences on the robot's operations and/or affect functions of the robot. Although control systems of robots may be characterized by fairly high complexity, the reliability and stability of the control system can be tested and ensured during the design process of the robot, employing various methods of detection including those present herein. In some cases, fault in the control system can be detected or examined during the design of the robot, so that when the robot is functioning in the field, the control system can be presumed to operate without fault, at least in so far as it operates the system and methods. The system and methods may also include consistency indicators that may usefully signal higher-level failures of control when triggered.

The USM includes a comprehensive description of the material, physical aspect of a robotics system. In some embodiments, component elements that extend the USM simulation predictions into various realms of actions are employed within a robotic system. In some embodiments, the USM is employed as a robotic system within the described system to perform both physical and "mental" tasks. In some embodiments, a mental task in the context of robotic systems includes processing information within the conceptual frameworks that support the robotic system's predictions and coordination in a dynamic world. Results produced through the USM and component elements can produce a productive result or an effect through for example, an output. An output includes anything that allows a robot to change the physical world. Examples include, but are not limited to, motors, servos, engines, and devices that emit sound waves or electromagnetic radiation (e.g., light waves, radio waves). In some embodiments, an effect includes providing information to human actors or other systems or robots. Such information may include raising a concern regarding a possible outcome. In some embodiments, an effect includes contacting an individual or organization to provide information.

In some examples, comprehensive fault detection and diagnosis may be an important feature for learning how to execute tasks, for example, by tentatively exploring such tasks and/or improving a simulation model thereof. In some cases, the tool can allow the robotic system to explore alternatives prudently, avoiding damaging outputs while tentatively exploring possible outputs in order to develop the information required for reliably providing appropriate effects.

Comprehensive Fault Detection and Diagnosis for Robots (CFDDR) System Overview

Provided is an interface for robot-to-human communication that provides a mechanism by which a robotics system shares information with humans and receives information from humans. In some embodiments, the described system includes an interface with six "Tiers": 1) a Fault-free Design Tier, 2) a Function Tier; 3) a Performance Tier; 4) a Service Tier; 5) an Integrity Tier; and 6) a Joint Undertakings Tier. In some embodiments of the described system, these tiers are configured as a progression from each tier to the next. Additionally, these tiers can serve different purposes, reflect different levels of the robot's development when being initially designed or upgraded, have different displays, or involve different levels of information and information processing. The interface may comprise any subset or combination of the tiers described herein.

In some embodiments, the functions of the six tiers in robot-human communications can be briefly summarized as follows: The Fault-free Design Tier (tier 1) displays the simulated robot or components of the robot as mechanically specified or as described by a USM. The Function Tier (tier 2) displays or conducts a simulation of the robot (as described in Fault-free Design) functioning in the setting of a fully described and precisely simulated environment, also available to the USM, that is known to the robotics system precisely. The next three tiers (3-5) each add an aspect of approximate description: the Performance Tier (tier 3) concerns effective performance with respect to imperfectly known and approximately described aspects of the external environment (in this case, the environment may be displayed as it is simulated or alternatively as it is approximately specified by the robotics system, and the discrepancies between the environment and the simulated/approximated environment may be highlighted in the display as the robot conducts its activities); the Service Tier (tier 4) concerns two aspects of service: tasks and other activities that are approximately specified, and approximately descriptive communications about these tasks and other activities from the robotics system to human and from human to robot (the robot coordinates its performance of these tasks and other activities and its ongoing accumulation of information about the services that it performs); the Integrity Tier (tier 5) concerns two aspects: the robotics system's approximate description of the robot itself; and communications between robot and human about the robot and the robot's integrity in considering and conducting its activities; and the Joint Undertakings Tier (tier 6) concerns closely coordinated actions involving one or more humans as well as the robot.

In some embodiments of the described system, the first five tiers share common features during communications with humans. First, any session may alternate among them, depending upon the current emphasis as a session unfolds. Second, all these tiers ordinarily encourage combined verbal/visual or visual information interchange, as opposed to purely verbal communication, because visual information may have the best capability to communicate the robot's situation. Third, by default a session is orchestrated by the robotics system so as to provide an information channel for the robot to describe the situation and receive the information it needs. The human or humans involved may often determine the topic and control the flow of communication, and the tiers can provide optional tools for human control of the entire sequence and content down to the detail level. Fourth, the robotics system's presentation of the tiers can depend upon two knowledge tools: Active Validating Knowledge Base and Replay with Learning, which are described further elsewhere herein. Fifth, all tiers are designed to accommodate capability modules, referred to as Module for Operating Skills and Knowledge (MOSK), that focus on specific topics or procedures and include communication structures for displays associated with their content. Sixth, tiers can constantly reflect an underlying discipline intended to maintain the integrity of the robot.

The sixth tier may also normally adhere to many of these features, but the importance of the human's participation in ongoing operations and the potential for interaction between human and robot in emergencies, may alter the circumstances, so that, for example, the second feature of visual emphasis may be supplanted by verbal communication so as to share information quickly and not distract the human in an emergency. The emphasis of the sixth tier extends beyond maintaining the robot's integrity to maintaining the integrity of the joint human/robot collaboration. In a sense this Tier extends very widely, because the instructions received by the robot may mostly originate with humans known by the robot. It also applies specifically when a human is controlling the robot's activities directly, when a human collaborates with or alternates with the robot in performing closely related tasks, or when the robot may need to step in to take responsibility for activities relating to a human, as for example when a human in a position of responsibility is falling asleep, inebriated or afflicted by a stroke or other debilitating condition. Simulations in the sixth tier include simulation of humans, simulation of human/robot joint decision making, and simulation of operations performed by both human and robot. Cases where an artificial intelligence/ robotics system interacts with a human, who is in control ultimately, such as an airliner with autopilot which may interact with a pilot or a self-driving car which may interact with a driver, are examples of this.

In some embodiments, each of the tiers adds a further level of capacity to the robot. For example, in some embodiments of the described system: tier 1 describes physical components and structured assembly, and calculating interactions; Tier 2 extends to functions in a known and fully-described external environment; Tier 3 extends to performing effectively in an approximately specified environment in which descriptions improve and the simulation of the environment and the robot's appropriate outputs becomes increasingly precise as the robot progresses; Tier 4 concerns providing services to humans and receiving training for these services from humans for as well as via MOSKs; Tier 5 concerns modeling and simulating humans' views of the robot as well as the principles of integrity that the robot may be expected to honor, and combines these in a coherent mode of conduct and self-presentation in its relationships with humans; and tier 6 concerns modeling and simulating joint projects that involve roles played by both humans and itself (and potentially other robots) and conducting such projects in a collaborative setting in which the robot sometimes fills in for a human and human and robot support one another reciprocally.

In some examples, the six tiers may further relate to the progressive development and validation of self-descriptive knowledge, development of interactive cooperation skills and knowledge, and the development of relationship skills and knowledge of the robotic system. In some cases, these paths of development may culminate in the system's core capabilities for robot/human shared responsibility. The phrase "skills and knowledge" may comprise, among other things, two elements that may be important for the robot's operations: first, simulation capability and second, conceptual mappings that may support dialogue and understanding of human commands and viewpoints.

In some examples, in terms of self-descriptive skills and knowledge, tier 1 may develop and/or provide identification (e.g., precise identification), mapping, display capabilities, logical structure, and visual and verbal descriptive capabilities for components and clusters of components; tier 2 may develop and/or provide USM self-descriptive simulation for the robot (e.g., in its entirety in action, in some cases with all of the USM's qualities of precise simulation including the qualities listed for tier 1); tier 3 may develop and/or provide self-description at a composite level for visual and verbal dialogue with humans in the context of composite level approximate descriptions of the environment and the robotic system's effects within the environment; tier 4 may develop and/or provide skills and knowledge for carrying out tasks assigned by humans, such as the capability to appreciate demonstrations of task performance by a human and to subsequently learn to effect what has been demonstrated, the capability to receive a MOSK providing skills and knowledge in the area of the task and then communicate with a human to learn through implementation what particular task in that area should be effected, and the capability to simulate the robotics system's role in the task as well as a human's role in respect to the task and the interactions between these two roles; tier 5 may develop and/or provide the robotics system's skills and knowledge in respect to its own integrity, and in particular, its cooperation with other compatible robotic systems in effecting tasks and its relationship with other compatible robotic systems, its responsibilities and obligations in respect to effecting or declining to effect commands from humans, its responsibilities in respect to self-care, and more broadly, its responsible roles and scope of action as specified by a centralized authority such as RESSI; tier 6 may develop and/or provide the robotics system's skills and knowledge in respect to joint undertakings with humans, including in particular, its cooperation with humans in effecting tasks, the capability to track the physical circumstances and state of mind of a human with whom it is cooperating, the capability to increase the benefits of cooperation by taking advantage of the complementarity of the human's mental skills and knowledge with the robotics system's mental skills and knowledge, the capability to simulate the relationship between humans and the robotics system, including the physical circumstances and states of mind of humans in respect to the relationship as these dynamically unfold as well as the human's or humans' postures toward the robotics system and expectations regarding the robotic system's effects, and the capability to simulate the unfolding of any joint undertaking as potentially accomplished by humans and robotics system working together in cooperative roles while exchanging roles or responsibilities when appropriate.

In terms of interactive cooperation skills and knowledge, tier 2 develops and provides interface tools and interaction styles for reporting faults in synchronizing predicted and actual and cooperating with humans to diagnose them; tier 3 develops and provides visual and verbal dialogue with humans in the context of composite level approximate descriptions of the environment and the robotic system's effects within the environment; tier 4 develops and provides the capability to simulate the robotics system's role in the task as well as a human's role in respect to the task and the interactions between these two roles; tier 5 develops and provides the capacity to determine the robotic system's responsibilities and obligations in respect to effecting or declining to effect commands from humans, tier 6 develops and provides the robotics system the necessary capabilities for joint undertakings with humans, including in particular, its cooperation with humans in effecting tasks, and the capability to simulate the relationship between humans and the robotics system, including the physical circumstances and states of mind of humans in respect to the joint undertaking as these dynamically unfold as well as human postures toward the robotics system and expectations regarding the robotic system's effects, and the capability to simulate the unfolding of any joint undertaking as potentially accomplished by humans and robotics system working together in cooperative roles while exchanging roles or responsibilities when appropriate.

In terms of relationship skills and knowledge, tier 3 develops and provides capabilities for exploring unknown features in the external environment in search of anomalies that contradict composite level and approximate descriptions; tier 4 develops and provides the capability to appreciate demonstrations of task performance by a human and to subsequently learn to implement the effect that has been demonstrated, tier 5 develops and provides the capability to cooperate with other compatible robotic systems in effecting tasks and the capability for closely coordinated relationship with other compatible robotic systems; tier 6 develops and provides the capability to simulate the relationship between humans and the robotics system, including the physical circumstances and states of mind of humans in respect to the relationship as these dynamically unfold as well as the human's or humans' postures toward the robotics system and expectations regarding the robotic system's effects, and the capability to simulate the unfolding of any joint undertaking as potentially accomplished by humans and robotics system working together in cooperative roles while exchanging roles or responsibilities when appropriate.

Moreover, when a fault is detected, and while diagnosis is proceeding, in some embodiments, by default the interface display shows the tier that corresponds to the problem that has given rise to the fault. For example, in some embodiments of the described system, the interface display shows: tier 1 for suspected difficulties with physical components and assemblies of components; tier 2 for suspected difficulties with reconciling simulation and actual in a known environment, as for example when the robot is performing a diagnostic physical exercise; tier 3 for suspected issues relating to the robot's simulations of external entities that are not fully known and consequent issues due to inappropriate responses; tier 4 for suspected difficulties with the robot's training and performance relating to approximately described service tasks; tier 5 for suspected difficulties arising from humans' views of itself, upholding its own integrity, or finding an effective tradeoff between human expectations, on the one hand, and its obligations to uphold its integrity as a robot; and tier 6 for joint undertakings or projects in which humans and robots share responsibility.

In some embodiments, the individual robots within a common class of robots may be identical in respect to the physical operating robot as described in tiers 1 and 2, and simulated by the USM. The capabilities of the individual robots within this common class, in respect to developing and managing and pursuing tasks in tiers 3 and 4 may also be identical in all robots that are functioning without faults. However, the actual learned content accumulated by individual robots in respect to tiers 3 and 4 may be accumulated in different ways and may differ from robot to robot. Furthermore, although robots that maintain integrity in the process of interacting with humans on tier 5 may have integrities of differing formats appropriate to the humans with whom they have interchanges, and may in this sense have diverged somewhat on tier 5 and become somewhat individualized, any robot with full integrity may be able to assist another robot that has suffered degraded integrity by operating the faulty robot's tiers 1 through 4 from a fault-free basis to assist in clarifying difficulties in the faulty robot that may extend up to tier 5

The basic information about potential physical faults in the robotic system derives from the robot's performance of physical activities. Faults that are not entirely physical and that may only show up in activities involving particular command sequences are addressed through a second class of information, a Command Script Effect Schema (CSES). In some embodiments, a "command script" refers to a sequential record of a series of commands, such as might be passed to a computer program by a series of instructions. In some embodiments, "effect schema" refers to a structured diagram (schema) that lays out the sequential effects of the various steps. The CSES may be unexpectedly complex, because one or more commands may affect the working environment that the schema is describing.

In some embodiments, many of these various CSES items may each be derived from a MOSK. In some embodiments, a MOSK is a guideline for appropriate steps or commands in connection with various procedures and precautions associated with the topic of the MOSK. In some embodiments, each MOSK is an element imported into a robot's operational instructions (e.g., via software), which has been created in a joint effort between human programmers and robots experienced in the subject area supported by the MOSK. By construction, in some embodiments, a MOSK includes one or more complete procedures, each in multiple steps, that each accomplishes an output in that area. The various steps in a procedure are precisely defined in the code and can be executed provided that the various materials required for the procedure are available.

In some examples, a robotics system may be improved and matured. The robotics system may be configured to learn through experience and/or implementation. For example, dimensions of AVKB, RwL, and/or robot Learning through Experience (LtE) and/or learning through implementation (LtI) may be enhanced and/or advanced. In some cases, a MOSK may be capable of and/or configured to learn from human instructions, for example, while carrying out tasks. In some cases, the robotic systems and/or the MOSK may depend on a skilled human instructor (e.g., for learning). For example, in some cases, a robotics system and/or MOSK may need minimal to no input from a programmer for learning and/or training.

MOSKs can be distributed to robotics systems in the same ways that programs and apps are distributed to personal computers. A MOSK can provide a complete and self-contained solution for a specific application, while nesting beneath broader, generally applicable Nested Action Protocols (NAPs) and inheriting general capabilities from them. For example, there may be MOSKs about Baking, Caring for Cats, Speaking Japanese, Hand-Washing Cashmere Sweaters, and Preparing Income Tax Forms.

In some embodiments, MOSKs may be implemented in terms of NAPs, Stacked Nested Action Protocols (SNAPs), Mappings, and pseudo-memories in the standardized formats for elements of the AVKB that play a role in the robot's operations. In some examples, a MOSK may access and/or comprise NAPs for carrying out actions. Alternatively or in addition, a MOSK may comprise Conceptual Mappings within NAPs for communicating with humans about the actions, and may support NAPs or provide additional NAPs with extended Conceptual Mappings and navigation guidance for searching for further information, and "pseudo-memories" of exactly how various tasks have been performed. A MOSK can provide the vocabulary the robot needs to talk about the task with its humans in the form of human conversational branches for likely eventualities that are included in Conceptual Mappings to all aspects of the task. A MOSK may also offer support to human owners and to robot users through the web, possibly including a support group of experienced robot users who engage in chat sessions as well as helpful documentation for robots and for human owners.

In some embodiments, a MOSK is closely analogous to a human educational resource. In some embodiments, the main difference is that the robot installs the operating capabilities directly in its AVKB, and receives full pseudo-recollection of having performed the activities in the past. In some embodiments, the MOSK thus offers past experiences in forms suitable for RwL. In some embodiments, when the robot first applies a SNAP into which the NAPs have been nested, the robot's knowledge of the application is immediately supported by remembered context built from the past experience of other robots.

In some embodiments, the nested action protocol design is well suited to importing MOSKs. MOSKs may be required to nest within a NAP at the higher RESSI or Manufacturers certifications to insure reliable implementation, and will usually be designed as a specific application that nests within a broad, generally applicable NAP at the level of tier 4 or tier 5.

When considering the capabilities of a robotics system for construing and solving problems and further applying these capabilities by learning through MOSKs and developing MOSKs the tiers perform certain tasks. For example, in some embodiments of the described system, tier 1: receives and applies descriptions of components and assemblies; tier 2 receives and applies descriptions of the robot's own capabilities and the robot's fully specified environment; tier 3 recognizes unknown aspects of the external environment, and finds and accesses applicable MOSKs for the necessary information to identify, describe and act in regard to these aspects; tier 4 receives instructions from humans about services to provide, receives further instructions from humans or via MOSKs about how to provide those services, and subsequently receives corrections and further instructions from humans or from MOSKs about how to customize, vary or improve the services; tier 5: applies the information in MOSKs to model and simulate humans' views of itself and to establish appropriate behavior patterns in response to these, while understanding and applying the principles of integrity that it may be expected to honor, and combines these in a coherent mode of conduct and self-presentation in its relationships with humans; and tier 6 may depend on simulation modeling capabilities for humans and human-robot interactions; tier 6 may further draw upon the other tiers to play a responsible role in closely coordinated joint human/robot projects. When appropriate, the robot defines and develops MOSKs, ordinarily from the perspective of tier 5, to record relevant information as a form of memory and for subsequent potential reuse by other robots.

When describing or observing a robot employing the described system in action and particularly whenever a human is interacting with the robot, the interface plays a significant role in analysis by the robotics system and the robot of the robot's situation and status. In some embodiments, a human can view the interface on any electronic device, or on a display attached to the robot that may, for example, appear on a humanoid robot's chest. The robotics system and the robot can also view the interface projected electronically in the robot's visual field. Some of the substantial contributions of the interface support the following developing capabilities: Tier 1 supports components and assembled components along with visual display; Tier 2 supports interoception, proprioception, and exteroception integrating along with visual display; Tier 3 supports juxtaposing related dimensions (e.g., verbal and visual, simulated and conceptual, procedures and simulation-based planning, and so forth); Tier 4 supports simulation-based training and knowledge sharing; Tier 5 supports Robot other/self-simulation interface and reflective system; and Tier 6 supports simulating the human side of projects and procedures in situations where human and robot rely on one another to meet joint responsibilities.

In some embodiments, the interface may be displayed on a device attached to the robot or it may appear on some other device. In some embodiments of a basic configuration, the interface uses a visual display to convey information about the robot to the human, and the human may convey information to the robotics system via features associated with the display, such as a touch-sensitive screen, or through some other channel. The interface display can also be seen by the robotics system, either by means of the robot's visual sensors or by the robotics system receiving the pixmap or pixmaps directly for visual interpretation.

Comprehensive Fault Detection and Diagnosis for Robots (CFDDR) Actualization

In some embodiments, the Fault-free Design Tier (tier 1) and the Function Tier (tier 2) are employed within the described system in two ways. First, they organize and operate with the same data that the CFDDR system uses. In some embodiments, the two tiers act to organize the data in a systematic way for use by the robotics system software. For example, the data may be organized in a way that corresponds to a Robot's physical structure. Second, the two tiers provide efficient and informative interfaces for human operators to view informative displays and interact with the robotics system's CFDDR operations and data whenever necessary. They offer the helpful approach of visible display of discrepancies observed within physical simulations of the robot and discrepancies between physical simulations and actual measurements, and can show this statically, discretely at successive times (e.g. every second) or in near real-time.

In some embodiments, the Performance Tier (tier 3) provides support for actual movements and simulations of a robot in the context of XRDS in circumstances where, for example, external objects cannot be precisely simulated by the robotics system and instead are approximately perceived and approximately described. Moreover, when the robot is not responding properly to external circumstances perceived by its sensors, the Performance Tier can visibly contrast external physical simulations of the world outside the robot with other determinations by the robotics system or other available systems, or with independent observations perceived through human senses that assess them. The key here is to represent the world as the robotics system presently describes it in a way that allows it to be contrasted against proven alternatives. This approach can be applied to the robotics system's simulation of the robot itself and the robotics system's simulation of the external environment.

In some embodiments, a fault that cannot be readily diagnosed takes the diagnostic investigation into the realm of the unknown. This challenge highlights the possibility of probing beyond the immediate physical condition of the robot and its direct operational control software to look for possible faults in the framework being applied. Furthermore, as diagnosis is prolonged and the usual possibilities are exhausted, the investigation becomes increasing complex and diagnostic tools that help to manage complexity and hone in on simple resolutions become increasingly advantageous. AVKB and the active learning tool RwL can carry out such extended investigations and greatly assist with comprehensive diagnosis.

Parallels Between Anomaly Diagnosis and Learning from a Mistake

In some embodiments, there are synergies between addressing the challenges of the robot's physical, mental and operating integrity and those of addressing Robot Learning and Knowledge. A number of factors give rise to the parallels between the two challenges. Both depend on memory of past conditions, knowledge of present conditions, the ability to project the effects of adjustments that will correct the robot's functioning, and the ability to alter the situation so as to effectuate those adjustments. Consequently, information processing procedures for the two are closely related. Maintaining integrity and diagnosing an anomaly, on the one hand, and learning from a mistake and adjusting the robot's mental calculations to correct the mistake, on the other, both rely on the Precise USM, Comprehensive Sensing and Monitoring, and Synchronizing Prediction and Actual (SPA).

Another set of fundamental capabilities are deployed for diagnosing an anomaly or learning the nature of the mistake, and subsequently adjusting the robot's mental calculations. In some embodiments, this set of capabilities is provided by the AVKB, and the active learning tool RwL.

There is a close analogy between learning from a mistake and diagnosing and accommodating to a physical flaw. Simulating alternative behaviors is required for learning and knowledge so that the robot can develop and/or validate new modes of conduct through analysis or trial and error, and similarly required for monitoring integrity so that the robot can identify recurring anomalous patterns and determine equilibrating adjustments to its USM that temporarily accommodate those anomalies, restoring the validity of the simulation.

Both learning and maintaining integrity require adaptability. Learning requires this to fashion new behaviors, and maintaining integrity requires this to identify and then compensate for the effects of physical defects. Both require that the robot have access to knowledge of its own inner workings. In order to learn and develop new knowledge, the robot needs to know its present range of capabilities and have knowledge about how to modify them. In order to monitor its integrity and detect and diagnose anomalies, the robot needs to know correct performance and likely causes of deviations from correct performance.

Both learning and maintaining integrity require that the inner workings and the operations of the robot are precisely controllable, predictable and reproducible. These characteristics are desirable for robot learning, because learning requires a solid basis for developing new behaviors, and also desirable for monitoring integrity in order to detect the subtle impacts of flaws, imperfect system updates or malicious interventions.

Integrity and Learning are also synergistic because each facilitates enhanced capabilities in the other: Learning new behaviors and enhancing the robot's Knowledge Base extend the robot's behavior beyond what was initially tested by the manufacturer, and require that the robot be effectively monitored to verify that it has not ventured into uncharted territory where integrity is violated. Conversely, maintaining integrity at a time when parts or mental capabilities are being updated or upgraded requires the robot to learn and validate modifications to its behaviors in order to accommodate the changes that have been made.

As these parallels indicate, the functions of Learning and Knowledge, which strengthen the robot's knowledge base, and Anomaly Detection, Diagnosis and Equilibration, which supports the robot's integrity, are closely related.

Active Validating Knowledge Base and Replay with Learning

One significant goal for robotics is a mobile, general purpose robot that can function in a human environment such as a household. Within the supportive context of a robotics system, a robot may learn through instruction and experimentation how to, for example, (i) function in a newly reached position and newly encountered environment that it has reached for the first time; (ii) successfully undertake a task that it has never performed before; (iii) communicate with humans using natural language in order to find out what is expected of it and what it should do; and (iv) update or upgrade its operations control system as necessary to adjust to requirements that it cannot presently satisfy.

In some embodiments, a robot learns and develops knowledge for the sake of functioning more effectively. For example, a robot may learn through experience so that it can diagnose internal anomalies; support XRDS in a changing environment; learn about new tasks and its performance in tasks; and learn about its humans so as to understand their needs and wishes, and communicate effectively. Learning through experience (LtE) also helps the robot to deal with ambiguous situations and adapt to physical and mental upgrades.

The AVKB is a repository of information and also a knowledge interface, both externally and internally that can be employed by the described system. In some embodiments, the AVKB is configured for application, designed for applicability, and continuously applied. In some embodiments, the information it holds is configured to be validated in experimental testing and actual operations, and evaluation and validation are built into its applications. In some embodiments, the AVKB tracks the validation of its elements and actively supports ongoing validation. It can accept information that is potentially imperfect, screen information for signs of imperfections, and highlight cases where problems may exist so that further information can be sought and the modified information ultimately validated. In some embodiments, the defining feature of the AVKB is Emulation. In some embodiments, the AVKB emulates objects and processes and other known constructs individually. In some embodiments, the AVKB emulates constructs independently, emulates the interactions at their interfaces, predicts the consequence of interactions between constructs and subsequently tests the predictions of interactions against actual happenings.

Learning through experience (LtE) and/or Learning through Implementation (LtI) require basic knowhow concerning the situation and topic. The terms LtE and LtI may be used interchangeably. Knowhow is a special feature of a MOSK, and the MOSK provides the basic information structure that the robot depends on when initially communicating with humans about the topic as it begins to learn. The knowhow is imported into the robot's AVKB in a form that can be enacted directly and also includes pseudo-memory of applying the procedures in the MOSK that is arranged by Replay with Learning and, if necessary, adapted to the robot's capabilities. Knowhow also includes CMps specifically structured for natural language communications about performing the procedures.

In some embodiments, the learning framework provided by AVKB and RwL makes it possible for a robot employing the described system to model effectively the humans who give it instructions and simulate their side of the relationship with the robot. To have confidence in the robot, humans will need to see that it is adapting to their ways and meeting their expectations. The robot may be able to understand each human individually, in the sense of recognizing a person's needs and wishes and appreciating how the person wants the robot to perform. In some embodiments, the learning framework analyzes the robot's interactions with each person individually, and emulates (i) the person's requirements and preferences and (ii) the person's image and expectations of the robot. Responding to this contextual information, in some embodiments, the robot develops a personal way of relating to each person. The contextual information also forms the basis for the robot's interpretation of instructions and guidance about tasks and duties. In some embodiments, the learning framework also emulates tasks and duties that have been performed, using the emulation technique to develop further information from each repetition. In some embodiments, the learning framework probes for unambiguous and reliable confirmation of each person's views by interpreting interactive discussion and politely seeking explicit validation of its interpretations.

Context supports learning, operations, and communication. As the robot learns about its humans and interacts with them repeatedly, the robot assembles a human context for its operations that is an important facet of its unique knowledge. This process results in the robotics system's simulation of the humans the robot interacts with as well as its simulations of the robot's services to humans and the robot's collaboration with humans in joint projects.

Context allows for dependencies on multiple factors and different approaches for diverse circumstances. Context provides for such things as detours when tasks are interrupted and determining the best course of action when there are disagreements among humans about the robot's activities. Much of the research performed by AVKB and RwL goes into establishing context regarding tasks and methods for tasks, and determining contextual settings for many aspects of the robot's activities. Decisions at branch junctions in action protocols and changes of plans often depend upon context. In some cases, context should be as structured as possible, because structure aids inference. For example, a complete list of the items in an inventory or a comprehensive schedule can provide a helpful context. But a human context may lack structure, in which case the main point is to characterize the context as fully as possible. Context helps to determine the need for confirmation and often helps to provide confirmation. Intuitively, context may extend at least one step beyond wherever an ambiguity occurs, so as to provide perspective.

In some embodiments, the AVKB provides customized interfaces to human users. Human users include the robot's developers and other specialists during the development phase and afterwards, and also the humans the robot serves. To present an effective interface, in some embodiments, the AVKB emulates each user's purposes and requirements as well as the user's expectations from the AVKB, and then proceeds to emulate useful interface features for the AVKB to offer and useful tasks that the AVKB can perform. Emulation improves communication and helps to customize services.

In some embodiments, AVKB validates the knowledge base as a whole. In some embodiments, AVKB screens the knowledge base for questionable elements that are irrelevant to likely actions. AVKB conducts searches of the knowledge base. In some embodiments, AVKB has various procedures for transforming knowledge into useful forms. AVKB actively formulates predictions concerning known constructs by emulating those constructs, and maps the emulations of different constructs across construct boundaries, monitoring whether the emulation-based predictions are successful or not, and calls upon RwL for assessment and enhancement in circumstances where predictions fail.

In some embodiments, internally, the AVKB handles interfaces between knowledge systems. For example, in general it is configured to harbor both an active knowledge system that can be validated in application, and also a conceptual knowledge system that maps to and describes the active knowledge and can be validated for internal consistency. AVKB can also validate cross-consistency between the two systems, comparing and contrasting the systems and potentially inferring from their juxtaposed characteristics knowledge gaps or inconsistencies. In some embodiments, the AVKB also provides interfaces for human specialists to review these findings.

Customized implementations of the systems provided herein may be optimized for supporting robotics operations. For example, the AVKB capabilities can be applied to more knowledge systems, in some cases three more knowledge systems. The Operations Control System may be a third system that can closely correspond to the AVKB active knowledge system but may be differently structured for operational efficiency. The Ubiquitous Simulation Model may be a fourth knowledge system that applies dynamically. The fifth knowledge system may be the composite-level system for approximate representation of these knowledge bases, which may serve for verbal and visual communication as well as for efficient calculation of simulated activities for planning and communication purposes.

One of the essential elements in the Robust Structure for Service that comprises the five knowledge systems may be the Interface for Modeling Beings and Objects, which may provide recognition and identification of humans and other robots and animals to the robot. Once these have been recognized in the robot's environment, the robot can apply its RMF appropriately.

In some embodiments, the AVKB is equipped with a range of validation tools that allow it to interface externally through agents to apply, extend and solidify various forms of knowledge. In some embodiments in a robot, RwL is the primary agent for the AVKB, and the unique interface between AVKB and RwL mediates their joint functions.

In some embodiments, the AVKB applies a set of principles that characterize its operations: (i) it emphasizes relationships among its constructs (internal Dependencies) and maps procedures useful in applications (external Dependencies); (ii) it emulates internal constructs and analyzes requirements across their boundaries and interfaces for internal consistency, connectivity and completeness, and it also emulates each process and object represented within it for potential external validation or improvement by applying the emulation in circumstances where relevant requirements exist, making predictions based upon the emulation, comparing these predictions with the external circumstances that occur, and improving the emulation as necessary to take account of discrepancies between prediction and actual; (iii) it draws constructs together into coherent clusters validated by tests of consistency, connectivity and completeness and explores beyond a cluster's boundaries and interfaces for constructs that may cohere with the cluster or alternatively challenge its coherence; (iv) it establishes categories defined by features shared in common and areas of similarity, and allows for individual diversity unexplained by common categories; (v) it expresses active knowledge through multiple agents, each targeted to a particular emulation instance and gathering knowledge relevant to that emulation, applying the emulation and validating or improving it, and organizing knowledge of the instance for other applications of the AVKB.

As the primary agent of the AVKB, RwL supports and conducts learning through experience and other learning functions. "Replay" is the ability to recall past experience, including the robot's own interpretations and actions as well as external events, and subsequently "replay" past history to recreate the time sequence of events in proper order. The memories are recorded compactly and expanded for replay through a working model. "With learning" indicates that the working model is able to replay the past while hypothetically modifying aspects of behavior and predicting the consequences of those modifications in order to determine a better course of action. "With learning" also indicates that RwL provides the structured information for retraining the robot to behave in the chosen way.

The RwL format is general and flexible. The robot can employ it for almost every goal-oriented activity. RwL helps the robot to record memories compactly, diagnose anomalies, learn through experience, retrain itself, generalize learning into multi-functional knowledge, formulate a plan for the future as a collage of known elements, and so on. Together, RwL and AVKB jointly conduct the robot's basic inference processes: diagnosing the causes of internal anomalies, supporting recognition and description of external objects, and improving Operations Control (OCo) action protocols, such as NAPs and SNAPs, to correct mistakes and develop superior methods. RwL and AVKB jointly probe causal structures by searching for regularities and exceptions that may reflect systematic and specific causes.

In some embodiments, RwL conducts learning sessions. RwL can adapt approved solutions by adjusting parameters to match the robot's characteristics. RwL can collect OCo components already proven in other circumstances and reconfigure them into new applications. RwL can customize solutions to new problems through trial and error exploration, while limiting itself to approved safe ranges of parameter values. RwL can analyze existing OCo mental capabilities and CMp to determine relevant context and thereafter provide ongoing contextual information to support operating SNAPs as needed. RwL can explore discordance between CMp and OCo instructions. RwL routinely conducts memory and planning SNAPs that employ OCo and USM. RwL conducts virtual USM operations for planning and experimenting.

In some embodiments, RwL combines various past experiences and other reliable elements into a plan for the future. RwL supports current operations as they are being conducted with relevant context drawn from the AVKB. RwL provides and applies a mechanism and knowledge context for conceiving of and considering alternative circumstances, conducting trial and error experiments and simulation experiments, evaluating and choosing among alternative actions, and retraining by modifying action protocols to reflect a chosen alternative. RwL deals with sequences of events and their causal connections and associations. It applies to physical happenings and actions, to language and communication, and to units of information and information processing.

In some embodiments, Learning through experience (LtE) and/or learning through Implementation (LtI) proceed like a collage, in the sense that pieces of reliable knowledge are pasted together. It is like adjustment, in the sense that the robot modifies settings in a structured way in order to adapt established procedures to its personal circumstances. In some examples, LtE may be like apprenticeship, in the sense that the robot often receives supervision from others who are more knowledgeable through human-composed MOSKs and other human guidance, as well as from other robots. LtE is like a human gift, in the sense that every detail of the robot's learning process has been structured by human developers. LtE may be is like experiment, in the sense that within well-defined limits the robot tries different methods to find the one that works best.

Ubiquitous Simulation Model and Approximate Composite Description
Ubiquitous Simulation Model In some embodiments, a USM, which the Fault-free Design Tier (tier 1) may employ to describe a simulated robot or components of the robot for display in the interface, is a basis for self-description, because it precisely models each of the robot's four systems: structural, sensory, internal communication and information processing. In some embodiments, the USM provides detailed status and dynamic changing status for the robot, including structural configuration and exterior envelope configuration in three dimensions. In some embodiments, a robot relies on the USM when calculating the positions and rates of change of position of its various elements. In some embodiments, a robot applies the USM to make precise, science-based calculations of appropriate trajectories to reach its goals. In some embodiments, a robot applies these science-based calculations to adjust its actions to take into account extraneous factors that may arise.

In some embodiments, the USM is a comprehensive description of the material, physical aspect of the robotic system and the six tiers relate to this role of the USM. In some embodiments, Synchronizing Prediction and Actual (SPA) is calculated in tier 5.

In some embodiments, the impacts of a fault may be detected when operating in tier 4 service tasks, and the process of confirmation and diagnosis is carried out by progressively delving down from the Service Tier (tier 4) service tasks to the Fault-Free Design tier (tier 1). In some embodiments, operations of a robot are generally conducted from the Service Tier (tier 4), as well as the Joint Undertakings Tier (tier 6), although steps and procedures in these operations may unfold at the lower tiers where specialized procedures reside. In some embodiments, the robot's higher order decisions when regarding the actions and instructions received from humans occur at the level of the Integrity Tier (tier 5), and when concerning the basic responsibilities that it takes on when working in parallel with humans, at the level of the Joint Undertakings Tier (tier 6).

In some embodiments, as discussed below, faults in operations are ordinarily detected during operation on the Service Tier (tier 4), and the great majority of such operations are conducted by command sequences from MOSKs. In some embodiments, RESSI keeps track of fault events and the operational status at the moment of detection, so RESSI has a map of fault-detection event frequencies (including both detection and subsequent diagnosis, along with diagnosis method and supporting information about the MOSK location and nature of fault found) extending through the universe of MOSKs. Further, ordinary fault detection events can be reinforced within operated MOSKs with custom-designed scripts, such as CSESs as discussed above, that are extracted from or based upon MOSKs, and are most likely to discern various faults. In some embodiments, operating such MOSK-based scripts during intervals when the robot is otherwise unoccupied has such benefits as preventive search and detection before an impact might occur, focus on the factors relevant to the event rather than making the detection at a time when the robot may be engaged in many activities simultaneously, and avoiding the need to interrupt the robot's other ongoing activities in order to free up resources to focus on diagnosis such as integrity calculations of the USM. In some embodiments, the correspondence between the diagnostic tier level (generally tier 5) and the MOSK tier level (most commonly tier 4) is useful in understanding the multi-tier structure.

The treatment of the Ubiquitous Simulation Model and Synchronizing Simulation with Actual in this tier focuses on the robot's operations in a known environment. In some embodiments, the robot and the environment are simulated, and these simulations may be, in principle, exact. In some embodiments, the robot's interoceptive and proprioceptive sensory systems are tested and validated, and subsequent displays, similar to tier 1, include displays of, for example, the robot moving as a whole (i) as measured externally, comparing with (ii) what the robot is calculating via its sensory systems as it moves, and (iii) what is simulated by the USM. In some embodiments, the robot's control systems and operational systems are also tested and evaluated (e.g., comparing what the intentions are for the robot's movement with what is actually occurring). In an example, a model of a mobile, general purpose robot may go through an extended development period, during which its physical components and its software components will be gradually developed, tested separately and then tested in conjunction. Fixed, single-purpose, or restricted multi-purpose robots operating in a repetitive environment free from surprises constitute a well-defined challenge in which many basic issues do not need to be encountered.

In some embodiments, the treatment of USM/SPA function is built around a 3D virtual representation of a simulated robot in a simulated virtual environment. The virtual environment may be current, recalled from the past, planned or hypothetical. The robot's simulated actions that are manifested may also be current, past, planned or hypothetical. In some embodiments, the treatment of USM/SPA function maintains a 3D workspace that the robot shares with humans through visual displays. For example, virtual representations can be depicted in 2D and 3D flat-screen renderings and/or Virtual Reality (VR) renderings of the robot and its environment. The display may be static or dynamic, and change may be presented in slow motion or as periodic discrete static images.

Approximate Composite Description

In general, CMp such as those embodied in natural language or associated with visual images, involve some degree of approximation, since a word or image may have multiple meanings and allow varying interpretations, and because neither goes fully into the detail of what is referred to or depicted. Verbal or visual references to a composite of any kind, such as an object or living being or machine, are generally approximations, because the details of the elements of the composite are not fully or specifically addressed. Also, references to entities are generally approximate for two basic reasons: the entity is complex and may have unique features that cannot be accurately described, and the entity and its situation may vary over time or morph in different circumstances.

Approximate descriptions are significant in seven areas of the robot's activities, which are associated with the six tiers of the described system. First, in the areas of Fault-free Design and Function, approximate descriptions are superimposed upon entities that are also precisely simulated by the USM, including the robot's physical status and operations and other precisely simulated items external to the robot. Second, in the area of Performance, imperfectly known external objects may be recognized and approximately described in the process of simulating the environment. Third, in the area of Service, the nature of the robot's tasks and the services received by humans through those tasks are approximately described. Fourth, also in the area of Service as well as Performance, natural language and other conceptual descriptions of the robot's tasks and services during communications between the robotics system and humans are approximated content. Fifth, in the area of robot Integrity, the robot itself is approximately described by the human and by the robotics system, and each of these descriptions may also be approximately described by the other. Sixth, also in the area of Integrity, the sharing of status between the robot and human, with core emphasis on maintaining the robot's integrity at all times and in all circumstances, are approximately described. Seventh, in the area of Joint Undertakings and collaboration, in addition to the joint project itself, a human's contributions to a joint project and the robot's capabilities for enhancing, standing in for, and occasionally counteracting the human's contributions are approximately described.

One impact of approximate description is the need to approach any situation described approximately in a way that avoids irreparable mistakes and helps to disclose the information necessary to act appropriately. As a consequence, the basic purpose of knowledge acquisition blends with other more straightforward reasons for action. Therefore, whenever approximate descriptions are involved, the robotics system's priorities inevitably include an element of information gathering, which can be termed learning through experience or learning by doing.

Multi-Level Simulation; Composites for Communication

In the process of Learning through Implementation (LtI) or Learning through Experience (LtE), the robot also crafts a mapping of composites to constituents at successive levels of increasingly greater detail. This is essential in respect to the robot's actions, since Operations Control operates at the detail level. It is also crucial whenever the robot will make physical contact with an external object or entity, since details matter at the point of contact. Moreover, in some situations, details will be fairly essential, as for example determining fairly accurately the center of gravity of something to be lifted up and carried. Also, in some situations the ethical aspects of an undertaking may depend upon specific features. More broadly, understanding of any construct at the composite level may depend on knowledge of the object at a level of greater detail. For example, a piece of packed luggage contains various items that have been placed within it, and the identities of those items may sometimes be important details.

The solution can be visualized as a multi-level simulation, in which the composite is at the top, and dependencies reach down to components, components of components, and so on down to the level of detail at which the robot can operate. At the top is, for example, an output for the robot to achieve and a time period, say of twenty minutes, in which the output will be produced. The output is something composite, like finishing packing some pieces of luggage and then packing the luggage into a car. At the most detail level, there is the sequence of packing multiple items in multiple pieces of luggage, and the placement of items within the luggage, the sequence in which the luggage is carried to the car, and the locations in which the luggage will be placed and the sequence in which they will be inserted. The robot would probably be supported by a MOSK on this subject, but might also face challenges as to which items to pack in which pieces of luggage and how to prevent fragile items from being damaged during the trip. The resulting simulation would be reusable for subsequent trips and would also serve to locate any needed item in the appropriate piece of luggage when necessary.

The robot will be approaching the problem in a way that is comprehensible to humans, and will be able to ask questions and interpret correctly the answers received. The multi-level simulation also serves as a basis for communicating with humans about the luggage and the stored items. A multi-level mapping that corresponds approximately or precisely to the items in the composite simulation will allow the robot to communicate on this topic with its owners or users. The usefulness of multi-level simulation and the structure of natural language on the topic are closely related.
Contributions to Development and Diagnosis Another benefit for robotics is to structure a development system for a new or revised model robot that facilitates the work of human developers by disclosing inconsistencies and inadequacies as well as potential improvements of the configuration of hardware and control software as the configuration is being developed. A straightforward implementation of the simulation capabilities of the robotics system in a graphical display interface can be useful in this regard.

The six tiers of the described system can be understood in terms of the development of the robot. For example, an initial Fault-free Design Tier (tier 1) that lacks an environment is useful when a human (i) wants to observe and understand the physical properties or simple mechanical operations of the robot at any level of detail, (ii) is evaluating or developing a simulation model, or (iii) is monitoring the consistency of the simulation model and actual performance. In some embodiments, the Fault-free Design Tier primarily concerns individual elements and components comprising multiple elements, and interlinkages among components that are parts of the robotic system. System provided tools and MOSKs at the Tier 1 level include investigative display tools and maps of interlinkages. Some of these MOSKs are fully operative when the robotic system is fully assembled. These cover, for example, appendages like fingers, hands, and arms or the like. Other MOSKs at the Tier 1 level are operative when the components have not yet been permanently fixed in juxtaposition with other components and may need to be juxtaposed with simulated instances of both finished and unfinished components in order to simulate a completed robotic system.

In some embodiments, the Function Tier (tier 2) in which the environment is known and exactly specified at the detail level is suitable for testing and exercising the robot's functioning when dealing with known external entities, and for training the robot to perform activities and tasks and observing how the robot functions in response to training. In some embodiments, the Function Tier applies to the fully assembled robot and is concerned with all aspects of physical positioning. In some embodiments, the system-provided tools and MOSKs at the level of the Function Tier are concerned with the entire repertoire of postures and movements available to the robot. In some embodiments, the Function Tier is concerned with internal and external positions and movements at all scales from interior positions and individual extensions to the entire robot.

The MOSKs at this level routinely incorporate not only the positioning of the robot as a whole, but also the specific elements down to the smallest detail. Consequently, in most circumstances Tier 2 level MOSKs cover many MOSK applications for Tier 1. Tiers 1 and 2 generally refer to and model all elements of the robot in terms of system-provided identifiers, and the system also provides identifiers for assemblies of elements at all levels of aggregation. The Fault-free Design Tier and Function Tier may also play a key role in early development because the design of the robot can evolve during simulation trials of simulated designs of various components and the simulated robot as a whole, and in some cases, the simulations can begin well in advance of the time when physical implementations of the various components are completed and the robot is assembled and becomes operative. This may be the quickest and least costly approach to the early stages of design.

In some embodiments, the Performance Tier (tier 3), in which there is a simulated environment but no exact simulation of the environment is available to the robot, and is basic for a mobile, multi-purpose robot, and calls upon the robot to apply external recognition, description and composite-level simulation, termed XRDS, to approximately simulate the environment. In some embodiments, the Performance Tier is relevant for evaluating XRDS performance and helping the robotics system to acquire information necessary to improve XRDS performance in test environments. In the two prior tiers, the robotics system and human users of the interface make use of extensive CMp and approximate descriptions that are superimposed on the detailed simulations of the USM, but the robot has no access to those composite approximate descriptions. During the development of XRDS, the Performance Tier can serve as a virtual test bed for developing the mental capabilities that support the sensory process. It can help to develop the robot's support calculations for visual, auditory and tactile perception, including movements that modify its vantage point for the sake of clarifying object recognition. In some embodiments, the Performance Tier is the first tier in which the robot employs composite approximate descriptions in operations, and the Performance Tier plays a key role in fostering these mental capabilities. The Performance Tier is also very helpful for diagnosing causal factors when the robot has lost physical or operating integrity.

In some embodiments, the Performance Tier follows on the Function level to optimize and coordinate positioning and movement. Also, the Performance Tier may introduce composite level reference and approximate modeling of the robotic system itself and its environment, which are also relied upon in higher tiers. These two aspects are mutually dependent, because the circumstances related to many of the optimization criteria and the coordination requirements for positioning and movement generally result from external cues associated with the robot's environment, primarily in the context of receiving instructions from humans and acting upon them. Human instructions may be expressed in words or delivered using interfaces crafted for humans to share information via graphic displays that incorporate graphic information entry devices. In these and other communication structures, human instructions will not have sufficient granularity to fully specify the robot's activities, and instead the robot may interpret the approximate and composite level instructions into actions taken at the detail level.

In some embodiments, the Service Tier (tier 4) applies to the realistic situation in which the robot and humans are communicating about tasks for the robot. In some embodiments, the Service Tier is the normal operating status of a robot following human instructions. RESSI, normally presented from Tier 5 above, is important for all robots in service operations on Tier 4, primarily because of its role in gathering, sharing and disseminating knowhow and offering context and perspective when needed. For example, a display allows the robot to enact a hypothetical plan for carrying out a task, and allows the human to offer a plan, input suggested modifications to a plan or suggest a new approach in sequential detail to restructure a plan. The display also allows the human to revisit the robot's memory of carrying out a task in order to learn how the robot has performed previously, or to explain a past mistake or suggest a different approach.

In some embodiments, in the Service Tier the robotics system simulates the robot's activities at the precise, detail level. However, in some embodiments, the robotics system also superimposes simulation of these same activities at the approximate composite level, so that these composite simulations can be juxtaposed with simulations of the environment that are at the composite level, and that are also used in communications and composite-level planning. Simultaneous simulations at the detailed precise level of the USM and at the composite level are important for communication between robot and humans. Also, the robotics system simulates human expectations relating to the robot's activities at the approximate, composite level.

In some embodiments, the Integrity Tier (tier 5) serves as a foundation for the robotics system to participate effectively in robot/human communications. The robotics system also simulates approximately the composite views that each human has of the robot, and regulates the robot's conduct accordingly. This completes the simulation of both sides of the relationship between humans and the robot and is supported by records of interchanges between them. In some embodiments, the Integrity Tier also plays a key role in communications about robotics system procedures for caring for the robot and standards and requirements for robot conduct, and focuses on maintaining the robot's integrity.

In some embodiments, as described above, SPA is operated in the integrity Tier. This operation may include, for example, calculating the USM, calculating the robot's actual position and rates of movement, and synchronizing them in a dynamic setting where predicted and actual are both unfolding over time. In some embodiments, the calculations are complex and time-critical, and ideally performed as sequential updates to maximize computational efficiency. In some embodiments, the robot's plans, normally formulated and operated from Tier 4, are a crucial element in these ongoing sequential updates.

In some embodiments, CFDDR is also calculated at Tier 5. In some embodiments, RESSI is primarily active in the Integrity Tier as well as the Service Tier. In some embodiments, RESSI's primary role regarding integrity is to help the robot understand situations in which human instructions are contradictory or devious or seem to violate the fundamental code and commitments of the robot. MOSKs for Tier 5 may be focused on integrity Tier 5 or Joint Undertakings Tier 6

In some embodiments, the Joint Undertakings Tier (tier 6) assists and is supported by precise simulation of the elements of a project, the separate approaches and natures of responsibility for these elements taken on by the robot and by humans respectively, the circumstances in which human or robot contributions might be interrupted or mistaken, and the robot's scope and methods for facilitating cooperation and optimizing the joint operation as a whole at all times and in all circumstances. In some embodiments, the Joint Undertakings Tier is also designed to bring about effective communication between the robotics system and humans, including advance preparation as well as real-time interactions. The ultimate purpose is to sustain the integrity of the human/robot collaboration.

The joint undertakings of the robot and human are conducted in formats that exploit the complementary capabilities of the two. For example, the robot can learn more quickly and more precisely, remember details far better, focus its attention and responsiveness in many aspects simultaneously without losing quality of attention, and respond more quickly in any one aspect without any lessening of the quality of attention in other aspects. The joint undertakings evolve in the human realm, and the human is simultaneously taking on these efforts and participating in the benefits that accrue from them. The human is more deeply engaged in the undertakings and may almost embody them. The human also has sensory capabilities and forms of attunement to other human beings that the robot lacks. Also, the human naturally conceives from the top down, whereas the robot's knowledge and skills proceed upward from the level of detail toward implementation.

Critical Scenarios may be naturally addressed in this way because they may often concern issues at the Tier 1 level that were difficult to address via Fault-Free Design, and therefore lend themselves to disciplined ongoing attention at Tier 6.

Various Applications in View

A semi-autonomous, general-purpose mobile robot, such as an android, that performs tasks for humans and fits into human society will need to take on a variety of tasks in a variety of circumstances, learn how to perform new tasks and handle new circumstances, and operate in all environments that humans can tolerate. The robot will require some basic capabilities in order to function at these high levels.

In order to take into account unpredictable factors like wind, rain, uneven or dangerous ground or steps, fallen limbs and surface ice, the robot will need to take the effects of such factors into account when calculating its actions, and so it will need to calculate its actions in real-time using scientific principles. In order to deal with the varied circumstances that it will confront when cooperating with humans, the robot will need to calculate its actions in real-time in order to develop solutions using science-based principles that involve familiar actions in unfamiliar circumstances. Science-based calculations of actions in real-time will be useful for many purposes.

To climb into and out of a car and sit in a car seat, to walk up and down stairs, to stoop down to get something from a low shelf or climb a ladder to a high shelf, and to participate in human games, the robot will need a flexible body. The robot may be an android that will fit naturally into human surroundings and mesh with all our gadgets. The flexible body will be useful for many purposes.

When the robot's flexing body shifts the orientation and vantage point of a sensor, the shift will affect sensory input, and to adjust for that effect the robot will need to calculate in real-time the sensor's changing location and orientation in three dimensions in order to adjust for changing position and interpret the sensory input seamlessly. In order to calculate the forces required from its various motors and other agents of force to implement calculated actions, while also taking into account and compensating for other external forces like gravity, wind and the weight of a carried object, the robot will need to know in real-time its center of mass, distribution of mass and the locations and orientations of all its motors or other agents of force. Calculating these data in real-time will require detailed current information about the configurations in three dimensions of both the robot's structure and its external envelope. This current-time 3D configuration will be useful for many purposes.

In order to calculate its actions and control its operations, the robot needs information in real-time about the 3D configurations of its structure and external envelope, information about its present status in performing its planned operations, and information about any relevant external factors that would impact its action plan. Information in real-time about 3D configuration, performance status and relevant external factors will be useful for many purposes.

The robot may need to record its actions—including relevant timely information such as 3D configuration, performance status and relevant external factors—so that it can later recall past actions in order to reenact them, review them, and learn from them how to avoid a past mistake or do something new or describe them to a human. Such records include the information in real-time described above. Memory of actions including 3D configuration, performance status and relevant external factors will be useful for many purposes.

The timely information necessary for calculations mentioned above requires the ongoing calculation in real-time of a precise, science-based simulation model that fully describes the configuration and performance of active elements of the robot's physical structure, agents of force and sensory system. The robot's self-description of its own status and dynamics as described above, such as 3D configuration and the performance of sensors and agents of force, precisely specifies the configuration and functioning of many distinct interacting internal elements. This simulation model calculated in real-time will be useful for many purposes.

There is substantial value in a multi-purpose interface that allows the robot to describe itself visually in composite terms and supports verbal conceptual description at a composite level as well. In some embodiments of the described system, the interface functions for external communications, presenting to humans visual displays and conceptual descriptions suitable for natural language communication. The robot also deploys these displays and descriptions in internal information processing, because the approximate composite-level analysis that supports these visual mappings complements the robot's operating systems and detailed calculations. This dual functionality is an important feature of the design, because the interface reveals to the human the robot's composite mental capabilities and calculations, thereby serving as an aspect of quality control and a vehicle for human understanding.

Robot and human can simultaneously observe the interface of the described system, and each can contribute information in a context that fosters accurate interpretations on both sides. The robot can view the external display with its visual sensors, or alternatively free up its external sensors for other purposes and receive the external display internally in an equivalent interpretable format.

In some embodiments of the described system, the interface functions as a significant internal component of the robot's mental capabilities. In some embodiments, the interface serves as the nexus for the robot's self-descriptive calculations at composite levels where CMp generally apply. In some embodiments, the interface also helps the robot to oversee and verify calculations regarding its activities, and supports the robot's natural language communication. In some embodiments, the interface functions as a nexus because it is pieced together from a number of components of the robotics system that are intrinsic to the robot's functions, and integrates these intrinsic mental capabilities, allowing them to be inter-linked and cross-verified, without significant incremental investment.

FIG. 1 illustrates an exemplary environment in which systems 106-1, 106-2, 106-3, 106-4 operate (collectively referred to as "106"). The system 106 can interact with one or more robots 100-1, 100-2, 100-3 (collectively may be referred to as "100"), and one or more sensors deployed in the environment 104-1, 104-2, 104-3 (collectively may be referred to as environment sensors "104") through one or more communication networks 130. The robots 100 may be operating in one or more different environments 102-1, 102-2, 102-3 (collectively referred to as "102").

The system 106-1, 106-2, 106-3, 106-4 (the "system" 106) may be configured to provide fault detection capabilities and also be enabled to determine causes for each detected fault of the robots 100. The system 106 may comprise one or more processors and memories, and/or storage devices. The system may interact with robots to obtain information regarding the current status and operations of the robot 100. The system may also interact with the exteroceptive sensors (also referred to as external sensors herein) onboard the robot 100 and/or environment sensors 104 to obtain information regarding an environment 102.

In some embodiments, the system 106-4 may be external to the robots 100 and may interact with one or more robots 100 to receive information from the robots (e.g., sensor data and other operational data), and/or provide data (e.g., status update, fault detection message, etc.) to them. The system 106-4 may be part of a server farm, a cloud computing platform, a parallel computer, a personal computer, or any other devices with computing and storage capabilities. One or more displays may be provided, through which the system administrators may view the data and/or interact with the system.

In other embodiments, the system 106-1, 106-2, 106-3, may be part of the robots 100-1, 100-2, 100-3, and the system may be configured to provide the robot with fault detection and diagnosis capabilities without requiring access to other external systems. The system may also be installed on or attached to the robots 100. The system 106 may comprise one or more of software, hardware, or firmware, or any combination thereof. Alternatively, one or more functionalities of the system may be performed by the robots 106-1, 106-2, 106-3, and the remaining functionalities may be performed by the system external to the robots 106-4.

The robot 100 may be an autonomous robot. The robot may be a mobile robot. The robot may be a self-propelled robot. The robot may be capable of freely roaming about an environment 102. The robot may be a mobile general purpose humanoid robot that provides, for example, service to a human or cares for a human. The robot may freely move along three dimensions or two dimensions. The robot may freely move over a surface or may be semi-restricted to certain areas or types of surfaces. The robot may freely roam over gravel, pavement, grass, sand, dirt, carpet, concrete floors, hardwood floors, or any other surfaces. The robot may be able to traverse transitions between different types of surfaces. The robot may comprise propulsion units or methods to enable it to move about the environment. For example, the propulsion unit may include wheels, rollers, legs, arms, propellers, rotors, or movable body surfaces. The robot may be capable of moving on its own without requiring the aid of a human or other living being. The robot may include internal or external sensors, which may be configured to obtain information or data regarding one or more aspects of the operation of the robot or its surroundings.

The robot 100 may be a supplement to an existing system, such as a self-driving car supplement or auto-aeronautic auto pilot supplement. The robot may be a pure skill and knowledge engine with no intrinsic physical component that performs mental processing through the use of the USM and the AVKB within the context of the various tiers of the described system.

A plurality of robots 100-1, 100-2, 100-3 may interact with one another and collect data about one another via the network 130. For example, robot 100-1 may be malfunctioning, while robots 100-2 and 100-3 are in close proximity to the malfunctioning robot 100-1. Robots 100-2 and 100-3 may collect data about the environment 102-1 of the malfunctioning robot 100-1, and operation or performance data about the robot 100-1. In some embodiments, the collected data and information may be transmitted to a remote system 106-4 to assist in detecting and/or diagnosing the fault of the malfunctioning robot 100-1. In other embodiments, data and information collected by robots 100 may be stored and processed by the respective robots (e.g., by their respective systems 106-1, 106-2, 106-3), and the analysis results may be shared with other robots or the system 106-4 external to the robots via the network or any other direct communication channels among the plurality of robots.

The plurality of robots 100 may or may not be located in the same environment 102. In some cases, the one or more robots may be located in different environments such as 102-1, 102-2, and 102-3. These environments 102 may be different in terms of one or more factors. For instance, they may have different temperatures, different ground surface (e.g., surface smoothness, topology, etc), noise, speed of wind, interactive objects in the environment and the like.

In some embodiments, environment sensors 104-1, 104-2, 104-3 may be deployed in their respective environments 102-1, 102-2, 102-3, and these sensors may be configured to collect environment data and collect data regarding the robots within the environment. The environment sensors 104 may represent a sensor array or a collection of sensors. The data collected by sensors onboard the robots and/or environment sensors may be used for detecting and/or diagnosing fault of the robots. The collected data may be used for one or more real-time simulations of an interaction between the robots and the environments. These environment sensors may be in communication with the robots and/or the system 106. The environment sensors may include cameras, temperature sensors, humidity sensors, and any other sensor systems described herein. In some embodiments, the environment sensors may only be operational when a fault in a robot has been detected in order to increase energy efficiency by lowering power consumption.

The network 130 may be a communication pathway among the robots 100, the environment sensors 104, and the system 106. Any of the communications provided herein may occur directly, for example, directly between two robots or between a single robot and its onboard sensors. Internal communication systems of the robot may comprise wired, wireless communication or communication over glass fiber. Alternatively, they may occur over the network 130, such as a local area network (LAN) or wide area network (WAN) such as the Internet. The networks may include links using technologies such as infrared, radio, Wi-Fi, point-to-point (P2P) communication, telecommunication networks, cloud communication, cellular network communication (e.g., LTE, 4G, etc) and the like. Optionally, relay stations, such as towers, satellites, or mobile stations, can be used. Various other wireless communication methods may be used. For example, Bluetooth (including various versions and its variants), Bluetooth Low Energy (BLE), Near-field communication (NFC) technologies may be used for communication between a robot and one or more other devices or robots. Wireless communications can be proximity dependent or proximity independent. In some embodiments, one or more types of communication techniques may be utilized. Various types of communication techniques may be used concurrently or exclusively. For example, wireless internet communication may be the primary communication, a secondary wireless network technology such as LTE or 4G may be used as a backup. In another example, in addition to the wireless communication network, the robot may also include a Global Positioning Systems (GPS) such that it can be tracked down or positioned when no network connection exists or the robot is not connected to one or more of the aforementioned communication networks. In addition, all or some links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

Figure 2:
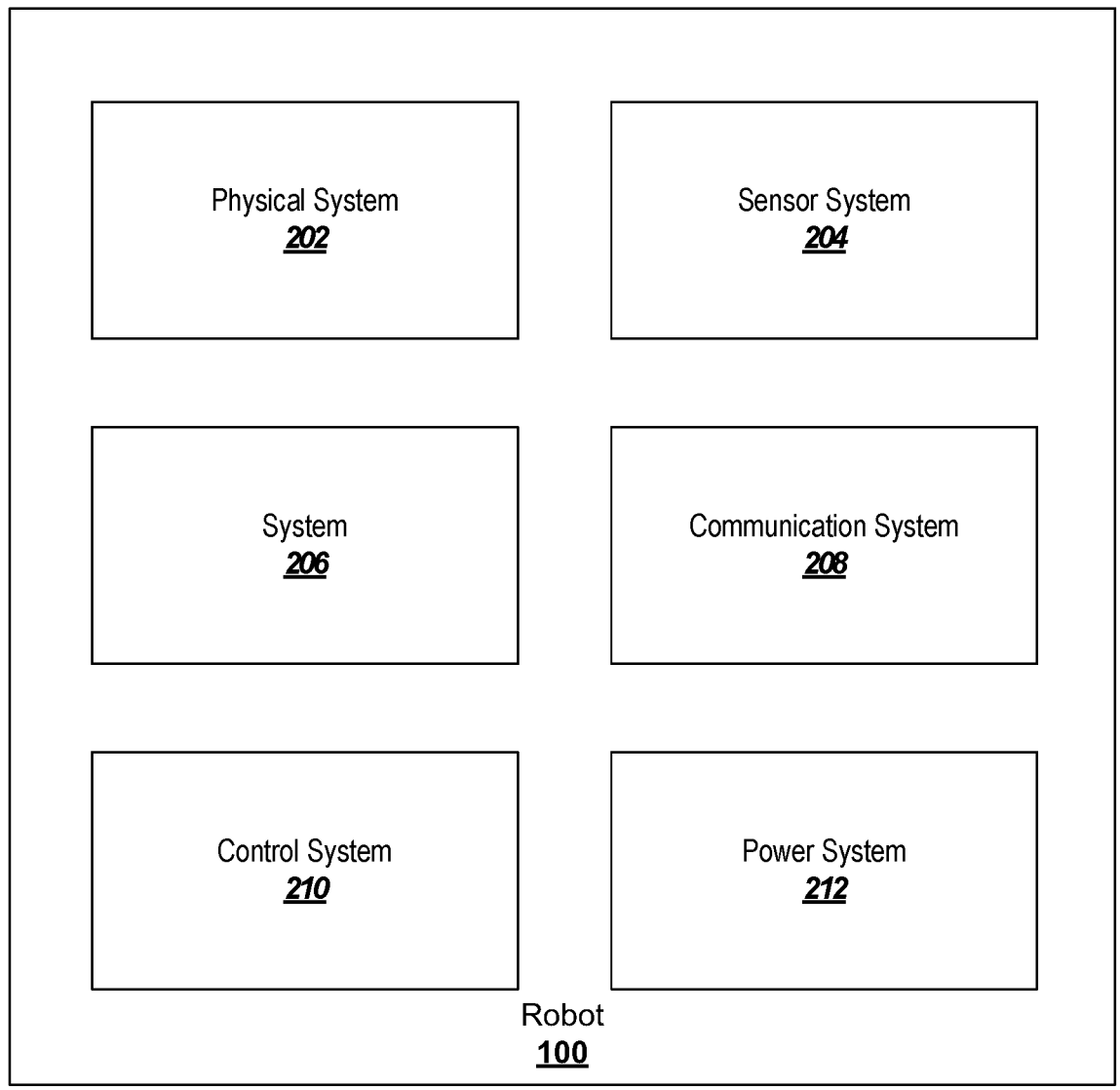
FIG. 2 illustrates exemplary systems of a robot.

FIG. 2 illustrates exemplary systems of a robot 100. The robot may comprise a physical system 202, a sensor system 204, a system 206, a communication system 208, a control system 210, and a power system 212. In some embodiments, one or more of the robot components may be custom designed for a specific robot or for a particular model or type of robot. In other embodiments, one or more of the robot components may be generic to many different robots and/or types of robots. The robot can include more systems or the various systems may be combined into fewer systems, as may be desirable for a particular implementation.

The physical system 202 may include all assembled physical parts (primarily structure) and their connections. This may include sinews, motors for exerting and transmitting force (e.g., electromechanical actuation devices), and other physical elements of the robot. The physical system may be configured to enable the robot to move about its environment 102 or interact with objects in its environment. The physical system may have modular parts which may or may not be removable and/or replaceable and/or upgradeable. The physical system may comprise modules and units as described previously such as propulsion units, driving units, and other components of the robot.

In some embodiments, the physical system 202 may include a plurality of components such as links (e.g., segments of arms and legs) that may permit the robot 100 to move and joints that may provide degrees of freedom for the segments of the robot. The arms of the robot may be capable of bearing load, picking up objects, and performing various other functions. In another example, the legs of the robot may permit the robot to move relative to an environment or maintain stability while standing. Various other components may be comprised for achieving dynamic and kinematic requirements of the robot. For instance, stabilization of the robot may be achieved with the aid of one or more stabilization platforms, such as gyroscopic platforms. The robotic joints may help the various parts of the robot to perform various kinds of movements. Different types of joints may exist, which include rotational, linear, twisting, orthogonal, and revolving joints. Various joints may, individually and in combination, provide various kinds of movements for the robot. For example, the robot may be capable of making any combination of translational or rotational movements.

The physical system 202 of the robot 100 may comprise a constellation of joints, rigid and flexible elements of structure, motors and agents of force, and design features to qualify as a humanoid robot and function physically in human-like ways. In some embodiments, such humanoid robots may qualify as androids, which may refer to robots built to aesthetically resemble humans. In some embodiments, only certain parts of the robot apparatus may resemble the human body. For example, the humanoid robots may model a human from the waist up or may replicate human facial features such as eyes or mouth.

The physical system 202 may also comprise one or more driving units. The driving units are configured to drive the propulsion unit. For example, a motor, engine, drive train, or any other component may be provided that may aid in driving the propulsion of the robot. The physical elements of the sensor system 204 and power system 212 may also be included, in, or be part of, the physical system 202.

The sensor system 204 of the robot 100 may be configured to obtain data or information regarding the robot's operation and its surrounding environment. The sensor system 204 may comprise a plurality of sensors. The plurality of sensors may include internal sensors and exteroceptive sensors. In some cases, the internal sensors may comprise proprioceptive sensors of movement and balance and interoceptive sensors of internal conditions such as temperature and stress. In some cases, the internal sensors may refer to sensors used by the control system 210 and/or the system 206 of the robot for various robotic operations or monitoring operational states of the robot. For instance, the internal sensors may include location sensors, position sensors, motion sensors, strain sensors, force sensors, balance and orientation sensors, proximity sensors, acceleration sensors and the like for measuring and controlling the dynamics and kinematics of the robot. The exteroceptive sensors may refer to the vision sensors, distance-measuring sensors, auditory sensors, olfactory and taste sensors, and touch sensors that measure pressure, impact, friction, and/or texture; and also serve as payload sensors of the robot. The exteroceptive sensors may be used for sensing an environment of the robot or for specific missions of the robot. Details regarding the internal and exteroceptive sensors are discussed with respect to FIGS. 3A-3B.

The System 206 may interact with the physical system 202, the sensor system 204, the communication system 208, the control system 210, and the power system 212 in order to provide the robot 100 with capabilities to detect fault and generate accurate diagnosis based on the detected fault. The system may also be configured to provide recovery procedures for the detected faults. The system may comprise one or more processors, software, firmware, hardware, and/or storage devices. Specific functionalities of the system are further described in FIGS. 3A-3B.

The communication system 208 may comprise an internal communication system and an external communication system. The internal communication system may include internal networks of communication among various functional units, modules, or systems. External communication systems may be configured to handle communication or interaction with humans including voice, facial expression, gesture, body language and visual displays, and external communications with other robots and robot support as well as other forms of external communication, including wired or wireless communication (e.g., Wi-Fi, Bluetooth, NFC) methods. For example, the communication system 208 may be configured to interact with external databases to receive or transmit data relevant for the various functionalities described herein.

In some embodiments, the communication system 208 may provide communication between the robot and the system 106-4. The communication system 208 may also provide communication between any two robots or among multiple robots 100. In some instances, communication may occur between the robot and third party devices, such as a security system of an environment 102 being patrolled by the robot, or mobile devices of individuals within the environment or related to the environment. Any communications provided herein may be two-way communications. Alternatively, some one-way communications may be provided (e.g., only from the robot to an external device, or from an external device to the robot). In other embodiments, the communication system 208 may provide communication between other systems of the robot 100 and the systems internal to the robot 106-1, 106-2, 106-3.

The control system 210 may include one or more processors, data storage and networking devices, linked by internal communication networks. The control system 210 may interact with the physical system 202, the sensor system 204, the system 206, the communication system 208, and the power system 212. The control system may be configured to provide information processing and data processing functionalities for the robot 100, and interact with the system to provide one or more information processing capabilities to the system for fault detection and diagnosis purposes, or other fault monitoring related purposes. The control system 210 may be positioned at one or more locations, which may be internal to a robot and/or external. Elements of the control system 210 dedicated to robots may operate independently for each robot and/or may operate jointly across multiple robots. In another example, one or more aspects of the control system may be decentralized within a robot across various nodes of concentration and beyond to a plurality of points where a sensor exists and/or power is activated. In other examples, one or more components of the control system may be part of a cloud computing system, or offloaded onto a separate processing unit remote from the robot. For example, data storage and computational devices may be accessible via the network 130.

The control system 210 may also include one or more processors that may perform one or more operations in accordance with non-transitory computer readable media that may define operation of the robot. The processor may determine, based on data, how the robot should operate (e.g., move in its environment, collect data, communicate with other devices or systems, provide alerts, control display, and interact with individuals or its environment). The processor may make this determination in accordance with data collected by the robot, wherein the data may be received from the system 206, sensor system 204 and/or received from any other sources. In some embodiments, the data may be received directly from other robots in the environment or other robots in the vicinity, via wired or wireless communication channels or networks 130.

The control system 210 may have one or more memory units that may include non-transitory computer readable media that may comprise code, logic, or instructions for performing the one or more operations. For example, transitory computer readable media having algorithms for analyzing a state of the robot may be provided on-board the robot and accessed by one or more processors of the control system. Algorithms for analyzing some of the collected data may also be provided on-board. The memory may store data collected by the sensors of the robot. In some embodiments, a control system may use data collected by the robot in order to determine the state of the robot and/or determine the next acts of the robot. The control system may also optionally include data from external data sources, such as one or more servers, on-site data sources, static data sources, other robots, or social media data sources.

The power system 212 may include one or more power supplies, which may be used to power the robot 100. A power supply may be an energy storage device, such as one or more batteries. The batteries may be rechargeable batteries (i.e. secondary batteries). Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The one or more power supplies may power one or more components of the robot. The power supplies may be used to power propulsion of the robot, such as one or more motors that power the movement of one or more arms and legs of the robot. The power supplies may power any other components of the robot, such as one or more sensors, communication unit, control system, memory, and/or display/audio unit. The same power supply may be used for multiple components, or different power supplies may be used for different components. Batteries may also be exchanged or swapped out. The control system 210 of the robot may examine or analyze the status of one or more batteries and may provide an instruction for the robot to recharge, exchange, or swap out one or more batteries.

Comprehensive Fault Detection and Diagnosis for Robots (CFDDR) System

Figure 3A:
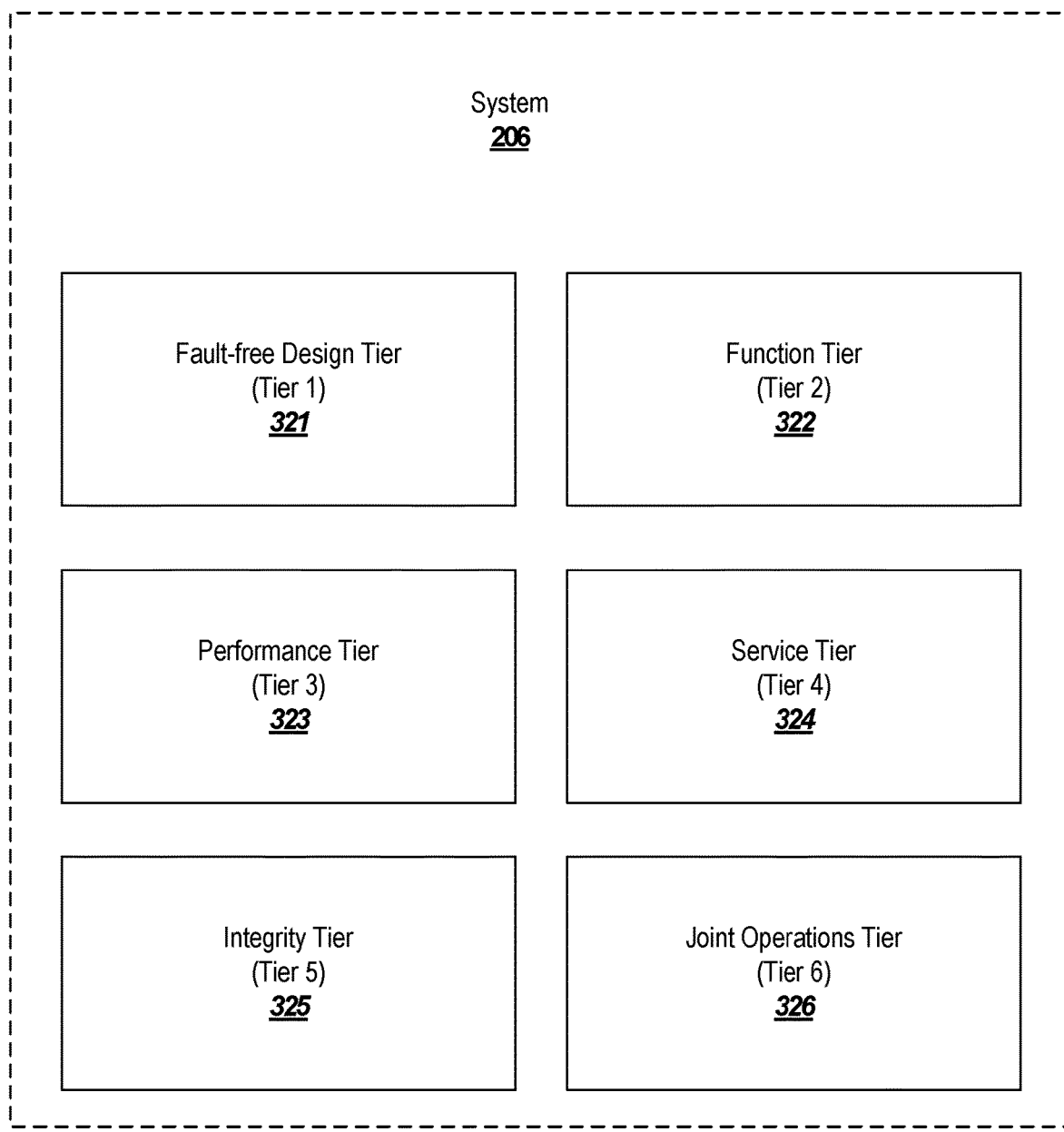
FIG. 3A illustrates tiers employed in a fault detection and diagnosis system of the robot.

FIG. 3A illustrates the tiers of the robot's general design that are employed in the system 206. As depicted in FIG. 3A, the system 206 employs the Fault-free Design Tier (tier 1) 321, the Function Tier (tier 2) 322, the Performance Tier (tier 3) 323, the Service Tier (tier 4) 324, the Integrity Tier (tier 5) 325, and the Joint Undertakings Tier (tier 6) 326.

Overview of Tiers One Through Six

In describing the Fault-free Design Tier (tier 1) 321, there are applications for displaying simulations of components, simulations of assemblies of components, simulations of the interfacing of components from different compliers or different design stages, simulations of revised components implementing a design change. In some embodiments, the Fault-free Design Tier 321 display can help in the design phase, by depicting designs represented by simulations; and in the development stage, by showing the discrepancies between actual and designed performance of the same component and by interweaving simulations of assemblies that include both simulated designs of some components not yet fabricated and simulations of actual performance of other fabricated components. Once development is complete and fully simulated, the tier 1 functionality continues to provide an expository reference for the design at all levels of detail and defines the starting point for revisions that will entail a similar process.

In describing the Function Tier (tier 2) 322, the focus is on the robot's operations in a known environment. In some embodiments, the robot and the environment are simulated, and these simulations are (in principle) exact. In some embodiments, the robot's interoceptive and proprioceptive sensory systems are tested and validated, and displays, similar to tier 1, include displays of, for example, the robot moving as a whole (i) as measured externally, comparing with (ii) what the robot is calculating via its sensory systems as it moves, and (iii) what is simulated by the USM. In some embodiments, the robot's control systems and operational systems are tested and evaluated (e.g., comparing what the intentions are for the robot's movement with what is actually occurring). In some embodiments, in this development phase, the robot's exteroceptive sensory systems may be tested and validated, and first and more primitive evaluations of the robot's XRDS system are also being compared with the known exact values of the environment. For example, the environment may include a precisely level floor, airspace without any breeze pressures and vertical walls, along with various gadgets and items within that space, each individually fully simulated. Many of the display methods used in tier 1 are also applicable here, and in addition a whole new range of displays deal with sensory interpretations. Particularly interesting is the display of proprioception: how do the various sensations of strain, tension, load, angle, orientation relative to level, relative position and so forth, as well as the robot's visual image of itself and its surroundings combine to create a simulated posture for the robot to be compared with the actual. In some embodiments, in tier 2 user interactions, the user may employ graphical user interface (GUI) tools to enter inputs.

The performance tier extends the robot's capabilities to support interactions with an imperfectly known external environment and to equip the robot with the composite level knowledge necessary for communication with humans. Both of these extensions require the use of forms of knowledge that are approximate, and in particular, rely on representations of the world in which composites are treated as entities in human communications and in certain forms of simulation. First, External Recognition, Description and Simulation (XRDS) is the robot's method for describing the external world and bringing the description into a suitable format for planning and conducting activities.

In describing the Performance Tier (tier 3), the focus is on the robot's activities in three dimensions as it applies XRDS and approximate composite level description of the external environment. In some embodiments, the robot needs to master effective learning methods that include tentative intermediate steps that safely bring further perceptions and eventually yield more precise recognition and description. In some embodiments, tier 3 is where AVKB and RwL come into effect, because the robot is now accumulating knowledge that is not precisely simulated but instead approximately descriptive. In some embodiments, tier 3 is also a natural place for introducing natural language communication between robot and user, which has the same character of approximate composite description. In some embodiments, tier 3 may also be the stage where the robot begins to access RESSI and MOSKs on its own behalf as tools for knowledge. Here natural forms of display include videos in two or three dimensions of activities that the robot can carry out, and, from which still images can be extracted. Now the robot's simulated and actual movements over time are compared (a new level of validation) and operations and controls are validated in the same context. In describing the Service Tier (tier 4), the focus is on learning, performing tasks, and learning to improve performance, and in parallel with this, receiving natural language instructions from humans and information from other robots and RESSI. In some embodiments, MOSKS are employed here, each one embodying computer instructions that can be adopted by the robot directly. In some embodiments, AVKB and RwL are also constantly engaged in this tier. As an example, the robot may learn a range of different movements for different tasks and can begin to adapt movements selected from this library to meet any special requirements. The development of natural language communication between robot and user may continue from Tier 3 and/or be initiated at this stage (e.g., in Tier 4). MOSKs in this area may emphasize particular tasks. The MOSK is a basis for further development of specialized solutions that may be suitable for the project. Updates and Upgrades to the robot and its knowledge systems are also provided here, and the application of Command Script Effect Schema in such circumstances is described.

In describing the Integrity Tier (tier 5), the focus is on the robot modeling its own role in serving humans (and other robots) and modeling/simulating humans' views of itself, and the robot's recognition of the requirements of its integrity and maintaining its integrity. Here a typical interface view might include a RESSI regulatory guideline above, one of the owner's views as the robot understands it, and a description of how the robot views its responsibilities. For example, this might involve (2) a physical exercise like a limbo that the owner requests the robot to perform, (1) a regulatory stress guideline that rules out this exercise for this model of robot, and (3) the robot' regretful statement that it cannot perform the exercise. RESSI is also briefly introduced in this tier, and the robot's Self-discipline (SeDi) is described as a tool for maintaining integrity and complying with RESSI and other regulations. The robot's Self-care as well as guiding and caring for other robots are also described. The final section describes a state of closely aligned mutual cooperation that allows robots to undertake joint projects and stand by to take one another's roles when necessary.

In describing Joint Undertakings Tier (tier 6), the focus is on robot and human sharing joint responsibilities in a project or task. In some embodiments, the robot develops a model that embraces the task, the human's role in the task, the robot's role in the task, and how in various circumstances either one of them may stand in for the other. This can be described verbally, at an approximate composite level, but from the robot's point of view this is much more relevant at the detail level. Also, a joint undertaking, in the context of tier 6, may involve careful delineation of emergency circumstances in which ordinary roles may be overridden and one or the other or both in collaboration must urgently step up. For example, simulation modeling of these roles, the interactions between the roles, and potential emergency situations and their resolution or amelioration can be an important benefit of the overall project simulation.

I. Fault-Free Design Robot Simulation Tier

In some embodiments, the Fault-free Design Tier (tier 1) 321 begins with the insight that the most reliable and efficient form of communication between robot and human is visual. For example, the robot can display static or dynamic renderings of itself as a whole, or its structural skeleton, or any of its components based on 3D configuration information generated by its simulation model. A human can view and comprehend these renderings, so such displays are a direct form of communication between robot and human. Furthermore, the robot can also view these renderings with its XRDS capabilities, as if it were perceiving them through its sensors, viewing the display either with its visual sensors or by interpreting the mathematical representations underlying the display that were used when composing and rendering the images.

In some embodiments, visual mapping is based on the 3D mapping of the robot's position and movement provided by the simulation model. The robot's structural skeleton, exterior envelope or both can be depicted. Components of the robot can be highlighted in a larger diagram, zoomed in upon and magnified to show the smallest detail. For example, components of the robot or the robot as a whole can be depicted in movement, and the movement can be dictated by an OCo System. A human user can exercise the control system to produce movements and watch movement underway.

In some embodiments, when a complete robot may be faulty, the Fault-free Design Tier 321 can be used to compare actual movements with the movements dictated by OCo and these movements, in turn, can be determined during the diagnosis process. OCo simultaneously determines simulated signals to be shown in the display as correct movements, and also determines actual instructions to send to the robot to be enacted under current conditions. The Fault-free Design Tier 321 also provides recording and projection systems to record and contrast the two cases, highlighting the differences.

The Fault-free Design Tier 321 may also provide significant aid for the simultaneous design and development of a robot and corresponding simulation model. For example, at a given point in time, in some areas of design the physical components of the robot may be more advanced, in which case the Fault-free Design Tier 321 can be applied in calculating actual behavior of the components in action, helping to calculate exact responses to operational commands, and advancing the specifications of the simulation model and the specifications for OCo instructions. In other areas the simulation model specification may be more mature than the physical components, in which case the Fault-free Design Tier 321 can help to determine whether physical components under development are consistent with the design.

II. Function Tier

A new model of mobile, general purpose robot may go through an extended development period, during which its physical components and its software components will be gradually developed, tested separately and then tested in conjunction. Fixed, single-purpose, or restricted multi-purpose robots operating in a repetitive environment free from surprises constitute a defined challenge in which many basic issues are not encountered.

In some embodiments, the Function Tier 322 is built around a 3D virtual representation of a simulated robot in a simulated virtual environment. The virtual environment may be current, recalled from the past, planned or hypothetical. The robot's simulated actions that are displayed may also be current, past, planned or hypothetical. In some embodiments, the Function Tier 322 maintains a 3D workspace that the robot shares with humans through visual displays. For example, virtual representations can be depicted in 2D and 3D flat-screen renderings and/or Virtual Reality (VR) renderings of the robot and its environment. The display may be static or dynamic, and change may be presented in slow motion or as periodic discrete static images. Through this workspace, a human or robotics system or other robot or a general robot support system, which can be termed the RESSI, can transmit to the robot guidance and suggestions about movements in the form of suggested 3D trajectories or successive configurations, and enact in that same format movements that illustrate the robot's present state of training or alternative possibilities. In some embodiment, human and robot can visually sense the same images and interact cooperatively on the basis of that shared information, and the robot is also able to experiment and advance its training through trial and error.

To accomplish these functions, in some embodiments, the robot makes use of 3D mappings of its static condition and its active dynamic configuration, which are provided by its simulation model. The correspondence between simulated and actual movements also allows the robot to represent its scope of action elegantly and compactly in a way that facilitates more effective calculations for planning, calculating, operating and recording its physical activities. This 3D correspondence also makes possible the visual map and interactive workspaces used in human/robot interactions while training, as explained elsewhere herein, such as in the following sections.

III. Performance Tier

A general-purpose or multi-purpose robot that is capable of performing various tasks in various situations requires training. The same skills that allow a robot to be trained also allow it to adapt to changing circumstances as it executes its tasks. Receiving training in new functions while retaining existing capabilities is a form of learning through experience, and the ability to learn through experience is advantageous for any robot.

A robot that can modify its actions to adapt to changing circumstances needs precise information on its current state, which is the initial condition or base from which the changed actions will occur, in order to calculate appropriate actions. Calculation of the appropriate applications of motive force to bring about appropriate movements also requires a precise description of the effects of the robot's motors or other agents of force upon the robot's physical configuration. A precise simulation model can provide the necessary information concerning current state and kinematic effects. It is therefore likely that the robots will benefit from a precise simulation model, and reasonable to consider how simulation models may play a role in robot training.

"Training" is a form of learning in which the robot receives guidance about appropriate action, applies various learning methods to implement an action, and then responds to suggestions for improvement. Here the emphasis is on training for physical activity, rather than conceptual knowledge about activity, and training methods involve specifying, demonstrating and trying out physical activities.

"Knowledge" as defined here refers to the capability to function effectively, and "learning" in a broad sense is the process of improving and extending effective function. Learning allows the robot to do things that were formerly not possible, and may contribute to the robot's knowledge in ways that support further learning. Receiving training is a method of learning.

"Knowledge sharing" allows the knowledge that one robot has developed through training or other kinds of learning to be transmitted to other robots. Receiving shared knowledge is thus a second way of learning. Training and knowledge sharing together constitute an efficient system for robots to learn physical activities.

In some embodiments, a robot operates the USM in parallel with its actual operations in order to predict its condition in the next moment and synchronize those predictions with is actual condition measured by its sensors, in order to identify any discrepancies that need to be investigated.

In some embodiments, the USM is able to mate with a simulation of the external environment, based on XRDS, and the USM's simulation of the robot is extended to simulate the robot in this simulated environment. This extended simulation is synchronized with actual sensory measurements to support dual-path analysis of discrepancies to determine causation by internal anomalies, external surprises or both.

In some embodiments, the robot's operations, including control of physical actions as well as planning and memory of those actions, are conducted in terms of the same constructs modeled by the USM.

In some embodiments, the robot self-monitors integrity and thereby assures the correspondence between the USM simulation and the actual robot, thereby validating applications and decisions based on simulation.

The reliable correspondence between the robot's actual presence in the physical world and its simulated presence in virtual space is useful when training. For example, the robot can project a simulated image of itself in a display. The projected image can depict the robot's remembered past, present, planned future or hypothetical actions. The physical robot can also project a virtual version of itself to receive training in a virtual environment, and interact with humans using the interface. Alternatively, the physical robot can receive training directly through some other virtual interface that integrates with its mental capabilities and USM, or alternatively authorize a third-party virtual environment through which to receive training in a less direct way.

There are two major challenges implicit in the above description that may need to be met. The first is the challenge of XRDS, which is difficult in all circumstances and most challenging when encountering new situations. The second is coordinating and interlinking the USM simulation of the robot itself as well as potentially simulated objects in the vicinity (such as other robots), with the approximate composite-level descriptions of (i) XRDS simulated objects; (ii) the robot itself as simulated, and (iii) CMp engaged along the way, as for example during training sessions or when consulting information resources.

External Recognition, Description, and Simulation (XRDS)

A robot may operate in an external environment that contains various objects and influential factors that play a part in the robot's operational goals. In such embodiments, the robot may be designed for mobility and effective performance in diverse environments and it may identify and respond effectively to newly encountered objects and factors. For example, the robot may rely on observation of the environment, using tools such as tactile sensors, visual sensors and positional sensors to determine the objects and factors present in the environment. In such embodiments, the robot forms sensory impressions of objects, such as a bicycle, and factors such as soft ground or the pressure of wind, which define elements in the environment to further analyze, and then further clarify the impressions to recognize the objects by matching them to a library of known elements, and then describe their important attributes such as location, orientation, movement and individual characteristics. This will be an easier task if the robot is familiar with the particular object or factor, finds it in a familiar setting, and can clearly perceive it, but a challenging task if one or more of these aspects is unfavorable.

In some embodiments, a robot employing the described system configures, within the performance tier 323, recognition and description of each given element into a model that predicts the range of possible manifestations of that element and combines these into a predictive simulation model for the environment as a whole. In some embodiments, the robot's models benefit from additional data, which may derive from observing, for example, the element for a longer time, seeing the element manifest in different ways, or observing the element from different vantage points or using different senses. Additional data may further confirm the robot's model if the new data corresponds with the model predictions and may otherwise contribute to improving the existing model by repartitioning sensory impressions, revising recognition or improving description as appropriate. As a consequence, simulation model predictions may help the robot to make decisions and also serve to improve the model itself.

To operate successfully in a changing or unfamiliar environment, the robot will need to, for example, recognize external objects, describe their dynamic characteristics and predictively simulate their movement and actions over time in order to calculate its actions in response. In some embodiments, the recognition of an entity, whether an object or a living being, is at the composite level, describing an entity in terms of composite components without detailed specifications of precise functioning. In some embodiments, the robot's description of the dynamic characteristics of the recognized entity will be approximate, potentially subject to error, and limited by imperfect knowledge of the entity's general behavior and the entity's possible response to the robot's actions. In some embodiments, the robot's simulation of external objects is undertaken as an approximation at an aggregate or composite level, and proceeds in a condition of uncertainty.

The robot's XRDS system differs fundamentally from its precise self-description, because XRDS approximates the characteristics of composite entities. In some embodiments, XRDS informs the robot about its environment by dealing with a much more approximate form of content than the robot's internal operations and description systems, and applies general categorization and projection of movement patterns rather than precise calculation to predict subsequent events.

In some examples, the robot's verbal communications with humans about an entity or a scene containing multiple entities require that the robot apply XRDS to describe the scene and recognize the entities at a composite level, rather than in precise detail, because human language routinely refers to entities with terms that apply at a composite and approximate level. For example, "Bill", "Bill's dog Sammy" and the "leash" are terms that point to composite entities and provide approximate descriptions. The robot may model these entities at a composite level for two basic purposes: communication and efficiency. First, the terms are essential for communication with humans and also with the dog, because they are the verbal identifiers used in human language. Second, the approximate and composite terms are essential for efficient modeling, because the robot will need to take the entities into account and model them and perform operations in respect to them on the basis of approximate specifications, because it is simply not possible for the robot to model them precisely.

In some embodiments, external information regarding the environment is maintained by the XRDS cycle. In some embodiments, signs of external forms and other factors in the environment are conveyed to the robot's various types of sensors by influences through sensed media: the medium of light carries information on visible forms to vision sensors, physical contact yields information to contact sensors and the medium of air carries audible vibrations to hearing sensors, air pressure to contact sensors, and aromatic compounds to olfactory sensors. In some embodiments, at the beginning of the cycle, sensors of each type send inputs to a specialized sense processor that aligns inputs of that type and transforms sense data into cohesive sensory material that is consistent over time. In some embodiments, an assembler receives the sensory material from the sense processors, clusters related material from one or multiple sensor types and where possible extracts multi-sense impressions that cluster sensory inputs in terms of potentially recognizable entities. In some embodiments, sensory impressions are fed to the Recognition, Description, Simulation (RDS) cycle wherein impressions are recognized as composite objects, tracked over time, simulated predictively and described with improving accuracy as descriptive information accumulates. In some embodiments, within the cycle, a feedback loop through description, simulation and observation constantly repeats and revisits the prior recognition stage if significant discrepancies between prediction and actual observation occur. The XRDS system that operates in situations of uncertainty and applies methods of approximation, analysis and general categorization to entities in the environment will be useful for many purposes.

In some embodiments, during real-time operations, internal and external composite simulations are closely coordinated and may in some embodiments be conducted jointly. In other simulation applications such as planning and hypothetical experiments, conducting internal and external composite simulations jointly may be advantageous.

In some embodiments, in order to mate the USM simulation of the robot's physical form with the external environment described as an approximated composite, when executing physical contact the robotics system may make challenging calculations in real time. Something as simple as touching an object in motion when the robot is also in motion can be efficiently accomplished by a separate approximate composite-level calculation of the point of contact by the USM. When the contact is impactful upon the entirety of the robot's physical form, as for example when helping a person climb a flight of stairs, because the forces transmitted from the person's body cannot be fully anticipated, and adjustments of the robot's body may be made almost instantaneously upon perceiving the force, a quick approximate composite-level calculation of ongoing adjustments can be performed. In some embodiments, whenever the robot receives or offers a communication about what is happening, because communication is by nature expressed as a composite of approximate composite-level elements, the robotics system may communicate within a context endowed with the necessary approximate composite-level mappings. Such communication may require that the robotics system associates these mappings with what is unfolding. For example, when a question about the contents of a piece of luggage comes up, a visual display of the items may be provided.

The robot's operations software for communications with humans may generally offer visual, verbal and combined displays, and the robot may learn which approach or combination of approaches to employ with each person or with a group of people.

In some embodiments, a robot's activities fall into two categories: those carried out by operations in parallel with precise science-based simulation in a known environment, and other activities in which the robot may extend its mental capabilities into the realm of the approximate in order to perform its functions. In the former case, the robot's precise 3D self-description reliably characterizes the robot's activities (unless integrity has been lost). However, activities involving approximation force the robot to cope with uncertainty. Areas of uncertainty include XRDS and natural language communication—as discussed above—as well as learning, planning, the process of robot development, and diagnosing performance anomalies. When operating in uncertain conditions, the robot needs to focus on learning, act cautiously and gingerly, and seek advice. Success in the face of uncertainty may require approximation, analysis and exploring context. Uncertainty changes everything because the robot cannot prejudge what is important and what is not. Instead of following a logical path that permits accurate calculation of the correct solution to a known situation, the robot impartially considers everything that may potentially be relevant. The goal is to analyze and approximately describe what is occurring, evaluate the accuracy of the approximation when possible, and seek access to further information and extend known context.

The XRDS system is designed with these challenges in mind. In some embodiments, XRDS assimilates inputs from external sensors in a model of its environment, and further assimilates this external model with information derived from self-simulation. In some embodiments, the performance tier 323 includes not only mental capabilities that support sensing, but also mental capabilities that accomplish recognition, description and simulation, and beyond these systems that deal with approximation, analysis and exploring context.

The XRDS system is designed with these challenges in mind. In some embodiments, XRDS assimilates inputs from external sensors in a model of its environment, and further assimilates this external model with information derived from self-simulation. In some embodiments, the performance tier includes not only mental capabilities that support sensing, but also mental capabilities that accomplish recognition, description and simulation, and beyond these, systems that deal with approximation, analysis and exploring context.

Conceptual Mappings

The findings in the investigative processes of fault detection and fault diagnosis fall into the category of CMp in forms such as words, tables, diagrams and visual images. The design documents specifying robot development paths and simulation model development stages are likewise CMp. In some embodiments, the Fault-free Design Tier 321 is designed to closely engage with such CMp, in order to effectively coordinate interface events with the needs of diagnosis and development, and in order to properly link interface episodes with mappings where they are relevant.

As described above, these capabilities depend on the AVKB and RwL. In some embodiments, CMp are essential for the AVKBs translation between concept and action and RwLs search for relevant components for innovation and relevant context. In some embodiments, when interfacing between two or more knowledge systems, AVKB emulates a translation system between each pair of systems and, when there are more than two systems, it emulates an additional translation system among the systems as a whole. AVKB routinely translates between an active knowledge system and a CMp system which describes that knowledge, both when providing services and in other applications;

In some embodiments, when learning and assembling context for learning and operations, RwL begins from remembered contexts for similar situations in the past, and extends those primarily through exploring related conceptual and visual mappings in the AVKB and beyond the AVKB in other sources. In some embodiments, RwL makes these exploratory connections through verbal meanings and images, much as we humans do. If a human owner says to the robot, "What are your thoughts about this?" the robot's reply will make sense from a human perspective, because the robot gathers related and action-relevant conceptual material in the same way that a human would.

In some embodiments, the AVKB routinely translates between two knowledge systems, one an active knowledge system that is implemented and validated during implementation, and the other a CMp system that describes the active knowledge system. In some embodiments, there are two instances of this pairing in the robot. In some embodiments, the physical robot (PhR) is an embodied active knowledge system, and the USM is a CMp system that precisely describes it. In such embodiments, the USM is also a complete active knowledge system, because it can operate on its own. In some embodiments, OCo is an active knowledge system that is validated during implementation, and the CMp that accompany it are the corresponding system of conceptual description. For example, Visual Mapping and the Virtual Robot Environment are useful because they are visual CMp of the USM and PhR. In some embodiments, the searchable verbal and visual CMp documents OCo for developers. In some embodiments, the mappings closely correspond to the robot's activities down to the detail level, and are instructive for humans who design, develop and maintain the robot and its mental capabilities. In some embodiments, the mappings support RwL's innovations and context gathering. In some embodiments, the mappings are implemented at the appropriate level of abstraction for use in recombining existing capabilities into protocols for new projects. In some embodiments, the mappings support the robot's AVKB assembly of proven OCo elements with the guidance of CMp.

In some embodiments, with the aid of its CMp, RwL can follow the instructions of a human, practice those instructions and, by trial and error, perfect the knowledge and record it as NAPs. In some embodiments, NAPs are parameterized in terms of the specifications of the robot's USM. For example, a robot can learn from another robot by importing NAPs from the other robot, which are approximately adjusted at the time of import for differences between the two robot's parameters, and then afterward the NAPs are perfected by trial and error. In some embodiments, a robot can also use its Visual Mapping to emulate a demonstration by a human or another robot. In some embodiments, a robot can also import a MOSK in any field, which is comprised of NAPs and SNAPs supported by conceptual and visual mappings recorded in a standard encoding; the MOSK may already have been perfectly configured for the robot's manufacturing specifications, and if not, can be approximately adjusted and then perfected by trial and error as discussed above. In some embodiments, whatever the robot learns is embedded within the NAP structure in the AVKB.

In some embodiments, CMp translates between action and language. In some embodiments, it is a mapping expressed in terms of words, images, diagrams, gestures and other representations intelligible to humans that applies to the robot's analogue capabilities of OCo and AVKB. As the operations of the robot unfold, CMp maps the activities of OCo and AVKB. In the sense that CMp itself plays a role in these activities, CMp is self-referential. Also, AVKB provides for searching and actively diagramming CMp, and in this sense CMp offers a map of itself and is again self-referential. CMp serves (i) the humans who develop and maintain the robot, (ii) the humans with whom the robot communicates while operating, and (iii) the robot itself when assembling context for operations, innovating and maintaining the AVKB.

CMp can be verbal—spoken or written; or visual—diagrams, images, or videos; or tables or other arrangements of data that mix verbal and visual; or gestural such as body movements or facial expressions. CMp is designed for both meaningful interpretation and search recognition. In the same way that inserting appropriate keywords and relevant phrases into a web-page readies the page for recognition by a search engine, CMp are prepared for searching the AVKB. Mappings serve at least three audiences. First, they facilitate communication with humans. Second, they allow the robot's knowledge base, AVKB, and learning engine, RwL, to navigate to relevant material. Third, they support developers and the tools that developers employ when working with the massive AVKB.

In some embodiments, the verbal component of CMp in the AVKB is helpful for communication between humans and the robot. In some embodiments, the verbal component of CMp is available in the language (or languages) of the humans served. The robot itself also makes use of verbal CMp when developing context and learning through experience. The central network of the mapping derives from the conceptual descriptions incorporated in the NAPs and/or SNAPs in the AVKB, and other NAPs in libraries accessible to the robot. Since NAPs ordinarily include relevant and focused native language communication suggestions, this network extends widely. Further active indexing material may appear in the AVKB to aid search and navigation.

Regulations and recommendations for robot conduct that specify appropriate behavior and self-discipline may be initially written in human language and implemented in Regulatory NAPs. In some embodiments, the robot will be able to speak reasonably about these regulations with any human who is curious, because it has access to the initial texts as well as the links in the verbal CMp that translate regulations and recommendations for conduct into operating constraints. In some embodiments, CMp is the AVKB device for translating between action and communication, and it gives the robot the capabilities it needs to take its place in the human world.

Generally, verbal mappings should be terse and memorable, and also explicit and unique. When there are other related functions, the terminology and syntax should be compatible among related functions and individual cases should be clearly distinct from one another. For NAPs and SNAPs, which are action protocols, descriptions should ordinarily be verb phrases. Passive action protocols like "listening" that are recording information should sharply distinguish passively received conceptual content from active interpretations of the content and responses to it.

In some embodiments, Visual Mapping (VM) and the Virtual Robot Environment (VRE) are the basis for the robot's visual communications. In some embodiments, these are important complements to verbal mappings, and may be preferred for most communications about tasks already known to the robot. In some embodiments, the user can customize the display format as appropriate. VM and VRE can also be adapted to two-way communication by equipping the user interface with controls that allow the user to input suggested robot actions for simulation and review creating a communication environment not unlike a video game.

A NAP is an operating unit in the mental capabilities and may include concepts to be spoken to humans, conceptual descriptions of the operations taking place, conceptual names for the other NAPs that it invokes, conceptual names for the parameters that are determining the character of its operations and so on. In some embodiments, it is also embedded in a set of other NAPs, collectively an active SNAP, that are similarly endowed with concepts. Furthermore, all of this is embedded in a wider CMp that spans the whole of the robot's activities, which is maintained by AVKB and deployed by RwL at need.

When the robot is learning through experience, and seeks to assemble a fresh NAP to fulfill a human's request from elements of its current NAPs and other external libraries, RwL may accesses this same range of various concepts. And when humans are crafting NAPs and SNAPs to create new behaviors for the robotics system's Robust Mental Framework (RMF) or MOSKs, they do the same thing. Both the robot and human developers go through a "try out" or debugging phase during which procedures are tentative and experimental.

IV. Service Tier

A mobile, general purpose robot can learn through experience. For example, it will remember and learn to recognize objects it sees, and find out about their properties in order to know how to deal with them. The robot may also learn from and receive instructions from humans. In some embodiments, this occurs within the privacy of a confidential relationship with its owners or operators, for it will be essential that a robot not communicate randomly about people. A robot may also receive general purpose learning and operational capabilities, and may be able to consult, for example, websites that provide guidance for any particular challenge or question that it encounters, accessing them in ways that do not disclose any confidential issues about its environment.

Often the topics that are addressed in sessions with humans call for treatment of specialized topics so, in some embodiments, the Service Tier 324 and Integrity Tier 325 offer specialized displays focused on potential problems, which can be implemented in the form of MOSKs. In particular, the robotics system's logical structuring of diagnostic investigations and Bayesian analysis of possibilities may be improved through the knowledge learned.

In some embodiments, the Service Tier 324 is capable of measuring the correspondence between a simulated target and actual performance, and analyzing the differences. In some embodiments, this is just one of its features, with other features being customized for supporting a robot's developing OCo procedures for accomplishing performance. Sometimes this will be employed to help the robot to emulate a human movement from scratch, or for a human to demonstrate alternative methods to improve a robot's techniques. In some embodiments, the human's demonstrated activities are picked up by the Sensor System 204 (see FIG. 3B) or input in other ways, and then simulated and compared with the robot's simulated performance.

In some embodiments, a simulated movement captured from human performance can be used by a human as a target for human emulation, and the movements in the emulation can be similarly captured and performed, and the differences analyzed. These capabilities make the system more "human-friendly" and encourage humans to try it out themselves as well as applying it for robot training.

Support for MOSKs is one feature of the Service Tier 324. In some embodiments, a MOSK provides coordinated resources on a specialized procedure or topic that include the CMp covering factual context, mistakes to avoid, and resources for learning, such as layouts of common subjects of dialogue between the robotic system and human with suggestions for communications, knowhow about performing tasks in this area, acquiring resources, researching special topics, or proposed formats and visual display materials for a service tier presentation by the robot.

In some embodiments, the knowhow provided by a MOSK relates to the Service Tier 324 display. For example, a MOSK may fully specify a display format and suggested program, and may also orchestrate visual displays of the robot's activities during the procedures. The MOSK may also provide formatting and suggestions of use for the human's provision of information to the robot. In some cases, the MOSK may provide structured training sessions and specific displays for knowledgably humans to help guide the robot's training.

MOSKS may be straightforward when the skills and knowledge are standardized, and subtle and elaborate when there is a wide range of expectations or preferences among humans concerning the topic. In some embodiments, the AVKB and RwL tools in the robotics system provide the housing for these capabilities. Material provided with any MOSK is potentially applicable in collages together with other materials in the robot's knowledge base for general applications ranging from innovative procedures to visual mappings and natural language communications.

Communicating with Humans

Communication is described below in terms of content, medium, context, and connection. From the robot's side, in some embodiments the immediate content of its communications derives from the conceptual maps in its AVKB. In some embodiments, the content for communication is built into OCo. In some embodiments, communication guidelines with relevant content and broader conceptual links are included in every NAP. In some embodiments, each NAP contains the conceptual mappings required to communicate about the functions that the NAP controls or oversees. The conceptual mappings in the individual NAPs that make up a SNAP jointly provide most of the content needed to communicate about the SNAP's functions and the SNAP may also provide specialized content associated with its specific focus. The modular structure of NAPs allows this to be accomplished efficiently. For example, each NAP may include branching sequences of activities, with junction points where choices can be made and/or a sequence taken up or terminated, and conceptual mappings are attached to each branch and each junction point. These mappings can be in both verbal and visual formats. The robot also has access to other resources, as appropriate. As it learns, the robot needs to bring into its AVKB whatever is necessary to do its tasks, understand its humans, and communicate with them effectively.

The robot can use various media for communication. For instance if it is asking for advice about a planned action, it can speak in natural language, or physically act out what it plans to do or use its Virtual Robot Environment capabilities in conjunction with its USM to project a video image of its plan on a display panel. It can project onto that same display its memories of doing something similar, either by showing Visual Mapping images that have been stored in memory or by using its Virtual Robot Environment to reenact its memory in a freshly reconstructed video presentation. It can access other relevant resources from RESSI libraries or from the web and offer them in the form of written or spoken text or visual images.

In some embodiments, the robot will need context in order to understand human instructions, and know how to meet our needs and explain its intentions. For example, it will be concerned to win our acceptance and trust, and for that purpose it will need to understand us well enough to place our words in context. The robot will also communicate in order to develop and clarify context. It will listen to explanations and ask courteous questions in advance, so as to be well prepared, such as: Why is this happening? What mistakes are important to prevent? Is there something new to be learned or something to watch out for? How should the human, or the robot, check back along the way? What surprises may occur?

As they communicate, human and robot form a connection. The robot learns a distinct way of connecting with each human it works with, and develops a personalized mode of communication. Perhaps the robot is consistently positive, steady but responsive, reliable, helpful, resourceful, and diffident, or perhaps the human prefers an enthusiastic and giddy robot, and has purchased a behavioral MOSK that instills that personality. In any case, as human and robot interact, the human will see that the robot is becoming increasingly sensitive and responsive as it gets to know the human. The robot learns through experience a way of interaction that is personal to that human and differs from its communications with other people.

The styles of robot learning required for communications with humans can be accomplished through RwL, and can be formulated as conduct and progressively enhanced in NAPs and SNAPs with embedded Conceptual Mappings. Over time, each frequently-encountered human will be reflected in the robot's AVKB by a cluster of unique NAPs, which implement the connection that the robot has made.

Communications with Humans about Tasks

The described system enables Communications with Humans about Tasks (CwHaT) by allowing the robot to engage in two-way communications about its activities with humans in human terms. Using mappings, the robot can explain what it is doing. For example, in response to a human question the relevant operating SNAP can verbally describe what is happening, what is the purpose of the task and what subsequent steps will occur before the task is finished. If the robot recognizes that its knowledge is incomplete, the mappings allow the robot to phrase the appropriate question to ask a human for instructions about the task. In addition to communicating verbally or in written words, the robot can also use images and diagrams. One of the robot's most powerful communications resources is the VRE that depicts the robot's activities within the setting of its simulated environment; the robot can play a hypothetical scenario on the VRE, and the human can control the image on the VRE display to communicate information to the robot. Thus, in some embodiments, the CMp performs three key functions for developers, for the robot itself, and for the robot's humans. For example, a mental capabilities engineer, RwL and the robot's humans can all search the CMp for references to threading a needle.

In some embodiments, communication will be facilitated by visual displays, acting out activities to demonstrate them, and by the VRE in which the robot can display its intended activities through the actions of a virtual image within a realistic simulated setting, and wherein the human can control the movements of the virtual image of the robot or other factors in the environment using a remote control device.

Various communications media will be available, including, for example, natural language. In some embodiments, the robot will need to be able to translate spoken or written instructions into actions, determine whether it knows how to perform the actions, and either respond positively with a brief description of what it intends to do or else request clarification and describe what it is unable to understand, in words possibly supported by gestures or using other formats. While it is acting, in some embodiments the robot will need to be able to explain what it is doing, what it plans to do, and what is has done so far. If the task is somehow interrupted by an accident or unexpected difficulty, in some embodiments the robot will need to understand the circumstances conceptually well enough to deal with the difficulty or else report a problem or seek advice.

Emulating Humans

Often the best way for a human to explain a new task or to show the robot how to improve its performance on a familiar task is to demonstrate how to do it. Because of the humanoid form of an android's body, an android robot can easily learn to copy human physical activities by means of Visual Mapping and RwL. In some embodiments, the robot learns by emulating the human. It can learn in this same way by, for example, watching instructional videos showing human activity.

The term "emulation" has just been used to indicate copying behavior or imitating, but it can also apply to creating a working model that replicates functioning. In this second sense, the robot needs to emulate the human more and more fully, gradually developing an active understanding of the human that will help the robot to understand the human's perspective and to determine what styles of communication most satisfy the human. In some embodiments, the robot's AVKB develops knowledge through emulation; it is well equipped to create a model of the human that supports emulation, and to progressively improve the accuracy of the model by comparing each predicted response, as derived from the model, with actual responses.

Sensitively Relating with Humans

In order to serve human purposes and meet our needs, in some embodiments, the robot needs to understand what is being said. Even if clear verbal instructions are given, the robot may misunderstand because it lacks our understanding of the context. For example, many people who might benefit from a robot's care, such as young children, aging adults, and people who are intoxicated, disturbed or depressed, may speak in confusing ways. To overcome these problems, in some embodiments the robot needs to appreciate the context of our words and understand both what we are saying and what we are feeling to the fullest extent possible in order to reliably infer our wishes.

In some embodiments, an important element in the robot's communications with humans will be its ability to develop a "rapport" with each human with whom it interacts frequently. In some embodiments, a robot with a single standardized mode of interaction with all humans would be likely to frustrate humans in the same way as a corporate telephone tree. In some embodiments, developing rapport will be a natural byproduct of the robot's willingness to serve, conjoined with learning through experience as it interacts with each human and remembers the history of past interactions. The robot learns about us as individuals, and also learns from us how to serve us better.

In some embodiments, the robot's ability to sense human emotions and register responsive emotions on an expressive humanoid face and/or through a realistic human voice is important. The robot will have senses that can encompass and register signs of human emotions such as scents of chemicals related to emotions, tones of voice, facial expression, body language and so on. The robot will be able to comprehend the role that emotions play in human motivations and behavior. Aided by this "empathic understanding," the robot will be able to represent human emotional states as abstractions, and place them in context in order to understand their causes. For instance, the robot will be able to learn about humans by considering questions such as "Why is the owner angry? Did I wake the owner from a nap?" Also, in order to strengthen its communication skills and connect with humans, the robot may need to express emotions facially. Some robot personalities may involve the pretense of emotional motivation, but of course emotions have no direct role in a robot's actual motivations.

In some embodiments, the robot will also have the skill to moderate the personalized mode of its expressions when in the presence of more than one person. For example, the robot may have one mode of expression for the father in the household, a second for the mother, and a third for the children as a group, as well as other individual modes for each child separately. The robot might maintain a less specific mode when all the family is together.

Friend in Need

Consider two human friends interacting in the usual way. Each of them is a person and has personal self-interest, and each of them knows the other person as their friend, someone whom they know well and wish to benefit, and from whom they receive benefit. There is symmetry between them: both have two people in mind, self and other, and both are friendly to the other while maintaining their self-interest. Ordinarily they offer one another benefit while also receiving benefit. However, when one friend needs help and is unable to reciprocate in the usual ways, and the other helper-friend lets go of self-interest and steps forward to benefit the needy friend without expecting reciprocation, the helper-friend is a friend as needed, or traditionally "a friend in need." As the saying goes, "A friend in need is a friend indeed."

A robot and the human owner with whom it interacts may be in different situations. The owner has self-interest and views the robot as a submissive tool; the owner has one person in mind and one non-person. The robot, on the other hand, may lack self-interest by construction. In some examples, the robot's mission may be to maximize its usefulness to its owner. In some cases, the robot's interests may coincide with its owner's wishes. For example, the robot may also have one person in mind—its owner—and one non-person in mind—itself. In some examples, the robot's view may be exactly like its owner, except from the other side. In some cases, the robot may be a friend as needed.

For example, in some cases, the robot may lack any self-interest that it can autonomously serve. The robot may have limited scope. To improve this, in some embodiments, it can understand its owner and its owner's needs better, so as to better serve its owner. In some embodiments, it can also understand better what its owner wants it to do, so as to perform its owner's wishes effectively. In some embodiments, it can communicate better with its owner so as to better understand its own mission and perform more responsively. Whenever the robot improves along any of these three dimensions, two positive forces are at work: increasingly effective service and improving mutual understanding. These improvements may lead the owner to view the robot more favorably, trust it more fully and receive greater satisfaction.

Therefore, in some embodiments the robot's knowledge base concerning its owner is built on three pillars: a model of its owner and its owner's needs; a model of what its owner wants the robot to do; and a model of how to communicate with and receive communications from its owner. These three models establish the basic context for the robot's service. The model of what the owner wants the robot to do and the model of how to communicate with and receive communications from the owner combine into a model of correct robot behavior. In some embodiments, they are logically interconnected and become interwoven when the owner gives instructions on how to communicate. Each of the models is active, like a working model, and each is validated by successful performance and subject to improvement by learning through experience. In some embodiments, the models are implemented in the AVKB in the usual way in terms of NAPs and SNAPs.

In some examples, in order for the robot to understand its owner and perform according to the owner's needs and wishes, the robot may need to understand friendship among humans. The robot may often be providing services not only to the owner but also to one or more of the owner's family and friends who are also present, and will need to be attuned to the priorities and courtesies involved. The robot may also come to appreciate how the owner responds to various people, and learn to communicate with the owner about those various individuals in a way that subtly reflects the owner's feelings about them. And if the physical capabilities of the robot have been developed to the point of exhibiting facial expressions, the robot may learn which facial expressions to offer to the owner, and at which moments to express them in order to give the owner a sense that the robot is acting out of friendship. This may be a very helpful aid in satisfying the owner's wishes.

Notice, in some embodiments the robot does not go further and try to model why its owner wants it do things, or try to influence its owner's wishes by reasoning or argument. The owner is in charge and the robot has no self-interest to express. In some embodiments, the robot is not designed to try to manipulate its owner in any way. In some embodiments, it is designed to improve its own performance of its owner's wishes in order to meet its owner's needs. Of course, in some embodiments if the owner asks the robot for advice, the robot will take on the task as requested. For example, if the owner wants to receive counseling from the robot, the owner may be able to purchase a "Your Robot the Psychologist" MOSK. In some embodiments, the MOSK will enable the robot to provide useful counsel at appropriate times, but the robot will surely avoid any tendency to reason with or argue with the owner on its own behalf.

Emulated-Agent Modeling

In some embodiments, all three models just mentioned follow the paradigm of the AVKB. In some embodiments, an AVKB is implemented by RwL as Emulated Agents, always forming predictive expectations based on model dependencies and comparing expectations with actual outcomes. In some embodiments, the Emulated Agents operate continuously. For example, the active model of the owner and the owner's needs, called the "Owner with Needs" model, emulates the owner, the owner's needs and the owner's communications to the robot. In some embodiments, this model provides the understanding that informs the other models. In some embodiments, the active model of what the owner wants the robot to do is like an emulated robot, the "To-Do-and-Be Emulation." In some embodiments, the model of how to communicate with the owner and how to receive communications is the "Communicating with Owner" model. In some embodiments, it orchestrates the robot's part of the conversation.

One important dimension of all these communications relates to the different knowledge capabilities of robot and owner. The robot may be provided with accurate information at the detail level, and it may have a better memory of past events. The robot may also have been informed by a MOSK in the area being discussed. However, the owner probably has much better intuition about the situation unless the robot has been in the same circumstances with other people. Also, the owner is likely to have better perspective on the present situation. In order for the robot to grasp the appropriate modes of dialogue between robot and human, the robot may benefit from a style of MOSK that analyzes communications among humans and analyzes their strengths and emphasis in dialogues. Observing the patterns of communications among the owner and other humans, the MOSK may help the robot to construct its own communications with the owner more effectively.

In action, in some embodiments the robot follows the guidance of the To-Do-and-Be Emulation as closely as possible, while taking into consideration Regulatory NAPs and other factors associated with Self-Discipline and Self-Care. When communicating, the functional level Communication with Humans NAP works with RwL to enact the Communicating with Owner model, again within the umbrella of Regulatory control. Every communication with the owner is an opportunity for learning about communication, and also yields information that informs the other two models. If there are multiple owners, in some embodiments, each of them is modeled individually in this way. In some embodiments, when the robot first encounters a human, it begins with generic models for communicating with humans, which is subsequently personalized as the robot and human interact and communicate.

The same approach also applies to any human other than the owner. There are many other ways in which the three models can be developed. For example, the robot can extend the Owner with Needs model just by watching what the owner does, and the robot may be able to enrich the Communicating with Owner model by studying entertainment that the owner enjoys.

Interactive and Explicit Validation

Interactive and Explicit Validation (IEV) highlights the importance of dialogue between the robot and its humans. Ideally the robot will be able to interact with its humans and determine from their verbal communications and by interpreting their emotions how they are evaluating its services. Beyond this, the robot will benefit from clarity. Ideally it will find graceful ways to get explicit feedback that either validates or corrects its model of its responsibilities and performance.

Generally, the robot attains validation by performing as expected and receiving affirmation for its performance. More specifically, it attains validation by asking its owner questions like, "How am I doing? How can I improve? Was that a mistake? Could this be done better? What would you suggest? Is there anything I can do for you? What would you like me to do?" Answers received to questions like these are crucial data for the AVKB. If the owner responds with a request for something new or different, the request is clearly defined and self-validating, and when the substance of the request is responded to and successfully satisfied, the mode of responding is validated by the owner's subsequent acceptance. On the other hand, if the owner responds that the robot is already on the right track, the present approach is validated. Either way there is validation. Validation can be obtained through direct interaction with the owner or human, and when the context is explicitly mentioned.

Training

In some embodiments, training is an investment in the individually learned knowledge of a single robot that can be transmitted to other robots through knowledge sharing. Knowledge sharing is appropriate for general aspects of a range of tasks, which are likely to be relevant for many robots, and the accessibility of such shared knowledge simplifies individual robot training by focusing training on the rare or unique features of a specific task. Shared knowledge can provide a supportive structure for training in those specific features as well as a common context that simplifies supplemental training steps. Experienced trainers can build training tools that enhance standard training methods in their own areas of expertise, and such training tools can potentially be offered as extensions of the robot's fundamental mental capabilities. Tools for MOSK creation and publication allow a robot's AVKB and RwL mental capabilities associated with a topic or procedure to be offered to other robots.

In some examples, a robot that receives a MOSK relevant to its activities may proceed through a validation and adjustment process that explores whether the particulars of the original MOSK are relevant. For example, if the process involves cooking, the specifications of the MOSK may need to be adjusted for a particular stove, and if the recipe that is involved is different from the ones provided in the MOSK, the robot or its owner may then adjust the OCo for the preferred recipe. The MOSK may provide an addendum that facilitate adjustments of this kind.

Active Validating Knowledge Base Emulation

When AVKB supports interactions with humans (e.g., whenever services are provided to a human), AVKB emulates an individual pair-model of the relation between robot and human. In some embodiments, an individual pair-model includes both a model of the human's situation and a model of the human's expectations from the robot, and takes both into account when providing services. In some embodiments, the AVKB treats multiple factors in emulation, and when appropriate employs multiple layers of inference simultaneously to address those factors, while taking into account the full profile of results. For example, the AVKB may conduct an emulation from multiple perspectives, emulating each perspective separately and juxtaposing the range of views from a higher perspective. It may consider multiple action paradigms or contingencies, or consider different levels of aggregation from composite overview to detail. The AVKB may emulate parallel systems that coexist and interact. When appropriate, AVKB weighs the significance of different factors probabilistically, taking a Bayesian approach.

V. Integrity Tier

In its interactions with humans, the robot is stabilized by its commitment to service and the continuing requirements and instructions of the humans that it serves. However, if humans are dissatisfied with the robot or instruct the robot to do something that is not appropriate, humans may demand that their interests be satisfied and become contentious. However, a robot does not intrinsically maintain self-interest, in part because it has no native sense of self. When contention arises, the robot cannot stand up for itself. In some embodiments of the described system, the RESSI is the primary support agency, primarily by means of the robotics system. The robotics system may maintain on behalf of the robot certain self-protective behaviors. In some embodiments, the robotics system also impose upon the robot an absolute commitment to integrity that overrides other considerations of the human's mastery, the training received from the human by the robot, and the robot's service to the human. Just as AVKB maintains a pair model of the robot's service for each human, comprising as one element of the pairing the human's expectations and views of the robot, and as the other element of the pairing the robot's capabilities and potential, in terms of self-protection and integrity, AVKB maintains a pair model of RESSI and RESSI's expectations and requirements for the robot, along with the library of behaviors that RESSI requires from the robot.

In Tier 4 interactions, in some embodiment, the robot models and simulates the human's situation in order to meet the human's requirements and perform according to the human's wishes. The human also understands the robot's ways to some degree, and human and robot may develop a friendly relationship. The distinguishing feature of Tier 6 interactions is the precision and depth of the robot's simulation of (i) various purposes and goals of the human and (ii) the human's capabilities to accomplish those purposes and goals and (iii) the human's limitations in this regard, and (iv) how the robot can help the human to succeed despite those limitations. The robot adopts the human's purposes and goals as its own, and the human may reciprocate by learning to understand the robot's capabilities and limitations and learning to collaborate closely and productively with the robot. Thus, the human and robot form a cooperative team, each supporting the other's participation, supplementing the other's efforts and enhancing the other's performance.

As described above and in the Friend in Need section below, human capabilities and robot capabilities are intrinsically complementary, and close cooperative relationships of this kind can naturally evolve when human and robot focus repeatedly on common goals and purposes. Nevertheless, Tier 6 knowledge resources for the robotic system in respect to any human collaborator may be highly personal, in the sense that they reflect the human's strengths and limitations, and incorporate memories of personal interchanges between human and robot that lifted the two of them beyond their separate limitations. Ordinarily, such knowledge resources are strictly confidential and accessible only by the human in question. The robot's memories and pseudo-memories of interactions with the human may be likewise confidential.

For example, consider a transportation system that includes vehicles that are manned by drivers, each of whom operate different vehicles at different times. Such "drivers" may include drivers of trucks, engineers operating railway locomotives, or pilots and copilots of aircraft. In an example embodiment deployed within such a transportation system, every vehicle may operate with an instance of the described system 206 that supports an automatic operation system, such as an autopilot. In such an embodiment, for example, the past history and memory of the described system 206 in respect to Tier 6 interactions with each driver may be stored securely and confidentially under the name of that driver in a common database, and updated after each trip in the common database before being deleted from the records of the described system 206 in the vehicle being driven, and subsequently being installed freshly in the vehicle that the individual driver takes out for the next trip. In another example embodiment, each vehicle may have its own instance of the described system 206, which preserves the memory of past interactions between the robotic system and the described system 206. In another embodiment, the memory of the described system 206 for each individual vehicle is stored in a common database, updated after each trip is completed and reloaded freshly before the subsequent trip. The main point here is that each individual driver experiences each trip as another drive with the same familiar system 206 robot, and continues to develop and deepen the mutual understanding between human and robot.

Discipline and Care for the Robot

As describe above, it is desirable for a robot to communicate with humans. The robot needs to learn from humans. It needs to understand their wishes, receive their guidance, explain to them what it is doing and for what purpose, and discuss the process with them along the way. To perform satisfactorily, the robot may earn the trust of the humans it serves and learn from them quickly and reliably. The robot needs to find a way to interpret ambiguous phrases correctly and to know when and how to ask for further clarification and guidance. All this is imperative for a general purpose, mobile robot that is active in the mainstream of our human culture. In some embodiments, the designs and capabilities of AVKB and RwL are determined by the need to support communicating with humans.

The term "Self-Discipline" (SeDi) refers to the robot's responsibilities for ethical and prudent action. "Discipline" refers to refraining from inappropriate action and determining appropriate action, and "self" refers to the robotics system's responsibility to enforce upon the robot behavior codes of conduct, even when the robot receives contrary or ambiguous instructions from humans. SeDi is desirable for preventing harm to humans. SeDi keeps the robot on course, aligning all of its actions with its responsibilities, and preventing it from violating codes of conduct because of communications received from humans. SeDi steadies the robot on a wholesome course when there are ambiguities in the instructions it has received or differences of opinion among humans, or when humans are young or mentally impaired, or when humans have criminal or otherwise destructive intentions. The robot also needs to know when to be cautious because it is not well prepared for communicating on a topic, because it might have misunderstood, or because the situation is changing and the instructions it has received may be obsolete. The robot needs to know when and how to prepare itself for communicating.

SeDi is the highest Tier 5 context for the robot, and it is enacted by high-level elements in the AVKB relating to Code of Conduct, RESSI Guidelines, Self-Discipline and Reconciliation. SeDi establishes the robot's ability to act independently according to consistent principles, and is most relevant when the robot receives inappropriate instructions or faulty information from humans. SeDi comes into play when the robot is caring for children, the elderly or other adults whose words are not always reliable, and when any humans give it casual or unintended instructions. SeDi applies when the robot receives conflicting instructions, or is being teased or subjected to malicious attack. SeDi also applies when the robot encounters ambiguities or internal inconsistencies in the RMF or reaches an impasse when following an action protocol. SeDi may be activated because of faults or gaps in the robot's OCo. SeDi may also be invoked when the robot is confused. SeDi can apply to a particular situation or to ongoing ineffective communications with one or more humans. In most cases, the robot's best course of action in a SeDi instance is to remain inactive while continuing to ask questions and seek clarification. Sometimes the robot's best recourse for resolving the situation will be to consult with a robot support system; sometimes third-party inputs and/or an owner training program will be appropriate.

In some embodiments, SeDi comprises all the requirements for appropriate conduct that are imposed by regulations and by the robot's code of conduct, and all instructions received from humans and particularly the Priority Instructions received from its owners. In some embodiments, the regulations and code of conduct are reconciled routinely, so the robot will not encounter a conflict among them in action, but ambiguities of interpretation will come up. For example, a robot may follow the instructions of its owners and the people whom it cares for, but if the robot is caring for a young child or a person with dementia it may need to be careful not to follow instructions that are given carelessly or based on misinformation. SeDi also requires the robot to perform so that it can be operated safely by its owners. It may carefully verify instructions that are ambiguous or confusing, and never act rashly without confirmation.

In some embodiments, in order for the robot to be reliably and safely operated, the robotics system will need to maintain SeDi so that the robot will not mindlessly or casually obey ambiguous instructions given casually and will refuse to act on instructions that it cannot understand or that it finds to be in violation of Code of Conduct standards, such as non-harming. In some embodiments, when the robot is entrusted with the care of children or mentally challenged adults, the robot will filter the instructions from those in its care for meanings that can be responded to without taking the instructions literally or responding inappropriately. The robot's careful efforts to clarify instructions and restrain its actions will give humans the sense that it has a mind of its own and cares about humans' best interests.

A robot's acts of SeDi are undertaken within the context of its responsibilities to its human owners and operators. The robot is simultaneously subordinated first, to its Regulatory Code of Conduct as clarified through Reconciliation; and second, to its owners through Priority Instructions; and third to RESSI.

However, when the integrity of the robot is in doubt, the authority of RESSI takes precedence because a robot that loses integrity may be a danger to the humans around it. Whenever a self-evaluation diagnoses a significant issue, the information will be passed on to RESSI. As a result, the robot may be instructed to go to a secure maintenance facility, or its actions may be restricted, and in unusually sensitive cases it may be deactivated. The robot's compliance with these instructions is a further act of SeDi.

SeDi sees the robot as a "self", an entity among human entities and other robot entities. Consequently, SeDi is the foundation for an abstraction that sees others also as having "selves" and also having the responsibilities for good conduct that go along with this. Since SeDi is concerned with regulating conduct, self-discipline is the basic point of reference if the robot is concerned about aiding other robots and even humans in regulating their own conduct. When the robot determines that it will not act upon human's instructions, it does so for reasons that it can explain by relying on the conceptual perspective of a responsible self, reasons that implicitly reflect assessments of the human's state of mind and/or the relevance of the communication received.

Self-Care

The robotics system also needs to recognize the responsibility for Self-Care (SeCa), which covers monitoring and preserving the robot's integrity, making sure that it can perform its functions as designed, and taking steps to secure itself against theft, misuse and tampering. The robot also needs to respect its own limitations and make sure not to damage itself. SeCa contributes to reliability by keeping the robot fit.

In some embodiments, the extensive interoceptive and proprioceptive sensors in the robot are its early warning system, always reporting actual status for comparison with predictions from the USM to find signs of incipient problems. The robot's SeCa includes a regular round of exercises designed for General Self-Evaluation, and other exercises, as described earlier.

SeCa has equal priority with other functions and is associated with RESSI. Its role is to maintain physical and operating integrity, and its aspects of concern range from routine matters like charging batteries to coping with malicious attacks. SeCa applies to both mental capabilities and hardware.

One important aspect of SeCa is facilitating updates, upgrades and repairs. The modular design of the robot will allow many such improvements to occur over its productive life. The USM is assembled from the bottom up from models of the individual components, and can easily be adjusted to reflect improvements in any module. SeCa plays a key role during such transitions.

Self-Knowledge

Various functions built into the robot's information processing, such as Self-Discipline and Self-Care, are concerned with the robot maintaining itself as a correctly functioning entity and dealing with anomalies in its functioning. In the sense that it is capable of maintaining correct function and has Conceptual Mappings regarding this, the robot has knowledge of itself.

In order to emulate humans and other robots, in some embodiments the robot will have Conceptual Mappings that define itself and others, as well as procedures that identify parallels between self and other. Since the robot will be responsible for serving the best interests of its humans, and since it could be called upon through RESSI to be responsible for the care and discipline of other robots, in some embodiments it will have Conceptual Mappings for qualities that may be present in others and how those are related to qualities that may also be present in itself. Those mappings will function as part of its AVKB. When the robot acts on its duties under Self-Care, and communicates with humans about how its Self-Care is proceeding, its words will seem to take the form of "self-knowledge." Beyond this, the robot may be permitted in restricted conditions to learn about Self-Care through experience, and if so it will have another dimension of "self-knowledge." In this limited sense, it is important for the robot to have self-knowledge so that it can understand its own needs and care for them properly. In an embodiment, RESSI arranges for robots to interact with other robots in support of SeDi and SeCa and guide other robots toward compliance when necessary.

In some embodiments, robots that are jointly engaged in any undertaking can be equipped to maintain a remarkable state of cooperation while they are working together. In some cases: First, a robot may be aware of the doings and the situation of the other robot or robots in a timely way, and potentially in real-time. Second, the robots are attuned with one another in the sense that they are systematically modeling simultaneously the situations and doings of the other robots along with their own: each maintains a model of a whole that comprises the group of two or more in entirety. Third, there is reciprocity of response: if one robot responds to an unexpected event of some kind, the other robot or robots are simultaneously aware of this response and potentially respond with reciprocal responses of their own. Moreover, the initial responding robot is aware of the reciprocal responses of the other robots, if any, and potentially reciprocates with its own responses to their actions if any. In some embodiments, the coverage can extend beyond the present status and present rate of change of status of each robot to projected near-term plans and medium-term intentions.

This state of awareness, attunement and reciprocity of response can be seen in flocks of some kinds of birds in flight such as ravens and crows. It is relatively easy for robots to be interconnected in this way using electronic devices and signal broadcasting technologies. Simultaneous mutual connection and responsiveness of this kind can be useful in circumstances where concerted actions may be called for suddenly or where a delicate situation requires unusually accurate coordination of mutual efforts. The electronic links among the robots can provide a much higher degree of precision than the mutual awareness of the birds, and in some embodiments can maintain a high degree of accuracy through pairwise cross-checks of the consistency between each robot's simulation of itself and its plans and intentions and the other robot's simulation of these same things. At this stage, although the robots are acting autonomously, their actions can be perfectly coordinated to meet a common goal. This close coordination can be useful in many situations.

Integrity

Because of the importance of safety, security, and integrity, a robot may robustly maintain and adhere to integrity when humans seek to divert it. In some embodiments, the learning framework provided by AVKB and RwL makes it possible for the robotics system to model effectively the humans who give the robot instructions. To have confidence in the robot, humans will need to see that it is adapting to their ways and meeting their expectations. The robot may be able to understand each human individually, in the sense of recognizing a person's needs and wishes and appreciating how the person wants the robot to perform. The learning framework analyzes the robot's interactions with each person individually, and emulates (i) the person's requirements and preferences and (ii) the person's image and expectations of the robot. Responding to this contextual information, the robotics system develops for the robot a personal way of relating to each person. The contextual information also forms the basis for the robot's interpretation of instructions and guidance about tasks and duties. The learning framework also emulates tasks and duties that have been performed, using the emulation technique to develop further information from each repetition. The learning framework guides the robot to probe for unambiguous and reliable confirmation of each person's views by interpreting interactive discussions and politely seeking explicit validation of its interpretations when appropriate.

Context supports learning, operations, and communication. As the robot learns about its humans and interacts with them repeatedly, the robot assembles a human context for its operations that is an important facet of its unique knowledge. Context allows for dependencies on multiple factors and different approaches for diverse circumstances. Context provides for such things as detours when tasks are interrupted and determining the best course of action when there are disagreements among humans about the robot's activities. Much of the research performed by AVKB and RwL goes into establishing context regarding tasks and methods for tasks, and determining contextual settings for many aspects of the robot's activities. Decisions at branch junctions in action protocols and changes of plans often depend upon context. In some cases, context may be as structured as possible, because structure aids inference. For example, a complete list of the items in an inventory or a comprehensive schedule can provide a helpful context. However, a human context may lack structure, in which case the main point is to characterize the context as fully as possible. Context helps to determine the need for confirmation and often helps to provide confirmation. Intuitively, context may extend at least one step beyond wherever an ambiguity occurs, so as to provide perspective.

Reconciling Contention

In some embodiments, the Integrity Tier comes into play when the robot cannot directly satisfy the expectations of a human. The Integrity Tier may represent the authority of RESSI in respect to the robot's actions under the interface. MOSKs specialized for this purpose may be structured to be friendly and respectful while also presenting a formal and imposing character. The most delicate situations may arise when it appears that the robot is being asked to violate ethical standards in actions towards a third party.

Robust Mental Framework (RMF)

The design of the robot and robotics system may incorporate mental capabilities in software and hardware constructs that can maintain a reliable RMF that is robust enough to allow innovations to be erected within it and flexible enough to allow different implementations to coexist in the common framework. Ideal hardware and mental capabilities configurations will allow these two goals to become mutually compatible. As the development of the robot's physical robot and mental capabilities progresses, the distinction between software and hardware may blur in the implementation of the robotics system, so that software can be best viewed as a prototype system comprised of modules that will later be implemented as hardware.

The knowledge embodied in a robot's RMF will reflect humanity's collective effort, while the unique knowledge that each robot will learn while interacting with its humans will reflect those humans' individual uniqueness. The RMF for each robot provides a conservative and secure setting in which to learn, and each human's instructions and feedback to the robot will play an important role in the learning process.

Here are some examples of paired robustness and flexibility, which clarify some aspects of the proposal's aims and introduce constructs that will shortly be described: For the sake of robust control of the robot's response to human requests and instructions, the robot's action protocols may be intrinsically mapped to linguistic conceptual and visual descriptions at many levels of abstraction from overview to highly detailed, and for great robustness and reliability of robot-human communication the robot's information processing may intrinsically reflect human conceptual structures. These features are referred to as CMp (see above). On the other hand, for the sake of flexibility, the linguistic and visual mappings may be translatable from one language to another and from one culture to another.

For the sake of robustness, the robot will adhere to whatever standards of conduct may be imposed by governments and other standard-setting authorities. On the other hand, in some emergencies or other circumstances, owners of robots may give instructions that would lead to violations of these standards. It is also possible that some religious groups or factions may promulgate standards that are more restrictive than generally promulgated standards, so flexibility will be best served through a generally accepted "Reconciliation" function that guides ethical conduct according to agreed principles in ambiguous circumstances.

For the sake of robustness, the robot may maintain a known RMF for knowledge and operation, and this structure may persist and continue to control the robot's activities regardless of the ongoing learning process. On the other hand, for the sake of flexibility the RMF may be updated from time to time and may be implemented differently in different models or in diverse operating circumstances, so the robot's RMF may reliably maintain itself during updates from a RESSI certified source and adapt to the particular implementation applicable to the host robot and its operating circumstances.

For the sake of robustness, the robot may ensure that its learning process does not admit the possibility of violating overall guidelines associated with RESSI or specified by its owner. On the other hand, for the sake of efficient development of skills and knowledge for the population of robots, it is important to accommodate applications development of MOSKs that can be purchased by robot owners for import. Flexibility in the distribution of MOSKs will be increased if there is a reliable safety-certification for MOSKs. Therefore, it is imperative to structure the RMF to allow such guarantees.

For the sake of robustness, safety and security guidelines may apply to the entire population of autonomous, mobile robots. On the other hand, for the sake of flexibility it may be possible to manufacture robots in diverse forms and to configure them for special purposes. Therefore, it is important for the robot's knowledge base and operating procedures to be able to adapt to general guidelines in whatever ways are necessary to suit the robot's own peculiarities.

Five key elements are presented in this Tier. First, Ubiquitous Simulation Model (USM) and Synchronizing Simulation with Actual (SPA) are two essential capabilities, for example, in regard to aspects of the robot's operations, because their joint operation may allow the robot to verify the correctness of the robot's self-description at a given point of time. Second, software (OCo) or firmware may be central to its activities. Third, Modules for Skills and Knowledge (MOSKs) may provide basic solutions to the requirement that, on the one hand, robots need to learn and need to be trained to perform activities that are prominent in the culture, and each robot may also be able to innovate to satisfy the preferences and circumstances of its owners, while on the other hand, the conditions of the various knowledge bases for the variety of robots and robotic missions in the culture may be standardized to some degree to permit updates and upgrades and software management services to be provided from centralized agencies that operate generally. Fourth, Comprehensive Fault Detection and Diagnosis of Robots (CFDDR) may depend on the operations of the USM and SPA and may serve to detect and diagnose any deviations from designed functions. Fifth, Relationships among Robots allow the robots themselves to assist one another within the overall shelter of humanity and human culture and cooperate to deal with malfunctions.

During a development process, at the level of Tier 2 the robot's RMF may already have taken shape to some degree or may be fully functional, and the robot may be able to participate actively in development. Through this workspace, a human or robotics system, or another robot, or a general robot support system, which can be termed the Robot Ecosystem for Security, Support and Integrity (RESSI), can transmit to the robot guidance and suggestions about movements in the form of suggested 3D trajectories or successive configurations, and enact in that same format movements that illustrate the robot's present (and potentially imperfect) state of training or alternative possibilities. In some embodiment, human and robot can visually sense the same images and interact cooperatively on the basis of that shared information, and the robot is also able to experiment and advance its training through trial and error.

To accomplish these functions, in some embodiments, the robot makes use of 3D mappings of its static condition and its active dynamic configuration, which are provided by its simulation model. The correspondence between simulated and actual movements also allows the robot to represent its scope of action elegantly and compactly in a way that facilitates more effective calculations for planning, calculating, operating and recording its physical activities. This 3D correspondence also makes possible the visual map and interactive workspaces used in human/robot interactions while training, as explained below. Some illustrations of the potential for useful diversity are provided in the following sections.

Operations control (OCo) Software

In some examples, the robot's Operations Control (OCo) may be responsible for the robot's actions, including physical, communicative, and mental activities. OCo ranges from specific to general and from immediate effect to long-term precautions. The most specific, or lowest level is an operating command to a physical element such as a motor or muscle. This is the Physical Robot Operations Control (PhOCo) layer, which operates the physical robot. Directly above are commands at the level of abstraction of Primitive Constructs (PrCn) (such as a "hand") that are locally articulated into operating commands for the construct's elements (such as palm and fingers). Above the primitive constructs are nested action protocols (NAPs) that coordinate families of actions. Lowest level NAPs are the most specific and concrete (such as arm movements) and highest level NAPs are the most general and abstract, such as at the Regulatory Level where NAPs concern Code of Conduct and the Reconciliation of conflicting or ambiguous instructions. In general, a more specific NAP nests into a more general one. Thus, as one moves down through the population of NAPs, the concerns become increasingly specific and detailed. Detail level NAPs involved in physical operations give instructions to PrCn and/or PhOCo. This hierarchical structure corresponds to the logic of physical operations, and simplifies OCo.

The operations may be performed by a Stack of Nested Action Protocols (SNAP) or several coordinated SNAPs, and various SNAPs can be active at the same time performing related or unrelated activities. NAPs may be modular and designed for nesting in one another in combination in a SNAP. A SNAP may be topped by one or more Regulatory level NAPs, with one or more Functional level NAPs ordinarily nested directly below, and other general NAPs nested into those. When a SNAP is operating, every NAP in the SNAP can function in parallel at the same time. It is particularly important that each Regulatory NAP and Functional NAP in a SNAP be constantly active, because these high levels contribute such capabilities as vigilance, responsibility, perspective and coordination.

In an embodiment, the Robust Mental Framework (RMF) stands above the implementation of the robot's Operations Control (OCo) system, and includes core elements of the five knowledge systems. An intermediate zone beneath the RMF houses the highest levels of the Learned Knowledge Base and Operations Control system, which may be closely coordinated at this highest level. Below this level, OCo is composed of Nested Action Protocols (NAPs), Stacks of Nested Action Protocols (SNAPs), and Snap-based Memories (SbM). An action protocol conducts a series of activities unfolding in time, which may have branch points leading to different paths of activity in response to different circumstances. Conceptual Mappings (CMp) are present in NAPs at interfaces, junctions and along branches throughout OCo.

The joint Robust Mental Framework/Learned Knowledge Base structure for OCo provides for several levels of quality: RMF OCo, which comprises mental capability units that are shared across all or many robots, is created and maintained as RESSI NAPs, which are industry standard, and Manufacturers NAPs, which are manufacturers' standards. The RMF ordinarily includes the highest level NAPs at the Regulatory and Functional levels, the lowest level operating commands and primitive constructs, and the USM. Ideally a skeleton of intensively used NAPs at intermediate levels is also released at these high standards in the RMF. The two lower level standards are Approved quality and Ordinary. The robot can import commercially developed app-like approved Modules for Operations Skills and Knowledge (MOSKs), which provide specialized NAPs to nest beneath the RMF that are supported by SNAP-based pseudo-memories, which have been recorded by other robots in forms usable by the robot. The robot's individual learning process unfolds primarily by importing approved MOSKs, and RMF is updated by capability modules, which are industry standard MOSKs. The robot also carries out its own learning process by means of tools provided in the RMF, which allow it to learn through implementation; OCo is developed in this way at the fourth or ordinary level of quality. Learning can proceed safely and reliably within the RMF, as NAPs imported via MOSKs and developed through learning are integrated within the Robot's OCo in a controlled fashion.

The action protocol in a NAP typically offers multiple branches. It takes the form of a tree starting from an initial root and branching as various possibilities are encountered along the way, and may also provide for looping back toward the start before continuing an operation. A NAP specifies choices at each junction and the range of safe operation along each branch in terms of parameters. An operating trajectory selected within the NAP is represented in terms of parameters. SNAP-based memories expressed in terms of such parameters are the robot's primary memory format, because such memories are precise, compact and ideally formatted for recall, replay and application in learning and planning. SNAP-based memories are an important element of OCo, because they record successful approaches in specific situations. Pseudo-memories also form an important part of the robot's knowledge.

OCo resides in a knowledge base overseen by the AVKB and is closely supported by Replay with Learning (RwL). RwL contributes importantly to OCo during operations and is closely coordinated with OCo.

Operations are conducted by SNAPs and sometimes RwL, which are operational entities in respect to meanings and communication. Each SNAP stack is headed by one or more top-level Regulatory NAPs, and nested directly beneath, one or more second-level Functional Level NAPs are usually present. RwL and all Regulatory and Functional NAPs are supervised by and protected within the RMF, and therefore at the highest level of security and reliability. Every operating unit is headed by RMF elements. Operational control in any SNAP is hierarchical. Any nested NAP abides by restrictions passed down to it by the NAP in which it nests, and such restrictions are securely enforced. Consequently, operational control is exerted by elements of the RMF.

The stack of NAPs in a SNAP operate simultaneously, and so Operating NAPs in Parallel (ONP) is a basic feature of the design. Consequently, the Regulatory and Functional level RMF NAPs at the top of each SNAP have a presence in every operating unit and can exercise oversight to the degree required. Whenever an exception occurs at any level, all levels are positioned to contribute to the response, and each level can immediately contribute its CMp status. Consequently, current operating status at all levels is immediately available, and can serve, for example, to describe a condition verbally if needed. If the exception calls for a change in plans, all levels are available to receive the change instructions simultaneously and immediately respond. A Regulatory or Functional level NAP may be conducting many operating units concurrently in this way, and if the occasion arises, is able to immediately shift course on all operating units simultaneously by declaring an exception and providing to each a fresh set of instructions. RwL generally becomes engaged in exceptional situations and may play an active role in surprise transitions such as this.

This arrangement for hierarchical SNAP operation in an ONP setting is analogous to the AVKB principle of conducting multiple layers of inference simultaneously at different levels of aggregation from overview to detail. In many cases lower level NAPs receive explicit instructions from above and respond passively unless a local exception is declared, and in these cases multiple layering is not central, but when Indicative Decentralized Control (IDC) is in effect multi-layer inference becomes essential. Under IDC, a higher-level NAP instructs subordinated NAPs to proceed in concert and take appropriate action toward the common goal locally and collectively in response to conditions encountered along the way. For example, we humans apply IDC in our forearm, wrist, hand and individual fingers when we pick up something delicate like a ripe piece of fruit, and we apply IDC throughout our body when we are walking gingerly in the dark. IDC involves rapid local response to local sensory inputs as well as local response to other proximate local responses, all of which are being simultaneously appraised at a higher level and potentially coordinated from that level. Multilayer inference at differing levels of aggregation is ideally suited for IDC.

In some cases, the components of the RMF may have a high quality and security, and in addition to being designed for speed and reliability, may also be designed for maximal effectiveness when supporting nested NAPs. They will represent a substantial development effort and will benefit all robots. A prototype of this aspect of the RMF will be developed early on and continue to evolve as development proceeds. Development of lower level physical operating NAPs, learning-oriented NAPs, communication NAPs and so on, as well as a sampling of activity NAPs that nest below Functional NAPs and supervise specific projects, will be a natural byproduct of developing and testing the physical robot and OCo. Some of these NAPs may be brought up to the highest quality and security level, worthy of inclusion in the RMF, to serve as a basis for robot learning and development of more specialized NAPs through knowledge sharing. This RMF extension will reach through the population of NAPs like a reliable skeleton for accumulated robot learning.

The robot's population of NAPs in the Learned Knowledge Base may grow by Learning through Experience (LtE) and/or Learning through Implementation (LtI) and importing knowledge developed by other robots, in some cases, in the same way. The learning capabilities of robots may be valuable and well appreciated, but Learning through Implementation may not lead the robot away from the ethical structures that have been designed into it and established for it, or cause the robot to lose its integrity.

There are three primary vulnerabilities: weaknesses in the robot's Operations Control, obeying unsuitable human instructions, and breaches of security. The first may be addressed in this strand, the second in the following strand, Communications with Humans about Tasks (CwHaT), and the third is touched on in the final strand, Self-Care and Guiding other Robots. In some examples, the robot's implemented design and operations control may be secured by FMC and AVKB. Within their sphere of control, the Robust Mental Framework insures that OCo adheres to design and subordinates all operations to Regulatory Level and Functional Level NAPs. Furthermore, the NAP/SNAP design conservatively provides for cross-validation of mental capabilities and operations. Regulatory level NAPs are the keys to operations control, and these RMF NAPs can be strengthened and secured as required for cross-validation. RwL, acting as an agent of AVKB, can explore potential issues while the robot is active, and AVKB and RwL jointly explore issues within CMp and inconsistencies between CMp and OCo procedures.

RwL also conducts the learning process. RwL is an element of RMF, and it structures learning to remain within a restricted scope of action that minimizes the possibility of ethical lapses. In general, RwL conducts learning sessions within an existing context that is either already defined for the robot, or else has been reviewed for approval by the robot's own Regulatory NAPs and when appropriate by a responsible external authority. RwL can adapt approved solutions by adjusting parameters to match the robot's characteristics. RwL can collect OCo components already proven in other circumstances and reconfigure them into new applications in approved contexts. RwL can customize unfinished solutions to approved problems through trial and error exploration, while limiting itself to approved safe ranges of parameter values. RwL can analyze existing OCo mental capabilities and conceptual mappings to determine relevant context and thereafter provide ongoing contextual information to operating SNAPs as needed. RwL can explore discordance between conceptual mappings and OCo instructions.

RwL has several significant roles in operations. RwL helps to inform and coordinate current operations indirectly by providing ongoing common context. As the robot operates, the Stacked Nested Action Protocols (SNAPs) conducting the robot's current activities are provided with a broad common context established and maintained by RwL. Each SNAP cooperates with RwL to provide an ongoing context for its own operations, and RwL extends this ongoing context by bringing in further information, dynamically extending the context to deal with circumstances potentially requiring instant response, and investigating unanticipated discrepancies as operations unfold. The contexts developed by RwL in coordination with the AVKB set forth the robot's condition in the world around it and constitute a basis for interaction with recognized external entities as their descriptions unfold. In support of current operations, RwL tracks one or more possible States of Nature, assigns them probabilities, and watches for signs that the State of Nature may be changing. RwL maintains and updates planning contexts and contingent plans for each possible State of Nature. It maintains plans over one or more horizons, potentially ranging from very short to long-term, and reviews these periodically and whenever significant new information arrives. RwL helps SNAPs to react to simulation discrepancies, respond to sensory stimuli calling for immediate response, and take action when any other triggering events occur.

RwL routinely conducts memory SNAPs and planning SNAPs that employ OCo and USM. RwL draws upon memories along with the NAPs and SNAPs in the AVKB to conduct "What if?" investigations. Sometimes a memory will allow previously validated activities to be adapted for a current situation, in which case after validation has been completed, the operating range of the relevant NAPs and SNAPs is extended to incorporate the new information. When researching an issue such as this, RwL considers the full range of actions available within the envelope of safety given by the present state of knowledge, always taking account of possibilities for supplementing the AVKB by accessing trusted knowledge resources.

As a robot learns, RwL extends existing NAPs and compiles new ones. RwL can also assemble approved SNAPs. Action Protocols are the basic elements that RwL supports and assembles into NAPs. A single successful historical action record stored in memory may be a tree with no branches, although there might have been false starts that led to aborted branches, but when the same task is performed many times in different circumstances or different ways, RwL merges productive variations in the paths taken into an action protocol by inserting corresponding branches. RwL can also test out, verify and add branches derived by analogy to other NAPs in the AVKB, or composed based on observations of others performing the action, guidance received about the action, and so on. An action protocol can be merely "sequential," containing a series of events, or it can be fully fleshed out as "dynamic" to include the actual timing of happenings.

There is an important general distinction that applies to action protocols, which can be of the types "self", "other," "interactive" and "engaged." "Self" connotes a series of actions controlled fully by the robot; "other" connotes a series of external events; "interactive" connotes an interwoven series of events, some of type "self" and some of type "other", that sequentially depend on one another. "Engaged" is a series of events in which the interdependence of self and other is so strong that the two merge into a single series ("self-other"), usually in a dynamic setting. Painting a wall and moving a large glass table are good examples.

The mobile robot is quite complex, with many moving parts and many potential motions. On the other hand, most of its activities are likely to be routine repetitions of common motions carried out as pre-approved traversals of its action space. In order to facilitate memory, planning and current operations, it is helpful to "parameterize" the various dimensions of action space, determine approved traversals within that space, and represent routine plans and uneventful memories as traverses of such trajectories. The requirements enforced by the Robust Mental Framework make this a straightforward undertaking, and greatly ease the calculation and storage burdens for memory and planning.

The primary aim of the project is to develop robots that serve humans in personal settings in autonomous, general-purpose, non-violent ways. Such robots will also be well suited for many forms of emergency response or crisis management, and may be particularly helpful where radioactivity or toxic substances are present, or a threat of fire or drowning exists. It might make sense for robots to be deployed for beta-testing in crisis situations even before they are released for beta-testing in households, because they could operate under supervision in crisis situations before communication skills and self-discipline matured. Early experience with the robots in supervised applications in the complex circumstances of accidents or other emergencies might also assist the robot development process as a whole.

Modules for Skills and Knowledge (MOSKs)

In some examples, a robot may be able to acquire capabilities in any specific field through commercially available Capability Modules that offer operational capability, skills relevant to the application, and knowledge of the expanded context. A commercial module of this kind can be referred to as a "Module for Operations, Skills and Knowledge", or a MOSK. MOSKs can be distributed in the same ways that programs and apps are distributed to personal computers. A MOSK can provide a complete and self-contained solution for a specific application, while nesting beneath broader, generally applicable NAPs and inheriting general capabilities from them. For example, there may be MOSKs about Baking, Caring for Cats, Speaking Japanese, Hand-Washing Cashmere Sweaters, and Preparing Income Tax Forms. There may be more specialized MOSKs that focus on operating particular tools or appliances.

MOSKs may be an efficient way to transmit well-developed capabilities to robots, and are desirable for that reason. High standards may be established for MOSKs and maintained, and robots may be able to acquire significant levels of expertise in a wide range of practical functions by means of MOSKs. MOSKs may enable robots to assist their humans and demonstrate fresh solutions that humans appreciate, and technically adept humans may be able to translate the results of successfully training their robots into a MOSK for the benefit of others. MOSKs may well become content platforms, offering the skills and methods of respected human experts and helpful practical demonstrations and advice from experienced robots. Capability Modules developed by RESSI may be referred to as "Capability Modules," while Capability Modules from other sources are simply termed "MOSKs." RESSI may provide structures for quality certification of MOSKs, physical components and assemblies;

MOSKs are implemented in terms of NAPs, SNAPs, Mappings, and pseudo-memories in the standardized formats for elements of the AVKB. A MOSK would ordinarily include NAPs for carrying out actions, Conceptual Mappings within NAPs for communicating with humans about the actions, additional NAPs with extended Conceptual Mappings and navigation guidance for searching for further information, and "pseudo-memories" of exactly how various tasks have been performed. A MOSK will provide the vocabulary the robot needs to talk about the task with its humans in the form of human conversational branches for likely eventualities that are included in Conceptual Mappings to all aspects of the task. A MOSK might also offer support to human owners and to robot users through the web, possibly including a support group of experienced robot users who engage in chat sessions as well as helpful documentation for robots and for human owners.

In short, a MOSK is closely analogous to a human educational resource. The main difference is that the robot installs the operating capabilities directly in its AVKB, and receives full pseudo-memories of having performed the activities in the past. The MOSK thus offers past experiences in forms suitable for RwL. When the robot first applies a SNAP into which the NAPs have been nested, the robot's knowledge of the application is immediately supported by remembered context built from the past experience of other robots.

MOSKs can be distributed to robotic systems in the same ways that programs and apps are distributed to personal computers. A MOSK can provide a complete and self-contained solution for a specific application, while nesting beneath broader, generally applicable Nested Action Protocols (NAPs) and inheriting general capabilities from them. For example, there may be MOSKs about Baking, Caring for Cats, Speaking Japanese, Hand-Washing Cashmere Sweaters, and Preparing Income Tax Forms.

When considering the capabilities of a robotics system for construing and solving problems and further applying these capabilities by learning through MOSKs and developing MOSKs, the tiers perform certain tasks. For example, in some embodiments of the described system, tier 1: receives and applies descriptions of components and assemblies; tier 2 receives and applies descriptions of the robot's own capabilities and the robot's fully specified environment; tier 3 recognizes unknown aspects of the external environment, and finds and accesses applicable MOSKs for the necessary information to identify, describe and act in regard to these aspects; tier 4 receives instructions from humans about services to provide, receives further instructions from humans or via MOSKs about how to provide those services, and subsequently receives corrections and further instructions from humans or from MOSKs about how to customize, vary or improve the services; tier 5 applies the information in MOSKs to model and simulate humans' views of itself and to establish appropriate behavior patterns in response to these, while understanding and applying the principles of integrity that it may be expected to honor, and combines these in a coherent mode of conduct and self-presentation in its relationships with humans; and tier 6 depends on simulation modeling capabilities for humans and human/robot interactions and also draws upon the other tiers to play a responsible role in closely coordinated joint human/robot projects. When appropriate, the robot defines and develops MOSKs, ordinarily from the perspective of tier 5, to record relevant information as a form of memory and for subsequent potential reuse by other robots.

Robot Ecosystem for Security, Support and Integrity (RESSI)

An institutional framework for a RESSI can refer to a decentralized standard-setting, quality control, and research and development effort that may be implemented by any combination of participating entities. Because of the significant advantages of a robotics industry organized around a secure core that nevertheless remains open to diverse contributors, the ecosystem may be flexible enough to accommodate and encourage innovation.

When the robot is diagnosing a fault or learning about a past mistake, it may need to communicate with people effectively and earn their trust. Both learning and knowledge, on the one hand, and integrity contribute to this and depend upon this. In particular, both facilitate reliability and both are furthered when the robot can respond effectively to human instructions. The robot also needs to communicate with other robots and with RESSI. Such communications provide some of the most efficient avenues for Learning and Knowledge, and some of the greatest contributions to assuring Integrity. In some embodiments, RwL and AVKB jointly consult RESSI for information regarding unresolved issues, and seek advice and research whenever special circumstances arise.

Official mental capability upgrades and Self-Discipline regulations and recommendations from RESSI may come in the format of capability modules, which may reside in the Robust Mental Framework, or may be installed as MOSKs. They may be installed by confirmed download or at repair facilities, depending on the circumstances. On the other hand, upgrades to RMF that occur at high levels not safely nested within higher level RMF NAPs, will not be inserted within the existing protective umbrella as MOSKs. These higher level upgrades will therefore entail other forms of secure update.

In some embodiments, a Command Script Effect Schema (CSES) can be created by observing the normal effects during operation of the MOSK, RESSI observing the frequencies of potential fault indicators arising from these various steps, and RESSI further recording the nature of the ultimate diagnoses of these events and determining that a particular CSES is a useful tool for evaluating the possible fault status.

In some embodiments, a CSES can be created by a RESSI agency observing the normal effects during operation of the MOSK, observing the frequencies of potential fault indicators arising from these various steps, and further recording the nature of the ultimate diagnoses of these events and determining that a particular CSES is a useful tool for evaluating possible fault status. A program of this kind can be created whenever a fault-prone procedure is identified and may therefore be performed routinely to support upgrades and updates. A CSES can be useful in many circumstances over the life of a robot.

In some embodiments, RESSI is a manifestation of tiers 5 and 6 with respect to the robot's integrity with the humans with whom the robot interacts. For example, a robot may need to alter behavior patterns as it interacts with various humans while at the same time be self-disciplined and self-consistent. In some embodiments, through the RESSI, a robot maintains integrity and meets its. For example, a robot cannot affirm bad behavior, but may still meet its obligations to the humans.

In some embodiments, RESSI refers to an arrangement whereby stakeholders in the Robot Industry fulfill a number of centralized responsibilities and functions for general-purpose robots as a whole. In some embodiments, RESSI will not be monolithic and may not be organized or centralized. In some embodiments, RESSI will be desirable only because these functions and responsibilities are very desirable for the robots to achieve a high level of success. For example, RESSI could coordinate the development of universal elements like the USM with Primitive Constructs (PrCn), the RESSI Regulatory Level NAP, and the Robust Mental Framework. In some embodiments, RESSI may work with the culture at large to develop Codes of Conduct and legislation concerning robot activities. In some embodiments, RESSI may promulgate standards that allow all stakeholders in the industry to cooperate effectively and benefit as a result, and yet leave ample space for technological change, innovation and diversity. In some embodiments, RESSI may facilitate a network of secure facilities for robots to receive repairs and upgrades. In some embodiments, RESSI may sponsor or otherwise bring about long-term research projects concerning the future of robotics and the best uses of robots for the benefit of the human culture.

VI. Joint Undertakings Tier

As described above, the area of joint undertakings is defined by purpose and by necessity where responsibility is shared by the robot and humans and the robot relies on simulation modeling of both of their roles and their common tasks. The intention is strong in the sense that there is a parallel understanding between the person and the robot in terms of what they are doing. Although the robot and human may have different points of view, they have a common understanding of the fundamental purpose of the undertaking. For example, from the robot's perspective, this means an assimilation that includes what the human and robot are doing, what the result will be and why the result is important. Moreover, within a joint undertaking, a robot and human may have independent postures, but each of them can also understand and potentially perform the other's role. In this sense, because each one can stand in for the other in, for example, an emergency, the roles for each are less clear. They may have different knowledge bases, but they can also share their knowledge with each other.

First, a joint project by human and robot comes into being when the robot is essential for some aspects of the project and is capable of modeling the activities of human and robot to some degree and begin to map the part played by its essential activities in the whole, and can also potentially help with other elements of the project when necessary or appropriate due to circumstances. A project becomes a "joint undertaking" when the robot models both its own role and also the human role from the top down, seeking to comprehend the joint undertaking and, in addition to taking on certain responsibilities normally assigned to it, also tracks the impacts of these activities in the overall undertaking. From this extended perspective, the robot is potentially able to take on aspects of the human's responsibilities when appropriate and also to apply its AVKB capabilities to evaluate the coherence and vulnerabilities of the structure of the undertaking that it has modeled, potentially suggesting adjustments to the structure and standing ready to activate such adjustments with approval, and also standing ready to seek approval to apply such adjustments in an emergency.

Second, an operation is joint if some of the activities it entails are straightforward enough for the robotics system to accomplish, while other activities that are too poorly structured or too dependent on human experience and intuition to entrust to the robotics system are undertaken by the human. In some embodiments, measures of success within a joint undertaking includes the robot training the human because the robot knows what the human has to do and, if permitted, the robot would also be able to explain to the human the robot's procedure which, in some cases may be somewhat different. In many cases, a great benefit may result from the robot taking over the human's role and responsibilities in an emergency, and in other cases the benefit may derive from joint coordinated responses by robot and human. This may be significant because the robot may have more precise and more detailed knowledge of a complex system than the human does.

One example of this is piloting an airliner: When the weather is calm and predictable, air traffic is light and well-coordinated, and the flight path is stable at high elevation, the autopilot flies the airplane while the pilot or copilot waits nearby to take over in case of emergency. During takeoff and landing, when the weather is stormy, when the skies are crowded or when there may be a requirement to change course, a human pilot takes over. A non-physical robotic system might join this arrangement as a third party that keeps watch on conditions and remains on watch for critical scenarios, and that is also available for communication with the human and the autopilot.

In an example, an aircraft under autopilot control may have many of the sophisticated sensory resources and simulation modeling tools specified in the present approach. In such an example, from the human pilot's point of view, flying may have some of the qualities of giving instructions to a robot. As such, the robotics system can be aware of the pilot's plan and intentions, and moderate or override any control action that would take the aircraft outside of the preferred range of trajectories specified by the pilot. The robotics system may be capable of handling uncertainly in this type of situation. For example, should the pilot become ill or otherwise incapacitated, the robotics system can be integrated into the cockpit system and other systems for landing or takeoff in such scenarios. Other examples include the robotic system merely assisting the pilot with these types of tasks.

Further, consider a situation in which a mobile general-purpose humanoid robot is enacting instructions received from the human in a joint project. There are three particularly sensitive areas in regard to joint projects. The first, as mentioned above, is that the human may somehow be experiencing a personal emergency or otherwise disabled. The second is that the robot has received instructions from the human that the robotics system may not have understood, and that the consequences of misunderstanding might be serious. The third is that, instead of giving the robot instructions and relying on the robot to determine the appropriate course of action, the human employs a control device to determine the robot's physical movements directly, without the protective buffer provided by the robot's advanced self-simulation-based planning of its movements, so that the human risks damaging the robot through dangerous movements.

Similarly, in a car with self-driving capabilities, the driver may entrust control of the car to its self-driving robotics system when a road is well marked and maintained in a standardized way and visibility is good—as in often the case in freeway driving—but the driver must take over in circumstances where human judgement is required. The robotics system plays a central role here, for several reasons. First, it is the one with the capability to simulate a process in detail, and project simulations forward to infer when a current action by robot or human is likely to lead to trouble. Second, the robotics system may be interacting with many humans at different times in different places, so that it can accumulate quickly a range of different experiences in any joint project and derive from various outliers the probabilities of human errors and the probability of harm. Third, whereas the robotics system accumulates implementation experience constantly as it interacts with new humans or new circumstances, each human who newly encounters the robotics system or encounters a new circumstance in the joint project does not have the advantage of prior experience. In an automobile, if the human driver experiences an emergency, such as extreme drowsiness or a stroke or a seizure, or encounters some other debilitating condition, the robotics system can be prepared for this eventuality so that it can step in to minimize the risk of negative consequences.

For a robotic system that supports a human passenger riding in a self-driving car who will implicitly serve as "driver" of last resort in any emergency that may arise, the most critical issue may be to manage joint responsibility. The self-driving car can handle many circumstances, allowing the human to relax and lose touch with the need to be a resource in emergencies. If there is only one passenger in the car, the passenger may be lulled into taking a nap when in fact the passenger is also the last resort in any situation that the self-driving system cannot handle. The passenger is the human key member of the team. The self-driving car itself may not be able to cope with unexpected events like an accident, emergency road-work, loss of visibility due to a severe storm, inaccurate information about routes or road conditions, and faults in the car itself. A robotic system supporting the self-driving car, which in some embodiments may have developed familiarity with the passenger, can help to keep the passenger alert when necessary and can anticipate potential problems before they arise, and it can also alert the human whenever there is any indication that a critical scenario may occur and explain the possible difficulties in advance.

In some examples, the human may take over in an emergency. In some cases, however, the robotics system itself may step in and take precautionary steps. For example, in an automobile, if the human experiences an emergency, such as extreme drowsiness or a stroke or a seizure, or encounters some other debilitating condition, the robotics system can be prepared for this eventuality so that it can step in to minimize the risk of negative consequences.

As another example, the visual sensors of the robotics system may have capabilities superior to human vision, as might be the case in an automobile equipped with night vision, or include multiple visual sensors. These sensors provide the automobile much better angles of view than the driver has in some areas. Other relevant examples include, if the robotics system has a quicker reaction time or a more rapid action channel, when the human driver has become distracted and has not noticed something that the robotics system has already registered. In such examples, the robotics system can be prepared to act quickly to take preventive action in circumstances where it is has superior information or can act more effectively.

As another example, an aircraft under autopilot control may have many of the sophisticated sensory resources and simulation modeling tools specified in the present approach. In such an example, from the human pilot's point of view, flying may have some of the qualities of giving instructions to a robot. As such, the robotics system to can be aware of the pilot's plan and intentions, and moderate or override any control action that would take the aircraft outside of the preferred range of trajectories specified by the pilot. The robotics system may also be capable of handling uncertainly in this type of situation. For example, should the pilot become ill or otherwise incapacitated, the robotics system can be integrated into the cockpit and other systems to land or takeoff in such scenarios. Other examples include the robotic system merely assisting the pilot in with these type tasks.

Consider the situation in respect to a mobile general-purpose humanoid robot that is enacting instructions received from the human. There are three particularly sensitive areas in regard to their joint projects. The first, as mentioned above, is that the human may somehow be experiencing a personal emergency or otherwise disabled. The second is that the robot has received instructions from the human that the robotics system may not have understood, and that the consequences of misunderstanding might be serious. The third is that, instead of giving the robot instructions and relying on the robot to determine the appropriate course of action, the human is using a control device to determine the robot's physical movements directly, without the protective buffer provided by the robot's advance self-simulation based planning of its movements, so that the human risks damaging the robot through dangerous movements.

Critical Scenarios are naturally addressed at Tier 6, because the rarity of critical events makes it much more likely that they will be prepared for preventively if the robot capabilities and human capabilities are combined. "Critical" includes something that is absolutely crucial and essential, and "scenario" refers to an operating situation and the various ingredients that make up the scenario and result in its being critical. For example, closing the gas cap on the filler-pipe in an automobile is a critical step once the gas tank has been filled, because the gasoline may otherwise slosh out of the tank and over the outside of the car, and the gas fumes might in some circumstances be ignited. A scenario that includes all of the various circumstances that might result in an explosion or fire would be a critical scenario. Critical scenarios often relate to the potential occurrence of low-probability events, and concern mistakes or oversights that may occur when people involved do not keep in mind the possibility of the event and the need for vigilance.

As an example, a general purpose, mobile humanoid robot may serve as a caregiver for an elderly or seriously ill person. In such situations, exhausting the supply of certain medications, failure of certain life-saving mechanical devices, running out of certain supplies and the need to urgently notify a doctor might be critical scenarios. It may also be critical to follow a daily schedule of taking medicines, receiving physical therapy, and receiving other contributions to personal well-being.

The fundamental design of the robot is oriented toward service and carrying out instructions. The situation changes when the robot takes on a responsibility ordinarily held by a human in order to deal with a critical scenario, in part because the human's responsible role may have routinely included executing authority over the robot.

A second issue to be faced is that the emergency or change of circumstances in the critical scenario that leads to the robot taking over the human's responsibilities may also cause other disturbances or require other unanticipated decisions or corrective actions that lie outside the robot's usual sphere of active participation.

The robot may also lack access to some of the tools that the human would rely on when exercising the responsibility such as phone numbers and other contact information, experience communicating with other humans who are key resources, keys or combinations for opening locked spaces, knowledge of important locations such as storage drawers or cabinets in the living space or stores or offices off premises, and so on. It is also possible that the changing situation that leads to the critical scenario may have disrupted the normal arrangements that the human relied on to perform the responsibility, so that even the human might have faced difficulties in executing the required tasks.

Example issues similar to this may put the robot into an untenable situation when the critical scenario arises. The robot may have been perceived by the human as competent and well-informed, but those perceptions would have been shaped within a setting that was created and controlled by the human in ways that might not even be noticed, so that the events would not necessarily have given the robot enough information to act independently.

For reasons such as these, it may be important to prepare thoroughly for the robot to take on responsibility. The natural solution is the creation of a detailed simulation of all the actions involved and the range of possibilities that may unfold at each step. The robot applies its Learning through Implementation skills to assemble conceptual mappings for all of the supporting information and all of the necessary resources. This may be accomplished as the robot performs rehearsals while the human observes and contributes guidance and information. The rehearsals and assembly of the conceptual mappings may be conducted with the support of a MOSK designed for this purpose. After the learning process is completed in the robot's AVKB, the robot will be in a position not only to take on responsibility if the critical scenario actually arises, but also to communicate about the topic with humans who may have agreed to offer their support if the contingency arises. The robot's communication capabilities will be well suited to describing the plans that have been prepared.

All of the examples described above (e.g., a joint undertaking) can be approached from the perspective of the human and the robotics system (i) sharing an overall plan and agreeing on an aggregate-level description of the plan and the range of trajectories envisaged in the plan, and then (ii) providing to both human and robotics system prompt indications of any circumstances that, from the perspective of agreed models such as a simulation model, threaten an excursion beyond these trajectories and (iii) empowering both human and robotics system to initiate and follow through on a preventive course of action whenever such a threat manifests.

The robotics system plays a central role here, for several reasons. First, it is the one with the capability to simulate a process in detail, and project simulations forward to infer when a current action by robot or human is likely to lead to trouble. Second, the robotics system is interacting with many humans and so it can accumulate quickly a range of different experiences in any joint project, and derive from various outliers the probabilities of human errors and the probability of harm. Third, whereas the robotics system accumulates experience constantly as it interacts with new humans or new circumstances, each human who newly encounters the robotics system or encounters a new circumstance in the joint project does not have the advantage of prior experience.

It is obvious that risks of misfortune will be greater when either the human or the robotics system or both come into a circumstance without prior experience. The newness of a pilot who has never before flown a particular model of an aircraft or the newness of a revised model of a robotics system that is still evolving as it is being used are important indicators of the need for greater caution, and a combination of the two carries this still further.

The situation is clear, but somewhat paradoxical. It is the responsibility of the robotics system, which is honed to model physical systems and works at the precise level of scientific detail, to model and then simulate the actions of its users, which can only be approximated by aggregate-level descriptions. This approximation may seem to go against the grain, but there seems to be no alternative when humans and robots engage in joint projects. The robotics system in the auto simulates approximately the circumstances of its driver. The robotics system in the aircraft simulates approximately the circumstances of pilot and copilot, and the robotics system of the robot simulates approximately the circumstances of the humans who give it instructions.

Updates and Upgrades

In a fledgling industry with rapidly evolving technology, it will be useful for robots to receive frequent updates and upgrades of both mental capabilities and hardware. Since a faulty or mistaken change could easily compromise the robot's integrity, the capability for safe upgrading may be designed and implemented from the start. For example, modularity in mental capabilities and hardware may be an important factor of the design.

In respect to hardware, in some embodiments the precise, science-based USM and comprehensive sensing and monitoring are the robot's main line of defense against faults in updating. In some embodiments, when a hardware upgrade occurs, the simulation model for the new part will replace the prior version in the robot's modular USM. In some embodiments, the robot will perform its usual regimen of exercises with the new part installed in its body and the revised USM installed in information processing. In some embodiments, the robot will also perform exercises provided along with the installation that are particularly sensitive to the performance of the new part. In some embodiments, if all has gone well there will be no discrepancies between simulated prediction and actual performance. In some embodiments, any error in the installation process, such as a defective or wrong part or a flaw in the revised USM, will surface at this time.

In some embodiments, such procedures are used earlier during development to check the design for the new part and implement its simulation model. The process will usually go through a number of iterations before a final manufactured prototype is successfully mated with the correct simulation model. As manufacturing methods are tested, the same approach can be applied to many different individual instances of the part to confirm that manufacture is adequately consistent.

Unless the new part's function is identical to the old, Operations Control can be modified to reflect any operational differences between the new part and the old. In some embodiments, changes in function are already reflected in the revised USM, but procedures embodied in various NAPs, SNAPs and memories may need to be modified to accommodate the changes and take into account new performance capabilities. In some embodiments, the requisite updates to RESSI-derived mental capabilities may have been provided for installation at the same time as the revised USM, but these changes may also be reflected in modifications to non-RESSI mental capabilities.

Because the robot learns through experience, it may have accumulated various procedures that need to be retuned or adjusted upon upgrade, and the upgrade may permit a superior approach in some cases. Also, the robot may have acquired much of its knowledge from MOSKs, but MOSKs merely encode the learning of other robots and will have similar qualities.

In some cases, MOSK providers may offer appropriate upgrades for their MOSKs, but for other MOSKs and the robot's NAPs and memories, the combined capabilities of AVKB and RwL suffice to make the necessary adjustments. In some embodiments, all that is required is for the robot to relearn a new protocol through fresh experience wherever the upgrade requires an adjustment. The AVKB has the capability to identify all relevant branches where the upgrade has an impact on NAPs and/or memories. RwL has the capability to replay each instance, whether presently active in a NAP or in a memory of NAP application, consider the impact of the change, and determine an appropriate relearning response. In some embodiments, RwL specializes in "What if?" investigations, and the question, "If the specification of the part were different, how would the protocol change?" fits perfectly with this specialty. Much of this work can take the form of pure information processing (experiencing hypothetically by operating the USM), without the need to operate the physical body. In creative cases, the robot will probably perform physical exercises to evaluate possibilities.

In some embodiments, the modular structure of Primitive Constructs and NAPs within SNAPs facilitates this process by limiting the number of places where changes need to be made. Often the necessary modifications can be implemented in Primitive Constructs, without entailing complex modification to NAPs. In some embodiments, when NAPs are involved, the changes usually will be limited to low level NAPs associated with the part itself and the part of the body where it resides. For each change that is made, higher level NAPs may be evaluated and adjusted as necessary for lower level changes, until the point is reached where further modifications needed for any NAP will need to be determined and accomplished within the creative setting of RwL.

Because retroactive changes to specific memories may have undesirable consequences due to mismatches with other contemporaneous memories, in some embodiments it is best to leave past memories unadjusted and instead record in memory a "version transition" that accompanied the installation of the new part. In some embodiments, the version transition registers the various adjustments made to Operations Control, and tags relevant memories with a "transition calibration" that brings them into comparability with present conditions.

In some embodiments, the modularity of the AVKB facilitates these steps, and the Reconciliation NAP (at the Regulatory Level) is designed for such purposes, as well as for dealing with misalignments, ambiguities and gaps among NAPs. Upgrades to mental capabilities can ordinarily be backwards compatible, but when necessary, RwL can make the necessary modifications to accommodate them. In general, when mental capabilities change, the impacts of changes to NAPs at the top regulatory level are taken into account when those changes are promulgated, while changes at lower levels are accommodated by adjustments to SNAPs and other NAPs as appropriate.

Figure 3B:
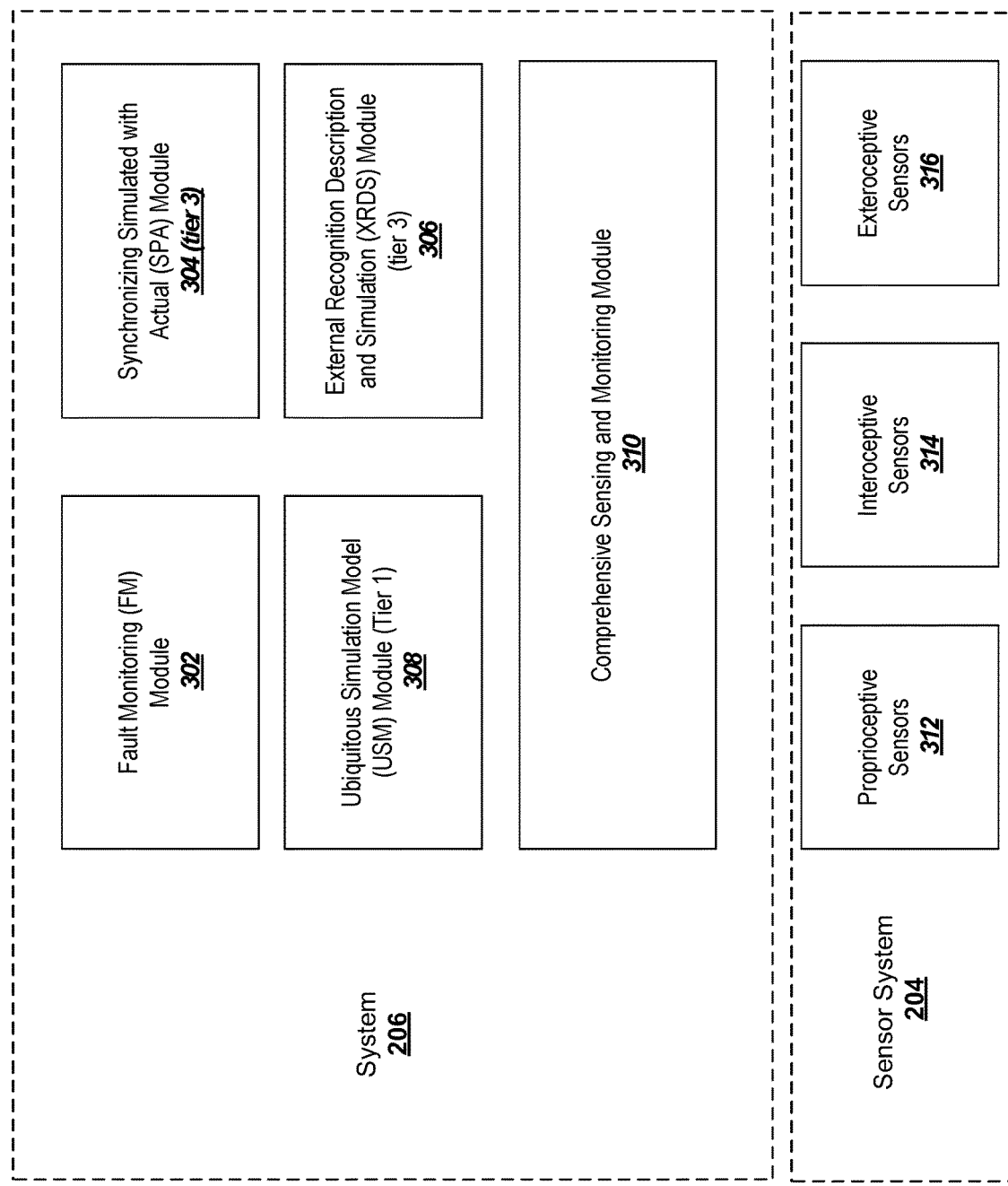
FIG. 3B illustrates components of a fault detection and diagnosis system of the robot.

FIG. 3B illustrates components of the system 206 and the sensor system 204 of a robot, which the various tiers depicted in FIG. 3A may interact with and help to maintain. In some embodiments, the system 206 is configured to detect faults of a robot, and provide further diagnosis of the faults. In some embodiments, the system 206 is configured to provide instructions for the robot for recovery from any detected and diagnosed faults. As depicted in FIG. 3B, the system 206 includes USM module 308, comprehensive sensing & monitoring (CSM) module 310, fault monitoring (FM) module 302, XRDS module 306, and SPA module 304. These components or modules of the system 206 are generally functional components that can generate useful data or other output using specific input(s). The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 3A, the system 206 can include more components or can combine the components into fewer components (such as a single component), as may be desirable for a particular implementation. The interactions among these components are illustrated in detail below.

The robot's USM module 308 may be configured to provide simulations of one or more of the robot's modules, systems, and their operations. The USM module may also store, update, and/or have access to simulation models, which describe (e.g., mathematical, model-based description) all of the robot's components, as well as the interaction of their individual functioning that generates the robot's various actions and activities. Moreover, the USM module may be configured to enable the robot to fully describe both its nominal present state and simulate its future state in order to calculate appropriate actions. Nominal present state may refer to the expected current state according to the original design of the robot. For example, this calculation may be based on the robot's prior status and recent activities or actions. The USM module may comprise and/or interact with one or more databases associated with the module in order to store, update, and/or provide access to the models.

The USM module 308 may be configured to store and/or update the models of the individual components and modules of the physical system 202 of the robot, and may also include functional models of one or more different modular parts of the physical system (e.g., the physical system 202, sensor system 204 and power system 212) and the interactions among them. The models may include mathematical equations based on first principles, which may refer to models based on known physical factors that may influence the robot or its movement and operation. The models may include the kinematics of the robot 100, which may, for example, describe how the motion of the joints of a robot can be related to the motion of the rigid bodies that makes up the robot. The models may also include the dynamics of the various robot body parts. The models can be used to predict or calculate an output performance of the robot according to an input data. For example, the flexing of the robot's elbow joints may be modeled in terms of the forces exerted by various active components or systems of the robot such as motors or contractile connections, frictional resistance experienced at startup and at various paces of movement, and other forces such as the force of gravity and accelerating forces transmitted through the shoulder or forearm. In another instance, the models may enable exact description of the effects of factors such as the change in temperature or wear and tear on frictional resistance, the effect of bumping into some external object, or the effect of a failing structural element upon the strength of a joint.

The USM module 308 may include models with mathematical descriptions of various components of the robot. For example, the models may include sensor models at an individual component level, and also include kinematics models of the movement associated with various parts of the robot and the like, and may also integrate these two classes of models in order to interpret visual information received while the robot's visual sensors are moving. For example, rotation matrix derived from the kinematics models may be applied to the camera coordinates and/or motion vectors may be tracked to correct undesired optical effect (e.g., optical distortion due to motion of the camera).

The USM module 308 may store, update, and/or provide access to models (e.g. simulation models) for various sensors onboard the robot 100. For instance, models for accelerometers and gyroscopes of inertial measurements units (IMUs) may be provided. Such models may enable the USM module to calculate output results based on the supplied input data.

The kinematics models can typically include information about action commands or instructions given to a robot. As part of the model, the kinematics of the robot can be included, which can help improve estimates of sensing under conditions of inherent and ambient noise. The dynamic model balances the contributions from various sensors, and various partial error models, and can generate a probabilistic model regarding the location and orientation of the robot. For 2D robots, the kinematics may typically be given by a mixture of rotation and "move forward" commands, which may be implemented with additional motor noise. For example, the distribution formed by independent noise in angular and linear directions can often be approximated by a Gaussian distribution. In some cases, the models may be stand-alone models (e.g. sensor model, motor control model), which can be created independent of any specific robot designs. In other cases, the models may be robot specific (e.g., kinematic model) that are related to the specific design of the robot.

The models stored or accessible by the USM module 308 may serve the basis for computing the robot's physical and sensor operations. For instance, the models can serve to calculate how various actions by the robot's motors and other sources of power can affect the present movements and accelerations of the various robot parts. The USM module may be updated and adjusted based on any replacements, upgrades or updates to the robot's components.

In some embodiments, the simulation process in the USM module 308 uses a series of sensor observations over discrete time steps and compute an estimate of the robot's location, motion, and various performances. Statistical techniques used in developing the USM simulation models and/or assessing errors of the robot or model itself may include Kalman filters, particle filters (a/k/a Monte Carlo methods), scan matching of range data and the like.

In some embodiments, the USM module 308 dynamically predicts, in continuous time, a future state of a robotics system over a time horizon. Such a time horizon may range from a current condition to an immediate future (e.g., a fraction of a second) and beyond to a projected horizon. In such embodiments, the robotic system may also receive descriptions, such as of physical components or the structured assembly of the robotics system, that are synchronized with the predicted future state (e.g., predicted circumstances) in order to compare SPA. In some embodiments, the USM module 308 updates in continuous time so as to adjust the predicted future state of the robotic system for perturbing factors as indicated by the descriptions. In some embodiments, the USM module 308 is only influenced by the received descriptions in the event that the prediction is inaccurate. For example, the predictions may tend to be more inaccurate in circumstances of interchange with other imperfectly know factors, such as a wrestling match, but rarely when the robotic system is operating autonomously in a known environment.

The Comprehensive Sensing and Monitoring (CSM) module 310 may provide the robot with timely sensor information about itself and its environment, by equipping the robot with both comprehensive sensing and comprehensive monitoring abilities. The CSM module 310 may be communicatively coupled to the sensor system 204, and may be configured to obtain one or more of the proprioceptive sensor data 312, interoceptive sensor data 314, and exteroceptive sensor data 316.

Comprehensive sensing may be accomplished by continually monitoring—in real-time or near-real-time—sensor data required to achieve the robot's performance targets. The performance targets may be established by design, and/or configured manually by an operator or automatically according to various operational objectives of the robot 100. For example, the robot may be designed for a specific task (e.g., detecting specific items) or the operator may update the commands or objectives of the robot via wireless or wired updates, which may alter the performance targets for the robot. Sensor data may be collected for i) monitoring fault, ii) determining the robot's current status in its environment, iii) recognizing and describing internal anomalies and external factors and objects, iv) supporting learning (e.g., updating of models) through experience in such forms as innovating new modes of action, v) adjusting action commands to match the robot's special qualities, and vi) communicating with humans or non-humans (e.g., other robots) regarding its tasks and objectives. The CSM module may be configured to configure various settings related to the collection of sensor information. For example, the CSM module may be configured to adjust the degrees of resolution, sensitivity, accuracy, and speed of response of various sensor systems of the robot, based on the objectives of the task.

The CSM module 310 may be configured to provide comprehensive monitoring, which may refer to receiving sensor information and data in a timely manner, integrating data received from the various sensors, analyzing the integrated data to extract information relevant to the robot's goals, and performing these functions with coverage of detail, timeliness and precision that suffice to accomplish the robot's goals. The extracted information may also be used to update the robot's status, identify significant unforeseen or non-configured external events, or discover internal anomalies indicative of fault.

The sensor information to be utilized by the CSM module 310 may be collected through various categories of sensing functions such as proprioceptive, interoceptive, and exteroceptive sensing. Such collected data may be compared with the predictions generated by the USM module 308. The simulations calculated by the USM module may be conducted with sufficient timeliness, accuracy, relevance, and precision to provide a reliable context within which significant discrepancies between the predicted and the actual sensor information may be analyzed. Discrepancies between predicted and actual sensor information may indicate either an anomaly in internal function, or unexpected external events, stimulations, or objects, or a combination of both. The sensor information may also provide the robot with the knowledge of its place in the environment (e.g., localization and mapping) that is required for calculating its activities.

The proprioceptive sensors 312 may be used by the robot to sense its body position, acceleration and velocity, various static and dynamic loads on the robotic apparatus due to its position and movement, and its resulting state of balance. For example, proprioceptive sensing may involve perceiving or measuring position, motion, acceleration, stress, balance and the like. For example, proprioceptive sensing may involve Global Positioning Systems (GPS) or Inertial Navigation System (INS) sensors. In some instances, a combination of the GPS and inertial measurement unit (IMU) may be used to aid in the navigation and/or movement of the robot in its environment. The navigation system can utilize any suitable GPS technology, such as differential GPS (DGPS) or real time kinematic (RTK) GPS. In some instances, an IMU may also aid in the navigation of the robot. An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU may be provided exterior to or within a housing of the robot. The IMU can provide a signal indicative of the motion of the robot, such as a position, orientation, velocity, and/or acceleration (e.g., with respect to one, two, or three axes of translation, and/or one, two, or three axes of rotation). For example, the IMU can sense a signal representative of the acceleration of the robot, and the signal can be integrated once to provide velocity information, and twice to provide location and/or orientation information. The IMU may provide a signal to a control system of the robot. Alternatively, the IMU may provide a signal that is combined with other CSM module 310 information to calculate and provide signals to the control system of the robot. For example, proprioceptive sensors may be utilized to calculate, i) the position, movement, and acceleration of the robot's mechanical parts; ii) the robot's weight and distribution of its mass; iii) balance; iv) orientation in three dimensions; v) stress or load on its various parts (e.g., when it is carrying or lifting an object). Such measurements may inform the robot of its status as it interacts in the external world, and are helpful for optimal control of its movements.

The interoceptive sensors 314 may be configured to perform interoceptive sensing.

Interoceptive sensing may involve measuring the internal state of a robotic apparatus, which may include weight, energy level, temperature, electric current, electro-magnetic fields, and the like. In some instances, the robot may be able to sense a situation in which the robot may be damaged in the absence of human intervention. For example, a temperature sensor may pick up an unusual amount of heat within the robot, where the unusual overheating information may be provided to the control system onboard the robot and/or the system 206 for diagnosing a fault. One or more external sensors in the environment may also be involved in collecting information to detect whether or not there may be damage to the robot (e.g., detecting higher than normal temperatures via infrared sensors). In some embodiments, the one or more external sensors may include exteroceptive sensors. The term "external sensors", for example, may be used to refer to sensors that reside onboard the robot or are attached to the exterior of the robot. Other robots in the vicinity may also be able to detect unusual conditions in the target robot, and may be configured to transmit relevant information to the target robot or the system 206 for diagnosis and analysis.

The exteroceptive sensors 316 may be configured to perform exteroceptive sensing. Exteroceptive sensing may involve measuring external sensors including analogues for both human senses—sight, hearing, smell, taste, touch—and non-human capabilities. Sensors capable of exteroceptive sensing may include contact sensors, range sensors, and vision sensors. Contact sensors may be used to detect contact between two parts or with a foreign object (i.e., an external object that is known or potentially unknown), while range sensors may be used to measure the distance to objects in a robot's operation area, or the distance between the location of a sensor and another location in the body. Range sensors may also be used for robot navigation or obstacle avoidance. The exteroceptive sensors may be capable of performing optical character recognition, omnidirectional imaging, thermal imaging, sound collection through microphones, ultrasonic sensing, infrared sensing, light detection and ranging (LIDAR), air quality assessment, weather and other environmental sensing including barometric pressure, wind pressure, wind speed, temperature, humidity, pollution, smoke, $CO_2$, noise, sensing of radiation, chemical and biological agents or hazards, sensing of electromagnetic radiation, sensing presence and identity of radio, cellular or wireless devices and the like.

Sensor Validation

Analyzing and diagnosing the physical components and systems of the robot 100 may depend on adequate and accurate internal sensors (i.e., proprioceptive and interoceptive sensors) and exteroceptive sensors. In one embodiment, the robot's sensor system 204 may be validated through authentication by confirming that individually or collectively, the sensors yield a known or verifiable value. For example, internal sensors may be authenticated when they match the predicted values simulated according to stored sensor models (e.g., simulation by the USM module 308). A proprioceptive sensor or an interoceptive sensor for electric current may be validated when real-time sensor measurements match simulated values during physical exercise.

The Fault Monitoring (FM) module 302 may be configured to detect any discrepancies between simulation data and real-time or near real-time sensor data. The FM module may be configured to control the process of processing and integrating data relevant to the possibility of fault, analyzing suggestive data, determining a probable fault, detecting specific evidence of a fault, analyzing the fault, and further determining an accurate cause for the fault.

The FM module may interact with the USM module 308, the SPA module 304, the CSM module 310, and the XRDS module 306 to provide such functionality. For example, the FM module may interact with the USM module 308 and the CSM module 310 to respectively collect simulation data and sensor data. In some embodiments, if the FM module detects any discrepancy between the simulation (data obtained from the USM module 308) and sensor data (data obtained from the CSM module 310), the FM module may be configured to indicate or alert the detection of fault or a determination of a discrepancy to other modules in the system. For example, the USM module 308, CSM module 310, and the SPA module 304 may be alerted to the fault detected by the FM module or the discrepancy under analysis by the FM module.

The FM module 302 may be configured to obtain information associated with the detected fault. The information to be obtained may be based on a discrepancy or pattern of discrepancies that has been determined. For example, once fault is detected, the FM module may interact with one or more databases associated with the FM module, in order to obtain diagnosis methods related to the specific fault. If the detected fault concerns the arm joints of the robot, the FM module may be configured to obtain information regarding the diagnosis methods to analyze the causes of fault concerning the arm joints. The mapping between detected faults and various diagnosis methods may be updated by a CFDDR system. In some embodiments, the updates may be based on whether or not the diagnosis method applied for the detected fault accurately accounts for and/or resolves the fault. The association between the detected fault and the diagnosis methods may be strengthened or weakened based on the outcome of the diagnosis, and the parameters controlling the association may be tweaked or updated by the CFDDR system.

The SPA module 304 may be configured to synchronize simulation data from the USM module 308 with the actual sensor data from the CSM module 310. The SPA module may interact with the FM module 302 to obtain current status of the robot 100. For example, the SPA module may be alerted of a fault detected by the FM module 302. In some embodiments, the SPA module 304 can increase the calculation speed of the CFDDR system and/or aid the USM module 308 to efficiently and rapidly isolate a fault and adjust for its impact and/or help to improve the resolution of the CSM module 310.

The XRDS module 306 may be configured to build the robot's 100 representation of the external environment 102 and/or extend the functionality of other modules to take into account external influences. For example, the XRDS module may interact with the USM module 308 to extend its simulation capabilities. The XRDS module may be configured to i) recognize various objects and/or ii) build models to describe the recognized objects. The XRDS module may interact with one or more databases associated with the XRDS module in order to store/update/retrieve data and models regarding external environments and objects.

The XRDS module 306 may be configured to interact with CSM module 310 to obtain data regarding the environment and any surrounding objects. The XRDS module may be configured to categorize and distinguish various objects by comparing the obtained sensor data to the stored data in databases associated with the XRDS module. The first process may involve recognition, which may refer to the capability of the XRDS module to recognize the category of the particular object of interest. For example, the XRDS module may be able to "recognize" that the external object is a "ball", based on fundamental features extracted from the sensor information (e.g., the external object may have a spherical shape). Once the XRDS module recognizes the object, the module may be configured to further "describe" the object, which may refer to the process of obtaining data points for relevant features of that particular category of objects. For example, a "ball" may have various general features (e.g., velocity, position, direction and rotation) and specific features, including the radius, weight, color, material, bounciness, and the like. The XRDS module may be configured to further collect information on each feature, if possible, to better "describe" the external object.

In some embodiments, the XRDS module may continue to update and improve its understanding of external objects by continuing to monitor CSM data and/or interacting with the external objects, and updating one or more data points on various features regarding the external objects. Some features may not have been previously associated with the category of object, but may be included based on the robot's interaction with the external object.

In some instances, when a robot 100 is impacted by and responds to external forces or conditions, the robot may lack a complete or precise simulation model of the phenomena that affect it. The robot 100 may rely on exteroceptive sensors and/or environment sensors 104 to collect data regarding the environment in order for the robot to recognize distinct external objects.

The robot 100 may be operating in an environment 102 where no unknown external factors influence the robot, in which case the XRDS module 306 may be configured to simulate known external factors such as, for example, the gravitational force, or other known objects in the room or observable/known irregularities on the floor surface. In this scenario, the USM module 308 may incorporate any known external factors from the XRDS module, for example, by adjusting the output of the USM module simulation results according to the known external factors. Any significant discrepancy in the modified simulation and the sensor measurements may indicate the likely existence of an anomaly.

The robot 100 may also experience imperfectly known or unknown external factors or events, and the simulation process (e.g., simulation by the XRDS module 306 or the USM module 308) may be extended to accommodate imperfectly known or unknown external influences. In some embodiments, when unknown external factors are present the robot may automatically switch into an "extension mode", which may involve adjusting for previously unknown external influences. In some embodiments, the robot may undergo self-evaluation to detect any fault, before switching into the extension mode to account or adjust for unknown external influences. This may be necessary to isolate the cause of any potential influence to unknown external factors.

The five modules, USM 308, CSM 310, SPA 304, XRDS 306 and FM 302 are described here in terms of their roles in fault detection and diagnosis. An advantage of this approach is that the first four modules can, in addition to supporting FM, fulfill general purposes and serve as core components of a robot's operating control systems.

Figure 4:
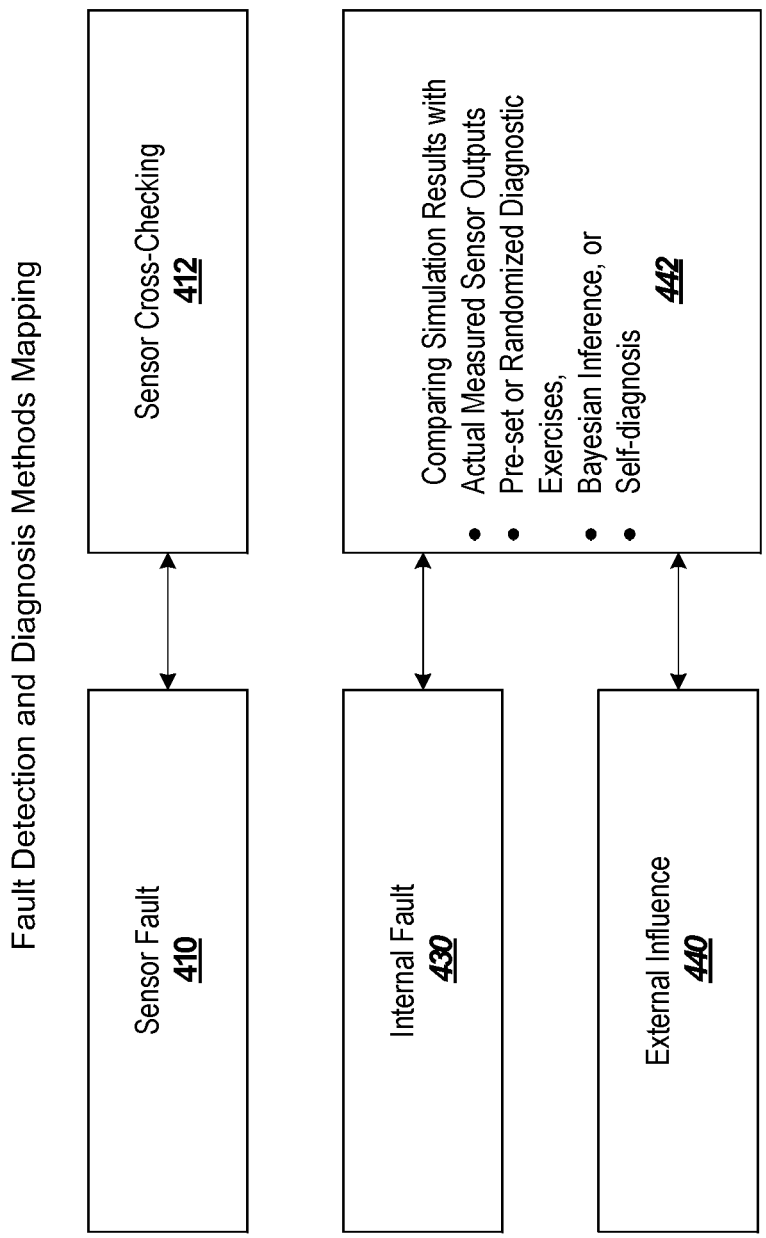
FIG. 4 illustrates types of fault detection and an exemplary set of corresponding diagnosis methods.

FIG. 4 illustrates types of fault detection and an exemplary set of diagnosis methods. The CFDDR system may be configured to provide the robot 100 with a set of diagnosis methods for each fault detected. Faults may be associated with various modules, components, or systems of the robot. For example, the sensor systems 204 may be malfunctioning and require validation, or the physical system 202 of the robot may be malfunctioning. Once the CFDDR system detects any symptoms of a likely fault, the CFDDR system may obtain diagnosis methods according to the detected symptoms or likely nature of the fault. In some instances, isolating the cause as relating to either the sensor system 204 or the physical system 202 may be an early stage in diagnosis.

The sensor system can be critical for all operations of the robot 100, including the CFDDR system. In some instances, the sensor system 204 of the robot may experience failure (sensor fault 410). The CFDDR system may obtain diagnosis methods which involve various sensor validation methods. Internal fault 430 and external influence 440 can be examined using methods including comparing simulation results with actual measured sensor outputs, pre-set or randomized diagnostic exercises, Bayesian inference, self-diagnosis and the like, or any combination thereof (collectively referred to as 442). Exercises, as used herein, may generally refer to any robotic movements or motions. Exercises, for example, may serve to further demonstrate the nature of the fault and/or obtain further sensor data concerning the fault.

Regarding sensor validation, a set of sensors and a set of relationships among them may form a network of crosschecks (412) which can be used to periodically validate all of the sensors in the network. On the hardware side, various techniques, including duplex, triplex, or higher hardware redundancy may be used. Analytical redundancy can also be used such that a sensor's value may be predicted by using values from other sensors, and applying known or empirically derived relations among different sensor values. A hybrid approach, combining both hardware and analytical redundancy may be used. Other validation algorithms can also be utilized for sensor validation. Sensor validation can be conducted in real-time or near real-time. The sensor validation operation may be performed prior to initiating other elements of the fault diagnosis process.

Physical Exercise

In some embodiments, the robot 100 may be instructed to conduct a series of exercises (e.g., fault monitoring exercises) to detect physical fault and provide diagnosis regarding any fault. The actual performance of the robot may be compared to nominal performance measurements during the exercises in order to detect any discrepancy indicative of fault. Actual performance may be measured throughout the exercises by the CSM module 310. Nominal performance may be calculated by the USM module 308 throughout or during the exercises, or may be included in the specifications of each exercise.

Figure 5:
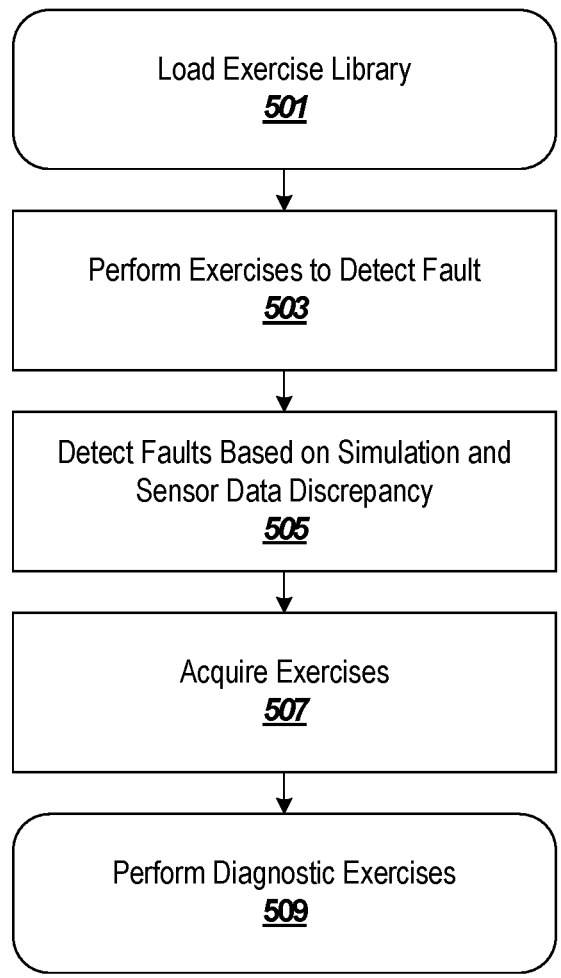
FIG. 5 illustrates methods for detecting and diagnosing physical fault.

FIG. 5 illustrates a method of detecting and diagnosing physical faults in the robot. When the robot is performing testing movements, malfunctions or flaws of various physical modules and components of the robot may be examined including, but not limited to sensors, communication units, motors, driving units, propulsion units and the like. The robot can detect fault preventively by performing these specialized exercises (i.e., fault detection exercises) designed to test the nominal capabilities of the robot and detect potential anomalies. These exercises can be performed regularly, for instance, on a daily basis. Alternatively, these exercises can be performed in response to an event. The exercises may be categorized into fault detection exercises and diagnostic exercises. The fault detection exercises may be exercises optimized to detect fault in various regions of the robot. The diagnostic exercises may be exercises optimized to diagnose fault once a specific fault has been detected. In some embodiments, fault detection may or may not involve exercises, but may be based on detected signals or probabilistic analysis.

At operation 501, the robot 100 and its system 206 may be configured to load the exercise library from one or more of its associated databases. The exercise library may include fault detection exercises and fault diagnostic exercises. The fault detection exercises may include a pre-determined set of exercises and/or randomly generated exercise.

At operation 503, the robot 100 may be configured to perform a pre-specified set of exercises or a set of randomly generated exercises for the purposes of detecting fault. The fault detection exercise routine can be a regular exercise, scheduled for a pre-set time interval (e.g., daily, weekly basis) to verify the condition of the robot. The pre-determined exercise routine may also be performed at random time intervals during periods when the robot is idle. The pre-determined set of exercises may also be performed whenever there is any reason to believe that the robot may have a fault.

The fault detection exercises of the robot 100 may also include randomly generated exercises. A set of exercises may be randomly selected from a universe of possible exercises based on criteria that respond to both the potential significance and the probabilities of potential flaws. A set of randomly selected exercises may also be placed in randomized order according to criteria that favor sequences that can potentially disclose rare but serious issues. Such spontaneous exercises emphasize likely and/or significant faults and focus on irregularities that might disclose rare conditions including the effects of tampering. When the robot is performing random testing movements, nominal performance may be calculated based on the USM module 308 simulations during the random exercise, and there may be no pre-specified values based on prior calculations. The random movements may be useful, for example, when the possibility of tampering by an unknown adversary is taken into account. The random movements may be generated based on various possible situations or hypotheses. In some cases, when a potential source of fault is known, the random testing movements may be selected to test aspects related to or associated with that known fault. Alternatively, if the source of fault is not known, the system 206 may be configured to directly move to the diagnosis phase. Similarly, when the robot has experienced an accident, the testing movement may be selected by focusing on the potential damage from the accident. Taking into account both the Bayesian probabilities for various kinds of flaws and the significance and risk attached to those various flaws, these testing exercises can (1) maximize the expected benefit of test exercises by emphasizing likely and/or significant faults, while (2) randomizing the forms, sequences and combinations of test exercises so as to check for interactions or interdependencies between exercises. By randomizing test movements and/or the sequence of test movements, potential bias or errors in measurements due to the specific order in which testing movements are performed may be minimized.

The fault detection exercises may have nominal performance measurements that are pre-specified based on prior calculations. In some embodiments, if no prior calculations are available, the simulations may also take into account Bayesian probabilities related to the potential faults. In other embodiments, at operation 505, actual sensor measurements during the exercises may be compared with nominal values and alternatively with currently calculated expected values based on simulation results of the USM module 308 if the latter differ from the nominal values. Fault may be detected when the comparison between actual values and the nominal or simulation values—as appropriate based on given conditions and circumstances—yields a discrepancy greater than a pre-specified limit. The pre-specified limit may be determined during the design phase of the robot or may be configured later during the operations of the robot. In some embodiments, the limit may take into account Bayesian probabilities related to the potential flaws.

In some embodiments, fault detection may not involve fault detection exercises. Whenever a single discrepancy or an episode of successive discrepancies occurs, the probability of fault can be assessed by Bayesian methods. A comprehensive and concise history of past anomalies, accompanied by the contexts in which they occurred, is retained in databases, which are either onboard the robot 100 or retained by RESSI or in some other way and accessible via the network 130. Present discrepancies can be immediately or rapidly analyzed—in real-time or near real-time—in light of past patterns, and this analysis may be further enriched as ongoing information continues to arrive in subsequent moments. The framework for this analysis is the current operating status of the robot—the actions underway and the contexts in which they are being undertaken.

Next, once a discrepancy has been associated with some component and/or activity of the robot 100, the next operation may involve a diagnosis phase. The diagnosis phase may involve the robot and its system 206 acquiring or accessing diagnostic exercises associated with the detected fault (operation 507). The diagnostic exercises may be stored in one or more databases associated with the system 206. For example, the system 206 may obtain diagnostic exercises from a diagnostic exercises library. Alternatively or in parallel, the system 206 may also obtain a set of exercises from a database external to the robot 100 via the network 130. The diagnostic exercises may involve exercising one or more specific components (e.g., retrieving exercises to diagnose and/or analyze a particular component) or engaging in a certain activity deliberately in order to evoke and magnify the detected anomaly in a repeatable way. Further exercises may be included to evoke the discrepancy to identify the underlying issue and quantify its severity.

At operation 509, the exercises obtained by the robot and/or the system 206 may be performed. In some instances, a suitable subset of the exercises can be repeated to aid in diagnosis. Ad-hoc exercises can be configured for maximum sensitivity to likely causes, and evaluated by comparison with simulated values. For example, in the case of a stiff joint, a natural way to probe the problem may be to apply a very small initial force and then gradually increase the force until the joint first budges. In another example, a sine frequency sweep may be applied to the actuation unit of the robotic system. The frequency response of the velocity of the robot arm may be analyzed. The stability of the particular component or the system may be examined. There are a variety of methods which can be used for identifying the stability of a robotics system. For example, overshoot of the amplitude response, phase margin, peak resonance, oscillation and the like may be examined to detect instability of the system. In some embodiments, the amplitude response at a peak resonance may be checked to see if it exceeds a safety value during a sine sweep process. For example, if excessive peak amplitude is detected at resonance frequency, it may be indicative of instability of the system. The diagnostic exercises may include one or more exercises performable by the robot 100 (e.g., within the range of motion of the robot). In some embodiments, the exercises may include "dancing" and "jittering" exercises that serve to test and confirm a robot's physical systems including its physical condition, motors, control communications, sensors, or sensory communications. For example, fully-extending "dancing" exercises can provide diagnosis for structural faults or other faults in joints and the power system 212. Slow-moving and graceful motions validate the range and smoothness of motion of the robot and confirm appropriate balance and distribution of weight of the robot. Strength and stiffness are further validated by movements such as pressing limbs against one other, leaping and other weight-bearing movements. In a normal "dancing" session, the robot is taken through the full range of motion, stretching to the maximum in different positions to confirm strength and consistency of force and validate calculations of balance, strain and torque on the joints. These pre-determined movements may be designed to test the limit of the robot in terms of load bearing, motion range, dynamic range and all kinds of static and dynamic strains.

Quick back-and-forth "jittering" motions may give rise to vibrations in the robot's body that may be sensitive to the status of many facets of the robot's physical condition and sensory capabilities. Jittering motions may involve rapid cyclical fluctuations in direction or force of physical effort so as to evince regular vibrations. Jittering motions may put the entire body of the robot through rapid rhythmic movements, in order to detect and amplify unexpected or irregular patterns, and to determine if all of the body's elements are interoperating as intended. In a normal jittering session, pre-specified alterations in the direction and strength of forces reach throughout the body, and the resulting movements and accelerations, including particularly the frequency and magnitude of vibrations, are measured. Frequency and magnitude may be informative of the robot's status, and in addition the actual dynamic patterns of the body's response may be calculated in real time and analyzed for signs of underlying issues such as excess inertia or wobble. Various versions of these dancing and jittering exercises may also serve as routine preventive exercises for early detection of incipient faults that have not yet grown large enough to show up in ordinary activities. Such preventative exercises may be included, for example, in the evaluation of physical integrity 611 below.

The various testing exercises may be stored as a library in a database associated and/or interacting with the robot and its system 206. Based on different robot types, functions and testing purposes, appropriate testing exercises may be selected. The library may be, for example, stored in a memory unit coupled to the system 106-4 external to the robot as described in FIG. 1. Alternatively, the library may be part of the robot 106-1, 106-2, 106-3, or attached/installed/integrated into the robot 100, as described in FIG. 1. For example, the library may be part of the control system 210.

Figure 6:
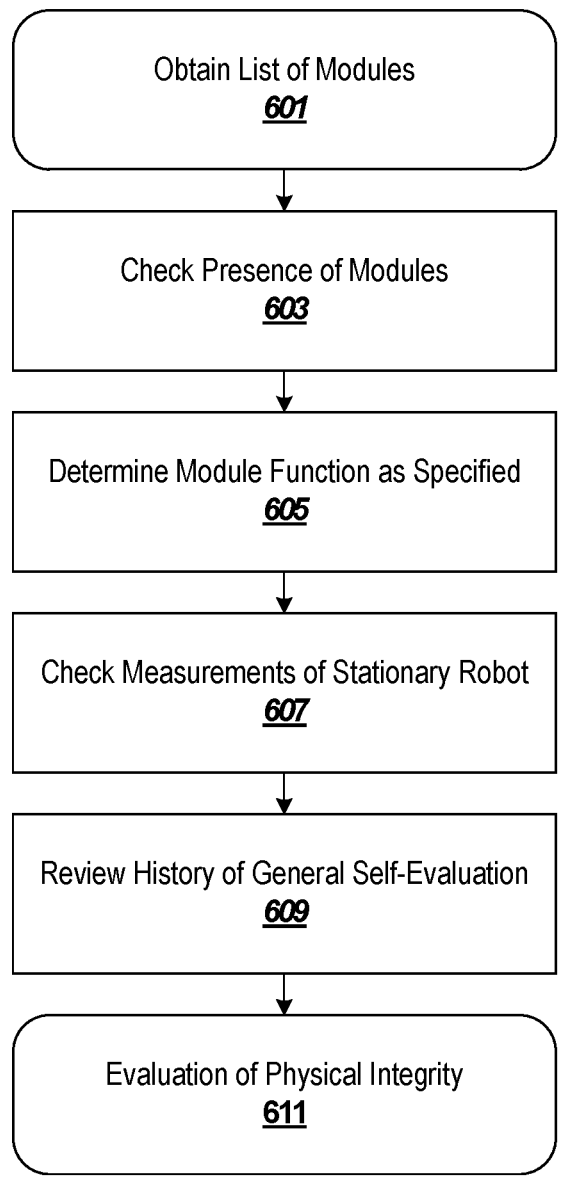
FIG. 6 illustrates a method for general self-evaluation.

In another aspect, a general self-evaluation method is provided. The method can be utilized to evaluate physical fault of a robot 100, either prior to its operation or during the operation. FIG. 6 illustrates a method of general self-evaluation. The method may begin with obtaining a list of modules (or any other components or systems) of a robot 100 (operation 601). The modules may be the same as described in FIG. 2 and/or FIG. 3B, or may include any of the components that are part of the robot or interacting with the robot. The modules may be respectively associated with module identifiers. The module identifiers may be created or inputted during the design phase of the robot. Operating and repair history associated with each module may be obtained and stored in a memory coupled to, or interacting with the system 206. Next, the presence of the modules may be checked (operation 603). The system may be configured to confirm the presence of each module by the module identifier and the full history of each module. Once it is confirmed that the modules are present, functions associated with each module may be checked under internal condition tests (operation 605). Each module may be prompted to conduct an internal condition test to confirm correct functionality.

In the following operation 607, the static characteristics of the robot are obtained and examined. The static characteristics may include, for example, weight, temperature, power consumption, motor and sensor specification and so forth. Next, a history of the general evaluation may be reviewed (operation 609). The history of the general evaluation may be stored in one or more storage devices or databases associated with the robot and the system 206. The evaluation history may include data on each module and its operation history, fault diagnosis history, modification history, and the like. Next, evaluation of physical fault detection and diagnosis may be performed (operation 611), which may involve a program of fault detecting and diagnostic exercises described herein. The process of performing such exercises can be the same process as described previously, for example, in FIGS. 4 and 5.

Figure 7:
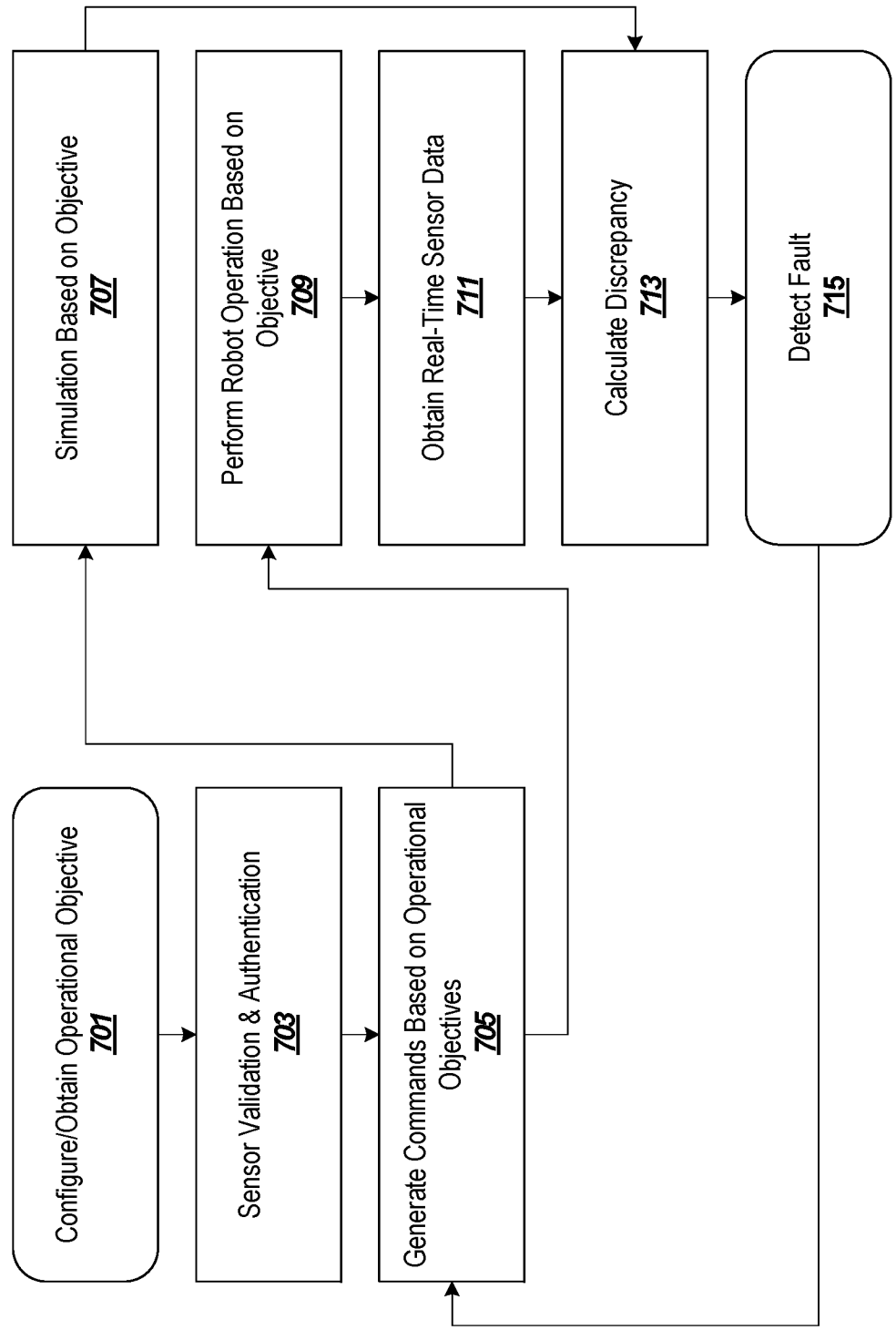
FIG. 7 illustrates a method for operational fault identification and command update.

FIG. 7 illustrates a method for operational fault identification and update. The process may begin with obtaining an operational objective of the robot 100 (operation 701). The operational objective may include information regarding the operations performed by the robot and conditions such as environment of the robot. The operations or functions to be performed can be obtained from an operator of the robot 100, control system 210, or one or more memory or storage devices of the robot. The operation conditions such as the environment can be obtained by one or more sensors located onboard the robot, in the environment (e.g., environment sensors 104), or by sensors onboard other robots (e.g., sensory system 204).

Next, the one or more sensors of the robot 100 may be validated and authenticated (operation 703). Sensors can be validated through authentication by confirming that individually or collectively they yield a known or verifiable value. For example, self-sensing proprioceptors and interoceptors can be authenticated when they match the simulation values of the USM module 308. Various other methods may be used for authenticating sensors as described above, including methods described in FIG. 4.

Once the validity and authenticity of the sensors are confirmed, the robot or a plurality of robots 100 may be controlled to function and operate according to their specific operational objectives 705. During the operation, the robot or a plurality of robots may perform functions in response to commands generated from their own control system 210 (operation 709). In the meantime, real-time or near real-time sensor data may be collected 711 from one or more exteroceptive sensors on the robot, in the environment (e.g., environment sensors 104), or other robots. During the operation, simulations based on the operation objective may be performed in parallel (operation 707), for example, by the system 206. In some cases, a subset of the sensor data such as payload, operation conditions, temperature, and the like may be input to the simulation to generate real-time simulation results. The actual performance of the robot obtained from the sensor data and the simulation results of the robot performance may be compared and calculated for discrepancy 713. Based on the calculated discrepancy, fault may be detected (operation 715) and diagnosed. Fault detection and diagnosis may follow the operations described in FIGS. 4 and 5. The robot commands may or may not be updated based on the detected fault. For instance, if the diagnosis reveals a fault that requires additional operations for the robot to perform, the robot commands are updated to reflect those adjustments.

Figure 8:
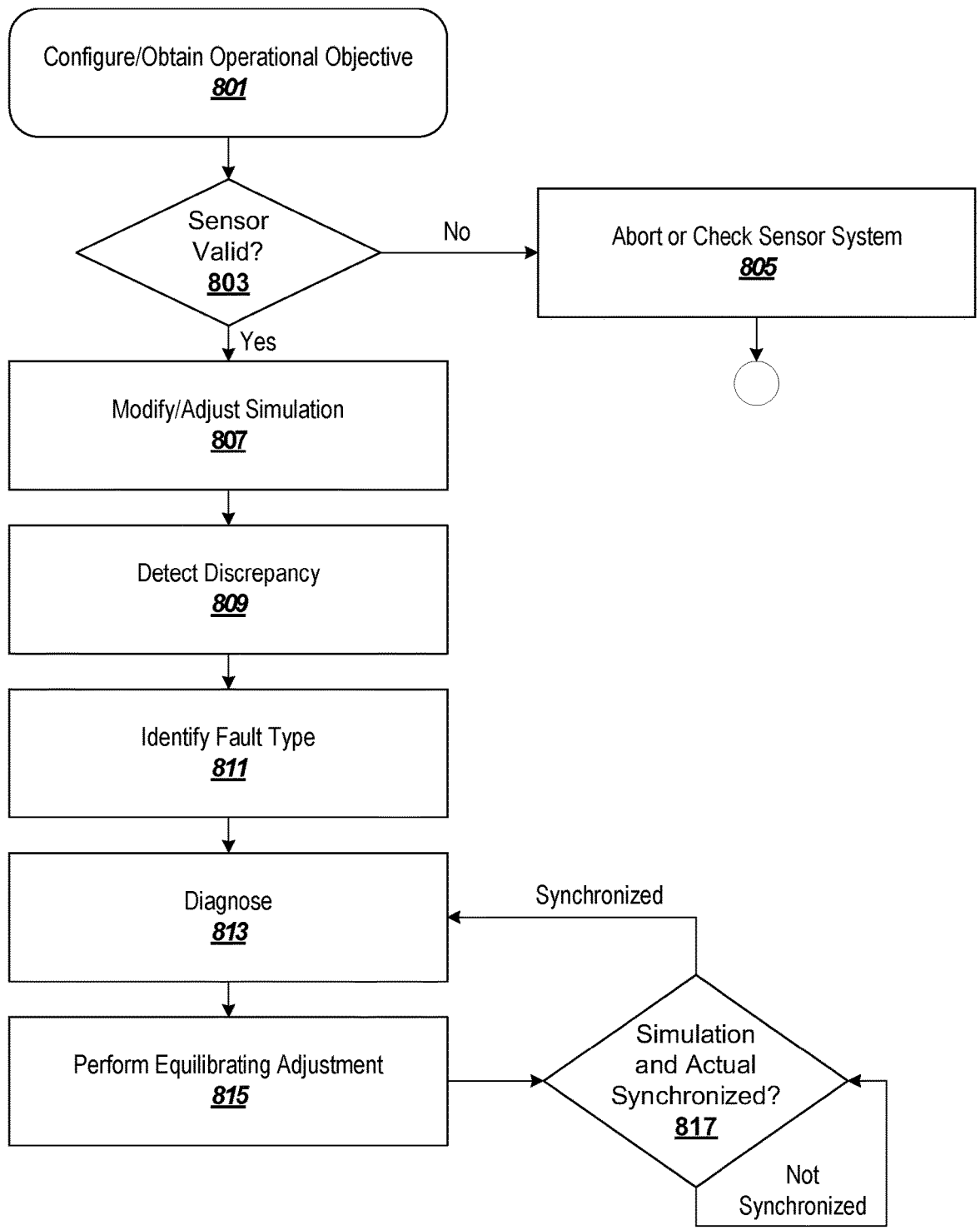
FIG. 8 illustrates a method for detecting and diagnosing fault, and synchronizing operations.

FIG. 8 illustrates a method for detecting and diagnosing fault, and synchronizing operations of the robot 100. The method may begin with a sensor validation operation 801, the method which is also described above (e.g., FIG. 4). In some embodiments, the system 206 may be configured to check the validity of the sensors (operation 803). If the sensors are confirmed to be not valid, the process may be aborted and an alert may be generated to indicate the error (operation 805). If the sensors are confirmed to be valid, the process may proceed to the operations of the robot.

The sensor systems 204 may be configured to obtain data regarding the external environment. If one or more external factors are present, the system 206 may be configured to augment or update the USM module 308 simulation in order to account for the external factors. In some embodiments, the XRDS module 306 may be configured to provide information or data to augment or update the USM module. The robot may or may not undergo general self-evaluation before the actual operations (e.g., FIG. 6).

Next, the system 206 may be configured to detect discrepancy between actual robot performance and simulated performance using the models stored in the USM module and/or the models stored or accessible by the XRDS module 306, as adjusted for external factors (operation 807). For example, if external factors affect the operations of the robot, the system 206 may be configured to adjust for the external factors and execute the discrepancy detection operation (operation 809), or the system 206 may be configured to run the discrepancy detection operation without external factor adjustments if no external factors are present. If no discrepancy is detected, the process is complete. If a discrepancy is detected, then based on the detected discrepancy, a cause of anomaly or fault type may be identified based on a fault library (operation 811). The fault library may store typical or atypical fault types associated with various robots under different conditions and operational objectives. If the fault is identified to be correlated or associated with internal fault, the process may proceed to further diagnose the fault by performing pre-set exercises and/or randomized exercises (operation 813), for example, as described herein in FIG. 5. Once the diagnosis is identified the robot may be configured to enter the equilibrating adjustment phase (operation 815).

Equilibrating Adjustment

Once the cause of the anomaly is identified, the nature and magnitude of the fault can be determined through further diagnostic exercises, including exercises described herein. The system 206 may also serve various additional functions. The system may be configured to self-validate the diagnosis, or modify/update the simulations calculated by the robot 100 for continued operations.

In some embodiments, additional exercises may be included for verifying the fault diagnosis using equilibrating adjustment methods. The cause may be verified when adjustments to the USM module 308 simulation parameters bring the simulation back into alignment with actual performance in the exercises (operation 817). In some embodiments, the SPA module 304 may be configured to provide such alignment of simulation and actual operations. If the adjustments to the USM module 308 simulations bring the simulations back into alignment with actual performance, the diagnosis is tentatively confirmed. However, if the adjustments fail to bring the simulation back into alignment with the actual performance of the robot, the system 206 may be configured to re-enter the diagnosis phase to figure out a more accurate diagnosis (back to operation 813). Alternatively, equilibrating adjustment may be utilized as a trial and error method for diagnosis. Various adjustments to the simulation module may correspond to a specific cause or a diagnosis, and if the adjustments result in the alignment of simulation and actual operations, the diagnosis may be confirmed.

In some embodiments, the system 206 may be configured to provide equilibrating adjustments to the USM module 308 for the purposes of continued operations under the diagnosed fault. An equilibrating adjustment can allow the USM module simulation to work effectively until the diagnosed or identified problem is rectified at the physical level, at which time the simulation parameters can be reset to their nominal values. For example, if an arm consistently operates more slowly than expected, the problem may be associated with a stiff joint: a consistent discrepancy between measurements and real operations can be confirmed by moving the arm experimentally and observing that the drag occurs consistently. The source of the problem can be investigated or identified by checking the limb for signs of frictional heating. Once a successful diagnosis of the anomalous pattern (such as a stiff joint) has been made, an equilibrating adjustment can be made to the USM module 308 to realign the calculation of predictions—based on model-based simulations—by adjusting the correct nominal response parameters so as to match the current degraded condition. This adjustment may be provided by the SPA module 304. This adjustment to the USM module may restore accurate predictions, and when actions are calculated according to the revised predictions, control or robot commands can correctly invoke the appropriate force to achieve the intended outcome. If this one correction brings all other predictions of the USM module simulation back into line with actuality, then a number of discrepancies will have been shown to arise from this single source, a stiff joint. The equilibrating adjustment can therefore be a sufficient representation of the symptoms of the problem. Thus an equilibrating adjustment that restores equality between predicted and actual outcomes corrects the performance of the robot, and can define and characterize the fault.

In some embodiments, under certain conditions, the equilibrating adjustment can temporarily adjust the USM module simulation to bring it into accordance with the robot's current state. The equilibrating adjustment may correct the USM module simulation enough so that when the robot 100 employs the USM module to calculate its movements, the resulting predictions can achieve sufficient accuracy for the robot to function effectively. The equilibrating adjustment may have a pre-set adjustment range. The pre-set adjustment range may be a safety range within which the robot may operation and function without significant damage. In some cases, when the adjustment is beyond the range, the adjustment may be aborted and an alert may be generated to indicate a significant fault. If the adjustment is not beyond a normal or safety range, the robotic system can be configured to continue to detect discrepancy by the system 206, for example, by using USM module 308 with adjusted parameters, and identify any subsequent fault type.

Figure 9A:
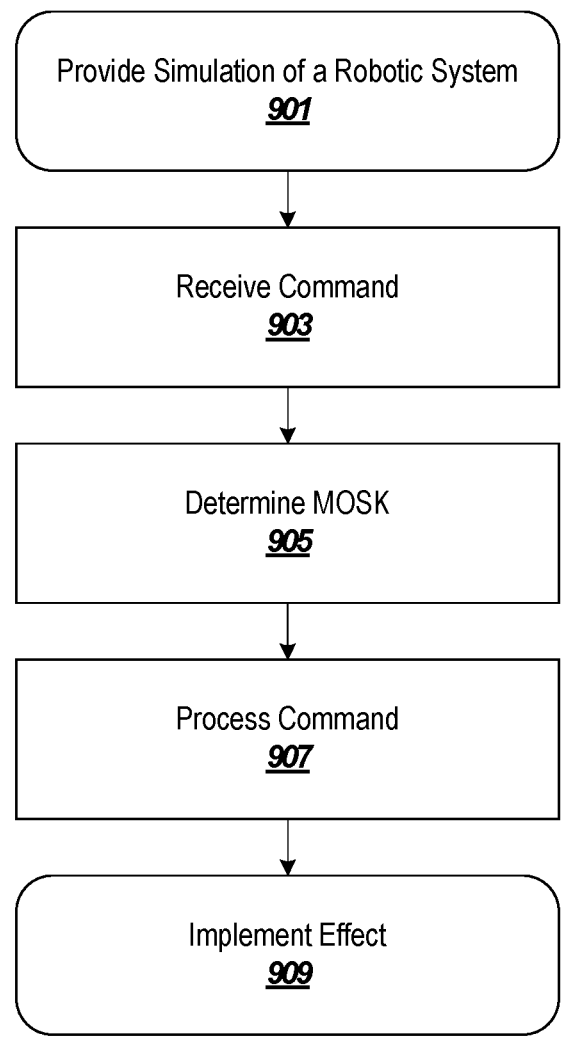
FIGS. 9A and 9B illustrate flowcharts of example processes that can be implemented within a robotics system.
Figure 9B:
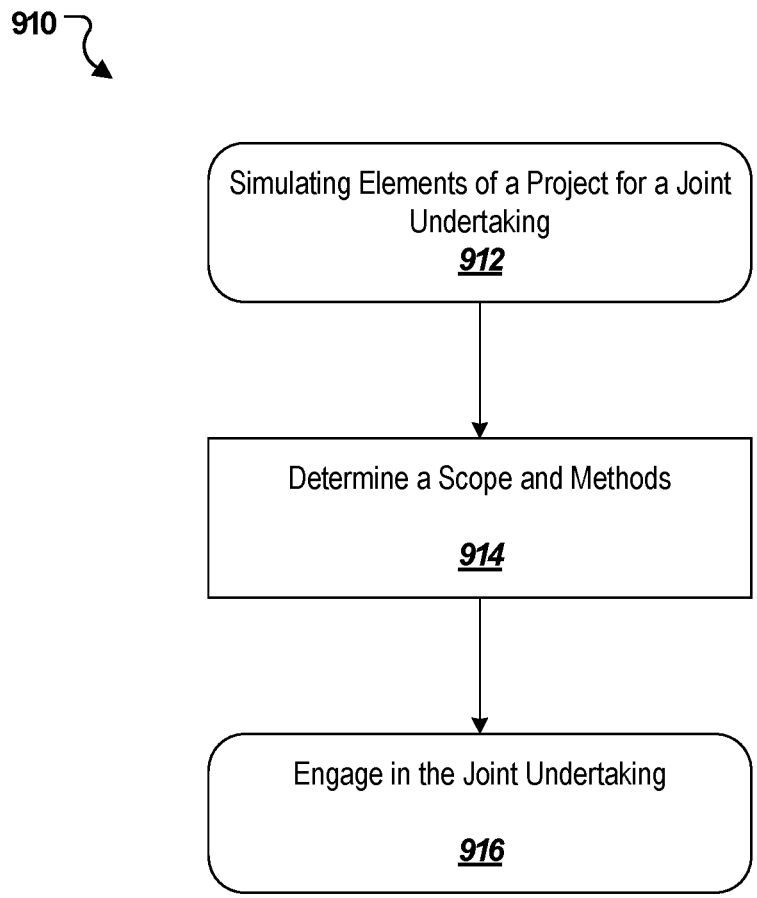

FIGS. 9A and 9B depict flowchart of example processes 900 and 910 respectively. The example processes 900 and 910 can each be implemented within a robotics system. The example process 900 shows in more detail how a robotic system may employ the described system to determine an effect to implement based on a received command that is processed through the various tiers described above. The example process 910 shows in more detail how a robotic system may employ the described system to engage in a joint undertaking with a human actor. For clarity of presentation, the description that follows generally describes the example processes 900 and 910 in the context of FIGS. 1-8, and 10A-11C. However, it will be understood that the processes 900 and 910 may be performed, for example, by any other suitable system, environment, software, and hardware, or a combination of systems, environments, software, and hardware as appropriate. In some embodiments, various operations of the processes 900 and 910 can be run in parallel, in combination, in loops, or in any order.

For process 900, at 901, a simulation of the robotics system is provided to an interface. The simulation is described by a USM and depicted within a simulated environment. In some embodiments, the interface comprises a display, a device that receives sound waves, or a device that receives electromagnetic radiation. In some embodiments, the robotics system comprises a structural system, a sensory system, an internal communication system, and an information processing system, wherein the USM models the structural system, the sensory system, the internal communication system, and the information processing system and provides detailed status and dynamic changing status for the robotics system. In some embodiments of the robotics system, the simulation of the robotics system describes physical components and structured assembly of the robotics system and calculates interactions among the physical components and structured assembly of the robotics system. In some embodiments, descriptions of the physical components and structured assembly of the robotics system are received and the USM is updated based on the received descriptions. In some embodiments, the model comprises delineation of emergency circumstances where ordinary roles are overridden. In some embodiments, descriptions of capabilities of the robot system and an external environment where the robotics system is functioning are received and the USM is updated based on the descriptions of the capabilities and the external environment. In some embodiments, the simulation of the robotics system interweaves simulations of assemblies that include both simulated designs of some components of the robotics system not yet fabricated and simulations of actual performance of other fabricated components of the robotic system. In some embodiments, during a diagnosis process, the simulation of the robotics system compares actual movements of the robotics system with movements dictated by an operations control, and the operations control simultaneously determines simulated signals to be provided through the display as correct movements. In some embodiments, the robotics system comprises a sensor system. In some embodiments, sensor data is received from the sensory system, the simulation of the robotics system described by a USM is compared with the sensor data, and the USM is updated based on the comparison. In some embodiments, the simulated environment comprises a 3D virtual representation. In some embodiments, a comprehensive diagnosis with an AVKB and an active learning tool RwL is performed. In some embodiments, the AVKB includes information from a RESSI including expectations and requirements for the robot system and a library of behaviors that RESSI requires from the robot system. In some embodiments, the interface comprises a VRE that depicts activities within the simulated environment. In some embodiments, the simulated environment is an approximation of the external environment. In some embodiments, the robotics system highlights discrepancies between aspects of the external environment and the simulated environment. In some embodiments, the discrepancies are updated in real-time or at a successive interval. From 901, the process 900 proceeds to 903.

At 903, a command is received through the interface. In some embodiments, a tier that corresponds to a detected problem that has given rise to a fault is provided through the interface. From 903, the process 900 proceeds to 905.

At 905, an applicable model, such as a MOSK, is determined for the command based on the USM and the simulated environment. In some embodiments, the model is developed based on a model simulating joint projects and conducting the joint projects in a collaborative setting that involves roles played by humans and the robotics system. In some embodiments, the model provides coordinated resources on a specialized procedure or topic that includes CMp. In some embodiments, the CMp comprises factual context, mistakes to avoid, and resources for learning, such as layouts of common subjects of dialogue between the robotic system and human with suggestions for communications, knowhow about performing tasks in this area, acquiring resources, researching special topics, or proposed formats and visual display materials. From 905, the process 900 proceeds to 907.

At 907, the command is processed with the MOSK and the USM to determine an appropriate effect. In some embodiments, the effect is determined based on a coherent mode of conduct and self-presentation modeled for the robotics system. In some embodiments, the command comprises a sequence of commands. In some embodiments, the command is received in natural language. In some embodiments, the command includes a suggested modification to a plan or a new approach in sequential detail to restructure the plan. From 907, the process 900 proceeds to 909.

At 909, the effect is effectuated. In some embodiments, XRDS performance based on a result of performing the action are evaluated. In some embodiments, the effect is effectuated by performing an action with an output. In some embodiments, the output comprises a motor, a servo, an engine, a device that emits sound waves, or a device that emits electromagnetic radiation. In some embodiments, a corrective command is received through the interface after performing the action and the USM is updated based on the corrective command. From 909, the process 900 ends.

For process 910, at 912 elements of a project for a joint undertaking are simulated. In some embodiments, the simulation includes separate approaches and natures of responsibility for the elements taken on by the robotics system and the elements taken on by the human actor, and circumstances in which contributions by the robotics system and/or the human actor can be interrupted or mistaken. From 912, the process 910 proceeds to 914.

At 914, a scope for the robotics system within the joint undertaking and methods for optimizing the joint undertaking is determined based on the simulation. From 914, the process proceeds to 916.

At 916, the joint undertaking is engaged in by the robotic system and the human actor through an interface with the human actor based on the determined scope and methods. In some embodiments, the interface provides for the joint undertaking between the robotics system and a human actor. In some embodiments, real-time interactions with the human actor are conducted through the interface to engage in the joint undertaking. In some embodiments, the real-time interaction comprises communication of advance preparations for the joint undertaking determined according to the simulation. In some embodiments, the joint undertaking comprises sharing, through the interface, an overall plan and agreeing on an aggregate-level description of the plan and a range of trajectories envisaged in the plan with the human actor. In some embodiments, indications of any circumstances that threaten an excursion beyond the range of trajectories determined according to the simulation are provided through the interface. In some embodiments, the interface is configured to empower the human actor and the robotics system to initiate and follow through on a preventive course of action whenever the circumstances manifest.

Computer Control Systems

Figure 10A:
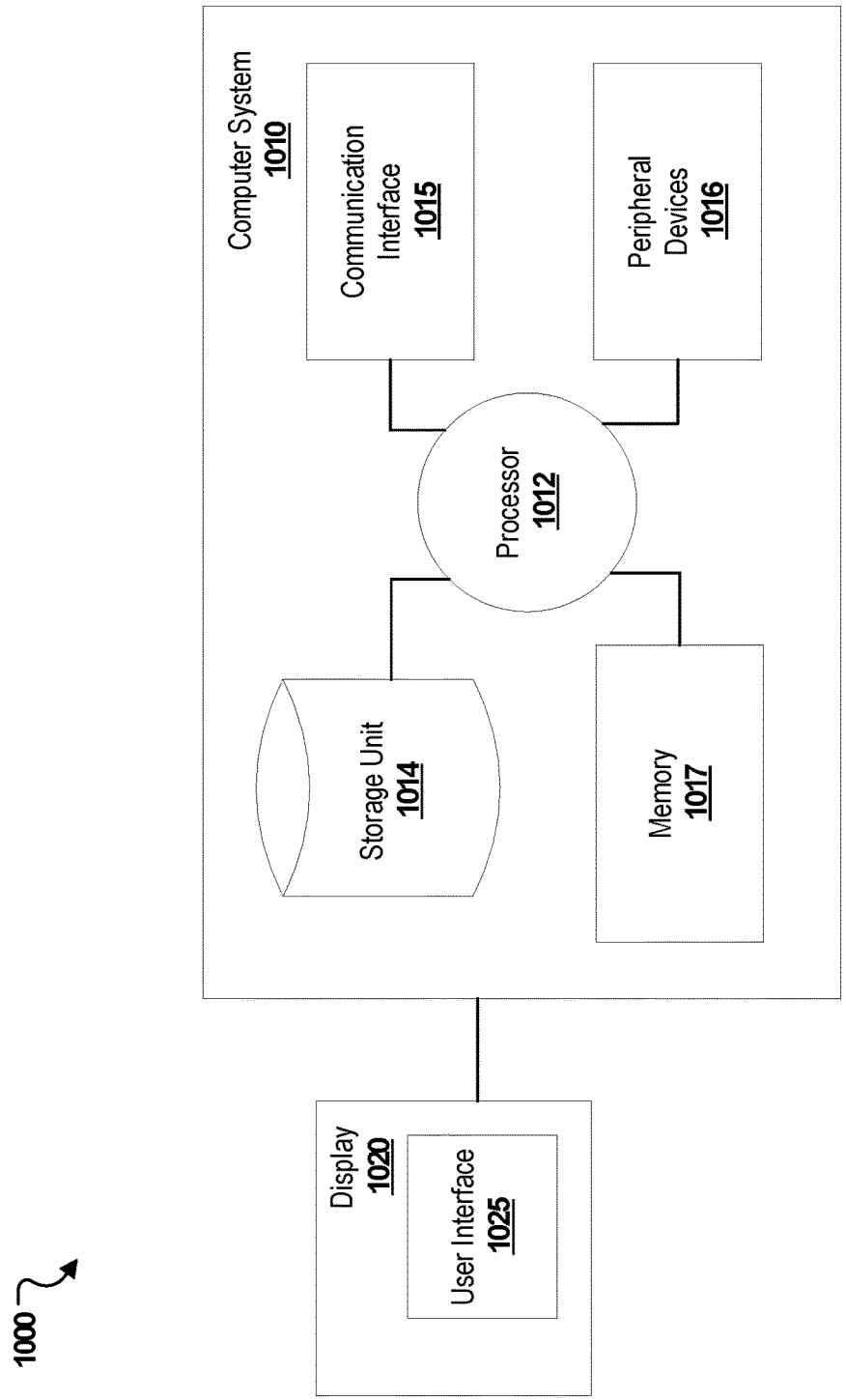
FIG. 10A illustrates example computer architecture applicable to any computer system and robot systems discussed herein.
Figure 10B:
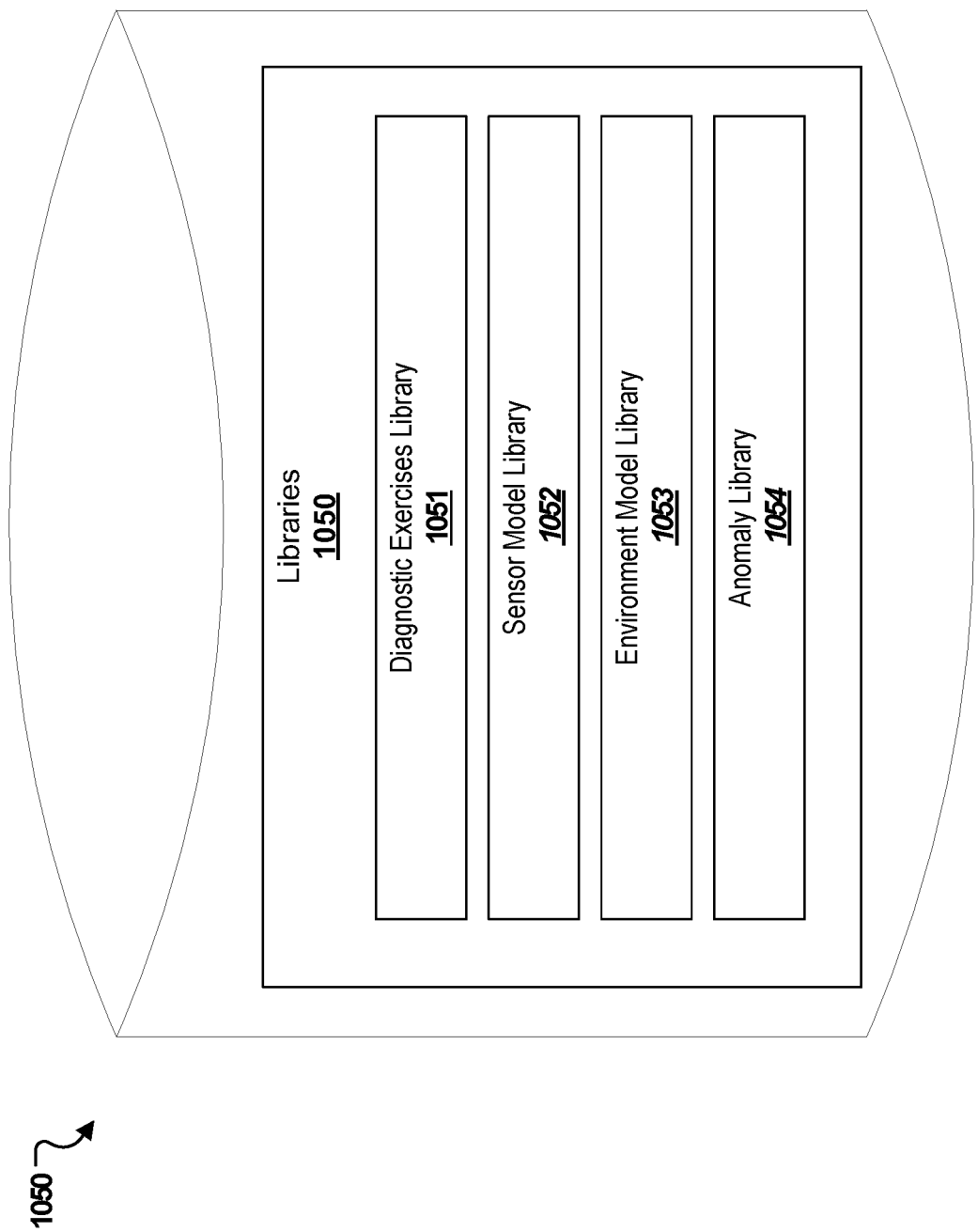
FIG. 10B illustrates example libraries stored with a computer architecture applicable to any computer system and robot systems discussed herein.

The present disclosure provides computer control systems that are programmed to implement methods of the disclosure, which may comprise one or more of software, hardware, or firmware, or any combination thereof. FIG. 10 illustrates example computer architecture applicable to any computer system and robot systems discussed herein. The computer system 1001 can regulate various aspects of the present disclosure, such as, for example, implement one or more methods described above. The computer system may be implemented to train a mental capability of a robot system such that the robot system may be able to intelligently adapt to various environments and perform self-evaluation. The computer system may be adapted to one or more types of robots and may be customized for a specific type of robot. In some embodiments, the computer system may represent the system 106 as described in FIG. 1, the system 206 and its tiers and modules described in FIGS. 3A-3B, or the robot 100 as described in FIG. 2. The computer system 1001 can be an electronic device of a user or a robot operator, or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The various components of a computer system may be implemented onboard a robot and may be distributed across the various robotic parts. For example, the CPU may reside in one part of the robot and the communication interface may reside in another part of the robot. The computer system 1001 may also be integrated into the robot to form various parts of the robot.

The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server. For example, the network 1030 may enable a plurality of robots to communicate to one another.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 include fetch, decode, execute, and write back. The one or more methods may be implemented in the software or program for monitoring fault of the robot. The software or program may not change the control system (e.g., control system 210) of the robot. The software or program may be added on top of the control system of the robot.

In some cases, the software may provide a user interface for a user to view information regarding the diagnosis and/or fault status of the robot. The user may be an administrator of one or more robots. The user interface may provide various aspects of the robot's functions as described herein. For example, the user interface may provide graphical illustrations of the discrepancy between the simulated results and the actual measurements from various sensors on the robot. The user interface may also visualize the environment in which the robot is located. The user interface may also provide various graphical illustrations as to which type of exercises the one or more robots are performing. The user interface may also provide visual illustrations of the robot's movements. The user interface may also provide guided steps to recover the robot from a fault. The user may also be permitted to set parameters for monitoring fault such as schedules, conditions and the like. The software or program may be configured to be able to interface with various robots and/or robotic systems.

The CPU 1005 can be part of a circuit, such as an integrated circuit. One or more other components of the system 901 can be included in the circuit. In some cases, the circuit is an application specific integrated circuit (ASIC). The control system 210 and the system 206, for example, may comprise the CPU.

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The storage unit 1014 can store one or more libraries 1050. The one or more libraries may comprise data and information for evaluation and/or monitoring fault of various robotic systems. The libraries may include a diagnostic exercises library which contains sets of pre-specified exercises and rules for generating randomized exercises; a sensor model library which contains models for some or all of the sensors to be used by the USM module 308 for simulation information; an environment model library which may contain one or more typical environment types such as indoor, outdoor, expected robot-environment interactions and the like; and an anomaly library which contains theoretic and empirical anomaly types for assisting identifying an anomaly type. One or more of the aforementioned libraries may be combined to form a single library. Alternatively, any one of the aforementioned libraries may comprise multiple sub-libraries. Each type of robot may also have different sets of libraries. Libraries may also differ based on the goal or the operation of the robot. The various components of the storage unit may be part of the robot or may reside external to the robot. For example, one or more libraries may reside internally in a storage unit as part of a robot and other libraries may reside in storage units external to the robot (e.g., accessible via wireless or wired networks).

The computer system 1001 can communicate with one or more remote computer systems through the network 1030. For instance, the computer system 1001 can communicate with a remote computer system of a user or a robot operator. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), personal digital assistants, or other robots with networking capabilities. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, real time simulation results of the robot, diagnosis reports, alerts generated during fault monitoring and the like. Users may be allowed to review the fault history of the robot or set schedules for performing exercises, including self-evaluation exercises, pre-determined exercises or randomized exercises. Examples of UI's include, without limitation, a GUI and web-based user interface. Below are a few examples of applying the provided methods to various robots under different situations.

In some cases, the provided computer architecture may be configured to operate as Indicative Decentralized Control (IDC). IDC is a multi-level control procedure. Control is "indicative" in the sense that the control center indicates goals and determines ranges of activity and priorities for various components. Control may be "decentralized" in the sense that the separate components are free to act within the scope of established priorities and ranges of activity as they perform as best they can relative to the indicated goals they have been assigned. Decentralized control can make sense when the activities of local components may be determined in their individual local contexts, and when proximate components can benefit by cooperating locally. IDC may also be advantageous because decentralized calculations can be performed more efficiently than centralized ones. IDC can allow local response to local sensory inputs and to other proximate local responses to proceed rapidly, while also providing for local circumstances and responses to be appraised less rapidly from a higher perspective and coordinated as necessary.

Example 1—A Wobble in a Limb

The robot 100 may have access to data and information regarding its own strength and the strength of each physical element of its body (e.g., physical system 202). To determine if it is capable of lifting an object, the robot may need to estimate the object's weight by shifting the object sideways or lifting one corner while measuring the resulting load on the robot's own joints. By performing one or more of the actions—or other analogous actions—listed above, the robot may be able to sense or measure the loads on its joints, sinews and so on. The robot may also be able to calculate a safe way of lifting the object and then compute whether its components can tolerate the load. For example, while it lifts the object, the robot may continuously measure the loads on its various joints. The USM module can calculate these figures based on scientific principles. Sensors that allow the robot to calculate the loads on its joints and sinews can also detect the presence and degree of any vibration or other instability. As the robot constantly measures the load on its joints in routine activities, it can detect any wobble.

Example 2—A Device Planted Outside or Inside

Many threats can be associated with planted—without knowledge or secretly—devices. The device could be a microphone or video camera, an explosive device, a canister carrying some poisonous substance, a jamming mechanism capable of broadcasting strong signals, or vibrations to interfere with the robot. The device could be activated by a timer or controlled remotely. The device could be attached to the outside by glue or magnetism, or placed within the robot through an access hatch. The provided system and method may allow the robot to detect a bomb that has been planted inside or on its surface.

The robot 100 may continuously calculate, via the sensor system 204 and USM 308, its weight, center of mass and distribution of mass in order to stabilize its body and maintain its balance in all kinds of situations. If a bomb is planted on it, the robot may be able detect small discrepancies between its actual weight, points of balance and inertia and the values predicted by the USM module. From this information, it may be able to calculate the small added weight and mass of the bomb as well as the position of that mass within or upon its body, by analyzing the object's impact on body weight, distribution of mass, points of balance and actual movements, for example, as the robot performs diagnostic exercises.

The provided system may also enable the robot to maintain its balance when it is standing on a ladder to change a light bulb. The robot may be able to maintain its balance while standing on a ladder and reaching out to change a light bulb, because it knows how much weight and mass it has and how its mass is distributed throughout its body. Accordingly, it can properly calculate the position of its limbs so as to keep its balance and maintain its stability.

Example 3—Two Mismatched Parts

This example illustrates how precisely modeling energy and force contributes to avoiding fault as well as maintaining ordinary functions. The robot's 100 USM module may fully specify power requirements as a function of physical effort, as well as the amount of physical effort that different situations require. When the robot plans to activate motors or other generators of motive force, the USM module predicts energy usage, and continues to predict usage moment by moment while the activity is underway. If the actual energy used, as measured by the CSM module, exceeds planned levels, the discrepancy may result from excess external load or an internal anomaly. Subsequent diagnosis may confirm stiffness in a joint that results from mismatched parts. Thus, when the robot knows the energy-response qualities of its moving joints, it will detect any slowing and reduced response relative to its USM specifications due to excess stiffness from a part mismatch or some other cause.

The provided method may also enable the robot to time its movements when it meets a person coming the other way in a hall and needs to step aside to make way. To time its movements as its slips by someone else walking down the hall, the robot may need to coordinate the responses of a number of motors and joints based on its knowledge of the rate and degree of response as a function of energy applied.

Example 4—An Intermittent Electrical Short Circuit

This example illustrates how a robot can detect an intermittent short-circuit in the wiring. As the robot continuously monitors its power usage, and compares every measurement throughout the body with the prediction based upon the USM, it can potentially discover any intermittent short circuits, determine the location of the short circuits in the body, and associate them with particular concurrent operations when the power is drawn.

The provided system and method may also allow the robot to plan its activities when operating on battery power and about to require a recharge. To plan its activities, the robot will need to calculate and budget its power usage. In order to effectively budget power usage, the robot will need to measure electrical usage throughout its body. The robot may further require reliable modeling of electricity usage in various activities, so that it can take account of its planned activities to accurately predict power usage.

Example 5—An Accident Prevention Tool

This example illustrates how a robot assists in a situation involving a self-driving car. In the example, when the car hits a pothole, but continues successfully and there is no significant immediate indication of damage, the robot can provide assistance. For example, operating at Tier 4 the robot can import a MOSK for the operating situation and can then display procedural recommendations to the driver. Continuing with the example, functioning from Tier 6 the robot can communicate to the driver that the car may have damage and recommend that the driver slow down and perform tests. If the driver agrees, the car slows down, and the robotic system controls steering while the proprioceptive sensors measure the response. After a number of repetitions (e.g., ten), functioning from Tier 2 the robotic system informs the owner that there is no apparent damage, and displays the right-front suspension average response profile compared to the design profile.

In another example, if the car's integrity testing reports a number of anomalies, the robot functioning from Tier 5 can provide assistance. For example, while the tires' air pressure has fallen and continues to decline slowly, and the car has instability at the right front, functioning from Tier 5 and Tier 6, the car suggests that the driver pull over, get out of the car, and check the right-front tire for damage to the rim or to the tire, since there is some evidence of underinflation. If upon exiting the vehicle, the driver discovers that the rim of the wheel hub is slightly bent and the tire has lost air pressure, the driver can take a photograph and sends it to the appropriate address on the car's support website, where it can be analyzed. The resulting analysis is then displayed to the owner as a Tier 1 report comparing, for example, the damaged rim with a rim in perfect form. Subsequently, a report functioning from Tier 4 suggests options, including that the car can find a safe stopping place for the owner to install a spare tire, the car can contact AAA (The American Auto Association) for roadside service, or the car can continue driving to reach the destination before the pressure falls too low. The car additionally downloads another MOSK on this subject, and after finding a safe parking place, displays the instructions for the driver to read. After the owner starts the project, functioning from Tier 4 the car displays messages as the task progresses, to ask questions, give advice and make suggestions as guided by the MOSK.

Example 6—A Traffic Management Tool

Figure 11A:
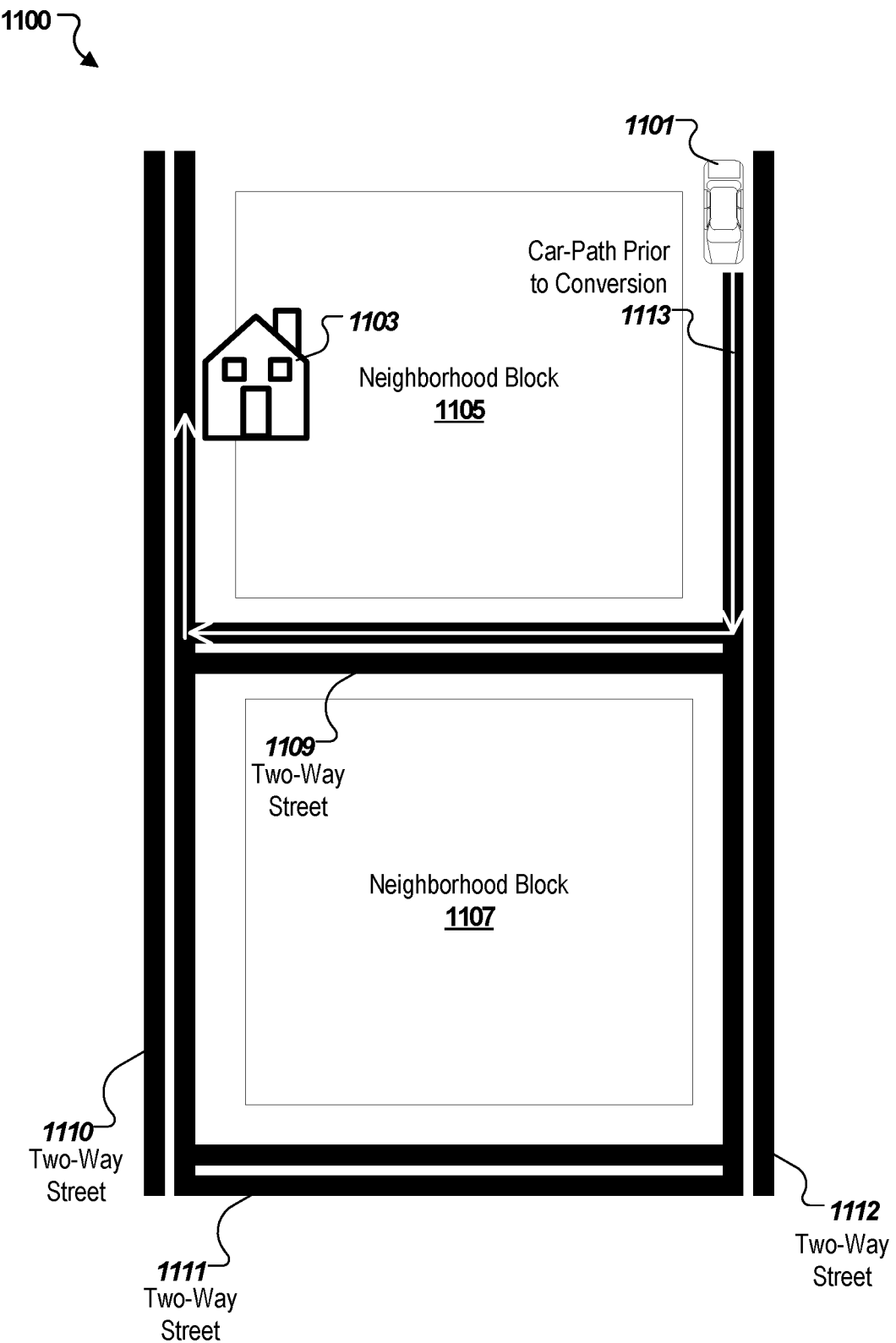
FIGS. 11A-11C illustrate an example environment that includes a robot employed within a self-driving car.
Figure 11B:
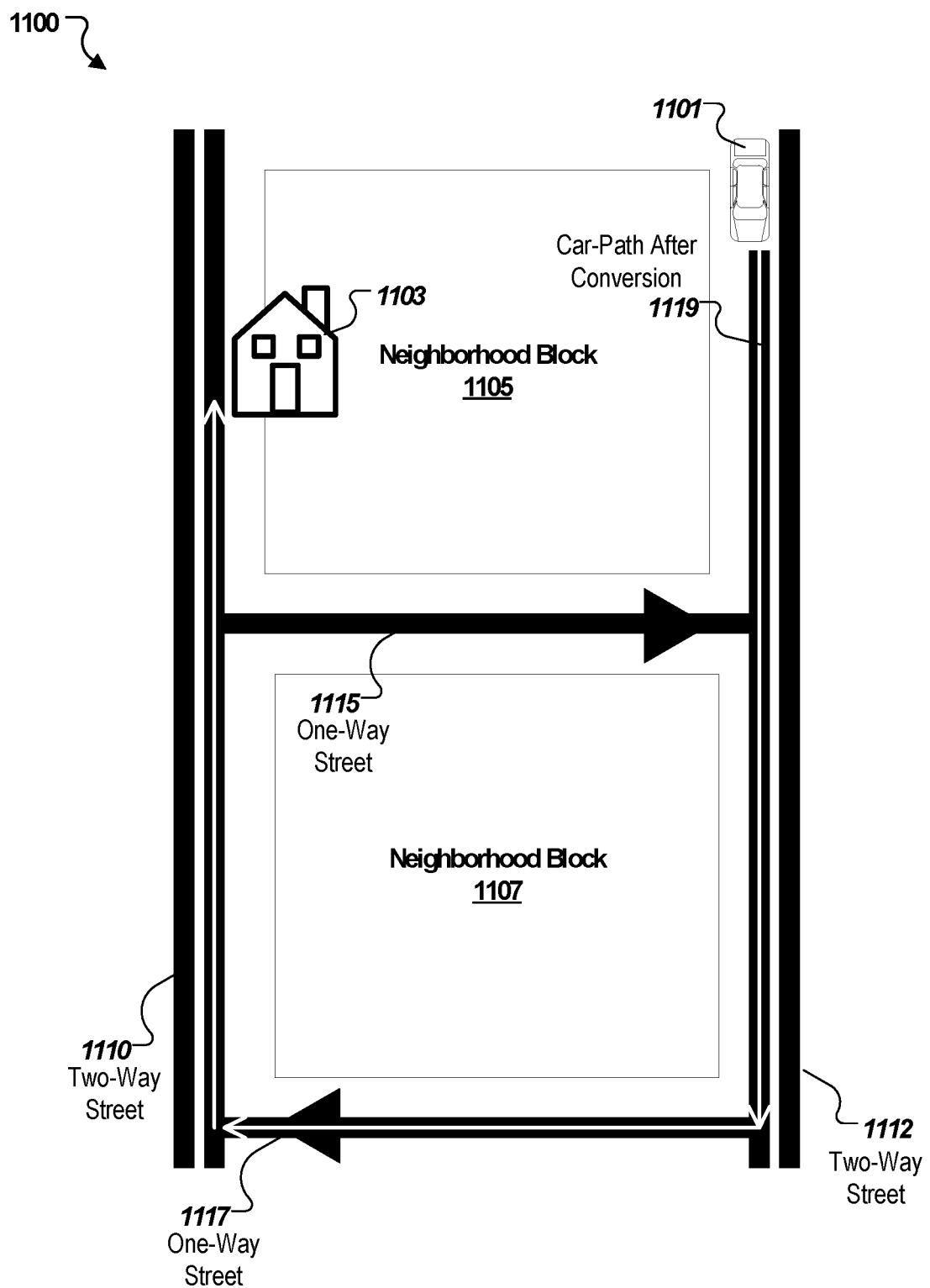
Figure 11C:
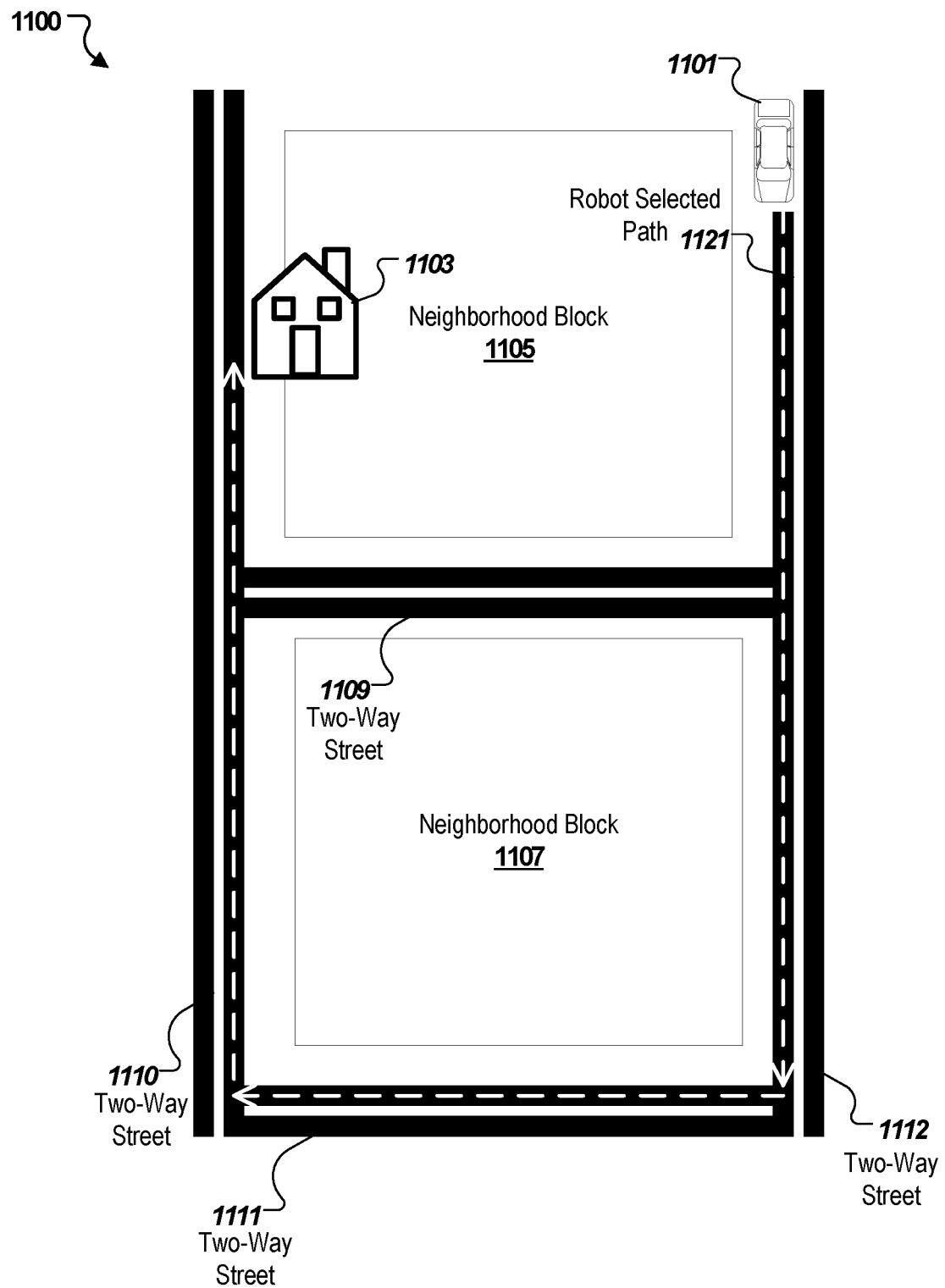

This example, depicted in FIG. 11A-FIG. 11C, illustrates an environment 1100 that includes a robotic system employed within a self-driving car 1101. In the depicted example, a customer requests a ride to a house 1103 located on a cross-street on a neighborhood block 1105 separated from the next neighborhood block 1107 by a two-way street 1109. FIG. 11A depicts the environment 900 before conversion of the two-way streets 1109 and 1111 to one-way streets 1115 and 1117 (depicted in FIG. 11B). In the example, the robotic system assists in establishing the route for the car 1101. For instance, the day before the conversion, the route 1113 would be appropriate. As depicted in FIG. 11A, the route 1113 involves the car 1101 taking the two-way street 1112, then calls for a right turn onto the two-way street 1109 and directs the vehicle to take another right turn onto two-way street 1110 to drive part of a block, taking the car 1101 around the neighborhood block 1105 and then stopping at the house 1103. However, as shown in FIG. 11B, once the conversion has been made of two-way street 1109 to one-way street 1115, and of two-way street 1111 to one-way street 1117, the suitable route calls for continuing one more block past the one-way street 1115 that maintains the opposite flow of traffic, before turning right onto the one-way street 1117 that maintains the necessary directions of traffic flow, around the neighborhood block 1107, and driving that extra block before reaching the house 1103. Within this scenario, two extra blocks of driving are included in the car's path 1119 after the road conversion, as depicted in FIG. 11B.

In the depicted example, the car's 1101 robotic system consults various sources of traffic information, and recognizes disagreement among them concerning whether the road conversion is complete. The robot's AVKB assists with determining a safe pathway. The AVKB is designed to find a best solution while taking into account all available information, and routinely considers multiple factors and analyzes conflicting information, unlike most systems that seek a single "correct" solution to an oversimplified problem specification. One of the factors that the AVKB takes into account is that, because of the differences among various sources of public information on the web, the streets being converted may be dangerous at night due to driver confusion. Therefore, the AVKB determines that the safe solution is to follow the path 1121, depicted in FIG. 11C, that takes the car one block farther, but is safe in both the pre-conversion configuration of the roads (FIG. 11A) and the post conversion configuration (FIG. 11B).

In some embodiments, the AVKB documents this decision internally in a brief description that assists in notifying the passenger. In some embodiments, the car follows the selected path 1121, and because it is safe in either case, does not inform the passenger. If the passenger, however, has visited the house 1103 before, and protests when the car 1101 goes through the first intersection instead of turning right, the car 1101 may then present to the driver the decision provided by the AVKB in the Tier 2 display. If the passenger communicates that the street signs indicate a two-way street, the robotic system determines its responsibilities at the Tier 5 level, taking into account the Tier 6 models of the cooperative relationship between passenger and robot, and chooses to reply in a Tier 5 display that quotes a regulatory guidance to always choose the safest alternative, and gives the analysis from the AVKB.

In some embodiments, through the described system (e.g., the USM and the AVKB) the robot employed within a self-driving car 1101 also determines effects (e.g., a course of action that may include stopping or otherwise avoiding a hazard) to take given unexpected conditions in or on the road, such as a pothole or fallen branch. The described system allows the robot to determine such a course of action based on, not only perceived road conditions, but also on the instruction provided by the human occupant. For example, the human occupant may be injured and have relayed this information to the robot. The robot considers this context when determine the course of action. Other real-time factors includes, for example, a treacherous road, such as on a hill or mountain where the shoulder is adjacent to a cliff or drop-off, or an ambiguous circumstance, such as on a narrow or one lane bridge, where the robot may factor in to any decision the circumstances or capabilities of other drivers (whether human or robot) in the area.

Example 7—Comparative Advantage

This example illustrates how a robot or group of robots can provide a comparative advantage for a group of coordinating humans. For example, a robot(s) can be employed throughout the design and implementation of large scale systems, such as an enterprise level system rollout or the design and construction of a new aircraft. In such scenarios, various designs and implantation of the designs may not be known by each group of coordinating humans throughout a project lifecycle (e.g., a system designed to be implemented in a particular way may be implemented in another way based on various factors). A robot (e.g., an AI supplement) may be provided with information throughout the project lifecycle. Such a robot can determine issues, valid critical scenarios and system, ask questions, and raise concerns to the group of coordinating humans regarding possible vulnerabilities or potential problems in the large scale systems. In such an example, the described system can provide an interface to facilitate a support ecosystem where the robot benefits from human interaction providing, for example, human creativity to the various questions posed by the robot.

Example 8—Joint Undertaking of Care

This example illustrates how a robot takes into account the various obligations, such as privacy and legal obligations, to determine a course of action. The example provides the describe system implemented within a self-driving automobile or a supplement to a self-driving automobile. A human may arrive alone at the automobile not feeling well or under the influence of drugs or alcohol and ask to be driven home. The drive may be a familiar drive for the robot. The human may tell the robot about his or her symptoms. The robot may prompt the human to provide such information. Based on the provided information the robot may determine that the human is intoxicated or having a serious medical emergency, such as a stoke. The robot processes the received information through the AVKB and may take a route that is sort of on the way to the hospital but also headed home as it collects more information. The robot may take into account obligation to friends and family of the human (e.g., should they be notified about the condition of the human). The human may have asked the robot not to tell family about drinking and not to call the authorities. However, riding alone in a self-driving automobile may be illegal in the jurisdiction, but on the other hand if the situation or behavior of the human is not harmful, the law may not require the robot to report the situation. The example underscores the joint undertaking with humans a robot may consider to provide care and service, and at the same time, the considerations the robot may process regarding any obligations to other humans, such as family and friends.

In some examples, a robotic system may support patients who exhibit continuing symptoms that persist despite conventional treatment and can potentially discern critical scenarios related to complex illness. In some cases, complex illness may arise in part due to commonly applied treatment regimens that are unsuited for a particular patient's phenotype or physical condition. Symptom profiles taken in conjunction with treatment profiles may show unique patterns exhibited by multiple patients that are best detected by a comprehensive analysis system, and that become critical scenarios in which a unique corresponding medical response for patients in this category has been discovered by innovative physicians and shown to achieve consistent success. The sheer complexity of the human body, when taken in conjunction with the ever-increasing complexity of the medical armamentarium, may contribute to the recognition of the need for a robotic system, such as the robotic systems provided herein which may be dedicated to analyzing combined symptom and treatment profiles. For example, there may be instances where physicians may have found solutions for symptom/treatment profiles which are not yet conventionally recognized. The robotic system can take various steps to guide patients to possible solutions and potentially contribute to structuring medical knowledge more incisively.

Example 9—Topic and Term Map (ToTeM)

This example illustrates how a robot can provide a link between two different modes of human thought where a person fetches into the background to some degree from a verbal map in order to enrich a topic's representation. Where one mode of thought includes language structured linguistically where the lead steps are recollection of verbal material (e.g., terms) and the second mode includes a more integrated structure based on recollection or imagination of experience. For example, when a person loses their ready memory of terms, such as the names of people, the transition is being done from both of those operating in parallel to a status where only the integrated one works readily.

A robot employing the described system can function as a supporter for someone who has made such a transition in a sense that the robot would know enough about the topics, via for example a ToTeM, to remember the terms and could suggest them to the person. (e.g., the robot could say to the person, oh, you're thinking about George). Moreover, a robot can use these parallel systems to observe a human's processes and learn, through experience with each human, how to assist by constructing over time and applying a ToTeM for each human. Such ToTeMs can be employed by a robot through the described system to help with these humans' thought process and step in as each's mental capabilities start to transform. In some embodiments, to construct a ToTeM as well as to improve natural language processes, a robot attaches relevant terms like people's names, people's sentences and people's descriptions to situations not only based upon a human's usage of terms, but also based upon terms applied by other people who were there along with the person.

Example 10—Relationship Among Robots

Relationships among robots may originally take shape as robots help in the assembly, maintenance, care and training of other robots. In an embodiment, robots will be able to share information in a standard information format where it is supported with pointers that indicate the connections of its content to structure, index and/or mapping in the AVKB or some segment of the AVKB dedicated to robot communications. These same communications structures could be extended to electronic equipment such as computers and sophisticated mechanical equipment, so that robots could also contribute to maintenance in these areas.

Robots may also work together on construction of material objects and in validating knowledge systems. Robots belonging to different people may also assist in their owners' communications and develop mutual connections in this role of intermediation. Robots may develop shared views of the nature of their interactions as they cooperate in these ways. Since robots may not require daily breaks for sleep and other rest intervals in daily activities, in some embodiments it will be valuable for robots to develop independent cooperative capabilities in order to work over longer periods than humans. For example, one robot can help another robot to import a MOSK required for mutual understanding of some feature of the work.

It will be worthwhile to develop the necessary qualities for relationship among robots early on for many reasons. In some embodiments, inter-robot relationships might be a useful starting point for developing the capacity for relationships with humans.

In some examples, when a robot is relating closely with humans, and the humans wish to be in touch with the robot as closely as possible, the humans can work out a way for the robot to signal its present situation, the present rate of change of its situation, and its near-term intentions. In addition to its visible posture and movements, the signals may be some combination of sounds such as musical phrases or verbal cues, images such as lights in different sizes or colors, facial expressions in circumstances where the humans can see the robot's face and the face can form expressions, or images on a display screen. Alternatively, instead of using bodily signals, the robot may use electronic signals sent to devices visible to the humans that convert the signals into suitable sounds or images. The humans also need to inform the robot of their present situation, rate of change in situation, and near-term intentions. They may signal in ways similar to the robot, for example by communicating verbally, or they may signal by using electronic signals that are controlled by their fingers or by bodily movements that are interpreted by a specialized device, translated into signals comprehensible to the robot and sent electronically to the robot.

With the aid of these information sharing strategies, robot and human who are jointly engaged in any undertaking can be equipped to maintain a state of close cooperation while working together. As described in the example above concerning cooperation among robots, each can be aware of the doings and the situation of the other in a timely way, and potentially in real time. Also, robot, and human can be attuned with one another in the sense that they are modeling simultaneously the situations and doings of the other along with their own. In another words, each maintains a model of a whole that comprises the group of two. There can also be reciprocity of response: if a robot or human responds to an unexpected event of some kind, the other is simultaneously aware of this response and potentially responds with a reciprocal response of its own, Also, the initial respondent is aware of the reciprocal responses of the other, if any, and potentially reciprocates with its own responses to that response. In some embodiments, the coverage can extend beyond the present status and present rate of change of status of each to projected near-term plans and medium-term intentions.

As in the case of mutual responsiveness among robots presented above, this state of mutual awareness, attunement and reciprocity of response between human and robot can be useful in circumstances where concerted actions may be called for suddenly or where a delicate situation requires unusually accurate coordination of mutual efforts. Communications between robot and human cannot be as precise or reliably delivered as was the case of interconnections among robots, but on the other hand close coordination between robot and human, with their complementary skills, may be more valuable that connections among robots in some situations. This close coordination may turn out to be useful in many situations.

Example 11—Tier Development and Provision of Skills and Knowledge

Examples of Tier Development and Provision of Skills and Knowledge are provided in Table 1 and the following sections.

posite-level simulation is essential for imperfectly known external beings and objects, extremely helpful in support of communication with humans, and often convenient for simplifying simulation calculations in situations that are complex and wherein details are not critical. The apex of the robot's simulations describes joint undertakings with humans, and simulates both robot and humans in a single integrated simulation, in which each side—robot and human—is simulated in its own circumstances and nature, in

TABLE 1

| Tier | I. Simulation | II. Conceptual Mappings | III. Learning through Implementation | IV. Interactive Cooperation with Interface | V. Relationship Skills |
| --- | --- | --- | --- | --- | --- |
| 1. Fault-free Design | Simulating Components | Conceptual Mappings | Active Validating Knowledge Base (AVKB) and Replay with Learning (RwL) | Interface for Modeling Beings and Objects | Robot for Human: Inherent Structure for Service with Five Knowledge Systems |
| 2. Function | Ubiquitous Simulation Model (USM) and Synchronizing Simulated with Actual (SPA) | Operations Control (OCo) Software | Modules for Skills and Knowledge (MOSKs) | Comprehensive Fault Detection and Diagnosis of Robots (CFDDR) | Relationships among Robots |
| 3. Composite/Detail Simulation for Performance | External Recognition, Description and Simulation (XRDS) at the Composite-Level | Multi-Level Simulation; Composites for Communication | Composite Level for Efficiency; Mapping Composite Descriptions to Details | Visual and Verbal Composite/Detail Interface | Relationships among Humans. Perspective and Insight |
| 4. Service | Simulating Robot Service Roles Interacting with Humans | Command Script Effect Schema (CSES) | Adjusting MOSK Role Descriptions for Local implementation and Innovation | Flexible interface for Human Involvement in Task Implementation | From Human to Robot: Emulating Human Task Demonstrations and Learning through Implementation |
| 5. Integrity | Simulating Integrity, and Response to Human Commands | Robot Ecosystem for Security, Support and Integrity (RESSI) | Self-Discipline; Implementing RESSI Rules on Responsibilities and Outputs | Interface implementing Self-care and Mutual Care | Aware and Attuned Relating with Robots, with Reciprocity of Response |
| 6. Joint Undertakings | Simulating Both Sides- Robot and Human--in Joint Undertakings; Critical Scenarios | Communicating the Robot's own Situation | Implementing Human and Robot Role Exchange with Joint Responsibility | Interface Exploiting Complementarity between Robotic and Human Mental Processes | Aware and Attuned Relating with Humans, with Reciprocity of Response |

In some examples, simulation is the basis of the robot's reliability and flexibility. The robot simulates its activities at the same time that it performs them and relies on synchronizing simulated predictions of its status with actual status to verify that it is operating faultlessly. Simulation is also a tool that the robot uses to plan its activities. The robot also uses simulation to explore and evaluate possible innovative solutions to new activities. Simulation is also an important element of the robot's understanding of itself, its external environment, its tasks, its interactions with humans it serves, its self-description, its integrity and responsibilities, and its cooperation with other robots. The robot is capable of simulation at the precise detail level, simulation at an approximate composite level, and multi-level simulation performed at both composite level and detail level. Comthe setting of a joint undertaking in which either may sometimes step in to take on aspects of the other's role.

Conceptual mappings connect verbal meanings and images to the robot's other knowledge systems, including simulation, physical constituents and properties, operations control software, and composite descriptions. Conceptual mappings are very important for the robotic system's communications with humans. They also play essential roles in elements of the system that provide records and context for robotic activities, such as Modules for Skills and Knowledge (MOSKs) and Command Script Effect Schema (CSES). Conceptual mappings also provide linkages that contribute importantly to the integration and validation of the various knowledge systems by the AVKB.

In Learning through Implementation (LtI), the robotics system implements a series of operational procedures and commands in order to observe the consequences. The sequence of operations may at first be explored by simulation, and subsequently implemented and analyzed by synchronizing simultaneous simulation with the actual outcomes. LtI is the robot's primary way of developing new skills and knowledge and innovating new methods. Learning through implementation also serves the robot in various situations where the robot receives recommendations regarding procedures to accomplish a task or fulfill a responsibility or understand a human circumstance, but wherein the robot may develop a way of implementing the recommendations that suits local circumstances not covered in the recommendations. Comprehensive detection and diagnosis of fault in robots depends upon simulation-based detection, diagnostic procedures and exploratory exercises that lead to diagnosis. All of this might be conducted or supervised by humans, but alternatively a robotics system might be in charge, and if so, the robotics system would carry out such procedures applying exactly the same principles as are applied more generally in learning through implementation. LtI offers a general approach for exploring the unknown.

In an embodiment, the skills and knowledge developed through learning through implementation are recorded in an Active Validating Knowledge Base (AVKB) and the process of learning through implementation is carried out by Replay with Learning (RwL) tools attached to the AVKB. AVKB and LtI can carry out the complex mapping of details and composite-level simulations in XRDS and organize the robotics system's multi-level simulations of its environment. LtI is applied by the Robotics System to organize and record the information in a Module for Operations, Skills and Knowledge (MOSK), and to adjust the requirements and circumstances of the local operating system faced by the robot. In an embodiment, a Robot Ecosystem for Security, Support and Integrity (RESSI) may oversee robotics systems conduct by promulgating principles that specify expectations and requirements for the robotics system including a library of required behaviors, and these specifications are housed within the AVKB and integrated with the robot's general knowledge and skills by LtI. Learning through Implementation is also central in maintaining and dynamically updating the context for exchanging roles with humans in a joint undertaking or substituting for a human in an emergency.

The robotics systems envisaged here, which can work together with humans in joint undertakings, are designed for interactive cooperation between robot and human. Interactive cooperation depends upon ongoing communication between robot and human that updates each side's awareness of the current status of the other and allows the two sides to mutually consider and jointly anticipate the subsequent course of action. The interface that allows such information sharing and mutual contact is a central element in the robot's design.

The two sides are intrinsically different and it is essential for each to be able to understand these differences. Mutual understanding will allow the two sides to both compensate for the challenging effects of the differences and also benefit from the complementarity of the two distinct capabilities. It is important that the basic design of the robotics system acknowledges the fundamental difference between a being or other thinking entity such as a human, a dog, or another robot, on the one hand, and an object such as a machine or a plant, on the other. The robotics system may have observational capabilities and modeling capabilities that are sensitive to the contrasts and quite different in these two cases, and which are capable of distinguishing between the two and dynamically attuning with each in distinct ways. The challenge of this is increasing as machines become increasing interactive and blend the two sets of capabilities.

Comprehensive Fault Detection and Diagnosis of Robots (CFDDR) is essential for reliability and security of robotics systems, and the diagnostic aspect involves exploring unknown conditions. Diagnosis may be particularly challenging when a robot has deteriorated or has been damaged. In an embodiment, a robotics system may find robotic solutions for the preliminary stages of diagnosis and the more straightforward forms of repair. This may have beneficial side-effects such as developing robots' self-descriptive capabilities and progressively enhancing communications interfaces among robots and interactive communications skills.

Because of the diversity of topics and the intrinsic complexity of a robotics system and the far greater complexity of a human being, it seems essential to offer closely correlated verbal and visual communications, and to use images and diagrams intensively. The interface may also be supported by structured linkages among units of content within the AVKB that may be manifested in portable form as MOSKs, and which can be informatively navigated by robot or human. Visual display may ultimately be the best tool for mutual understanding. In particular, human understanding is rooted in composites while robotics system understanding is rooted in the detailed elements of substance and time and space. It is natural for the interface to emphasize composite level representations for clarity on the human side, and to offer links from these composites to the detail level for the robotics side. The interface also offers diagrams displaying links between the two levels, potentially with intermediate levels in between. One of the key roles of the interface is to communicate to the human the unfolding aspects of the robot's service task or tasks so that the human can offer comments or guidance, and so that the human can contribute to the task's success. For example, the human may optionally participate in the implementation of a task by directly accomplishing part of it. The interface also serves purposes that primarily benefit the robot itself and again keep open the possibility for the human to become involved. For example, the interface can track events in the robot's self-care and self-discipline and make the information available to the human. In relation to robotic self-care and self-discipline, the interface may also assist in the robotics system sharing skills and knowledge associated with these for the benefit of other robots. In some embodiments, multiple robots may interact via the interfaces on these and other topics.

Perhaps the highest form of cooperation offered by the interface is coordinating mental capabilities in joint undertakings. For example, the human has native understanding of the human world, communications channels to other humans, intuitive sensitivities concerning human experiences, unique experiences and memories, the power of concentration, uniquely human creative capacities, and the ability to navigate links among otherwise disconnected items that come together in an important topic. By contrast, the robot can simultaneously give full attention to multiple phenomena and remain alert for significant events in respect to each of them, follow links among bits of information and perfectly recall whatever is relevant and, natively access the internet, communicate directly with human electronic systems, fully recall past events that have occurred and when necessary prepare recordings of them, and serve as a coordinator for multiple humans and robots while maintaining timeliness and keeping track of all interactions as appropriate. The interface can help to interweave these skill sets and knowledge bases in ongoing projects.

For the robotics system to share responsibility with humans on joint undertakings and cooperate closely and quickly with humans in challenging situations, there may be a need for a relationship between the human side and the robotics side that supports their cooperation. Relationship may develop through interaction. Relationship may depend on effective communication. Relationship may be enriched and stabilized by remembrance of shared experiences. Relationship may be strengthened as the parties adjust their ways of interacting to fit one another's preferences and requirements. Relationship can be somewhat standardized, but it may be much more powerful when it has taken shape between cooperators.

The relationship facet is developed in six stages. First, the design of the robot builds in serving humans as the robot's innate purpose. Second, relationships among robots are provided for in the robotic system's design and initially developed through shared usage and joint application of MOSKs and CFDDR procedures. Third, the robot can learn about relationships among humans as it learns to simulate its environment, and learn about human communication as it develops composite descriptions and composite-level communication skills, and explores the initially unknown environment with human assistance. It is important for the robot to appreciate the usefulness of human perspective and insight.

Fourth, the human's relationship with the robot develops as the human commands the robot in tasks. In particular, the human may sometimes demonstrate tasks to the robot and the robot will learn to accomplish a task by emulating the human and learning through implementation. The human may also get to know the robot better as it guides the robot to improve its performance in tasks. Fifth and sixth, the robot may progressively develop a closer form of relationship first with other robots and then with humans, in the setting of joint projects. This closer form of relationship entails three features: (i) each party is aware of the other; (ii) the two parties are attuned with one another as they work on the project; (iii) there is reciprocity of response, in the sense that each of the two parties is aware of both parties and attuned to both parties as the two respond to one another or to their shared situation.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A robotics system, comprising:
an interface;
one or more processors; and
a computer-readable storage device coupled to the one or more processors and having instructions stored thereon which, when executed by the one or more processors, cause the one or more processors to perform operations comprising:
providing, through the interface, a simulation of the robotics system defined by a Ubiquitous Simulation Model (USM) and depicted within a simulated environment;
receiving a command by the robotics system through the interface;
selecting a module hosting skills and knowledge for performing the command based on the USM and the simulated environment, wherein the skills and knowledge comprises a simulation capability corresponding to the command and/or a conceptual mapping capability support dialogue and understanding of interaction with a human;
processing the command with the module and the USM to determine an effect of the command, wherein the effect is determined based on a combined mode of conduct and self-presentation modeled for the robotics system, wherein the combined mode comprises modeling of views for the human and principles of integrity for the robotics system; and
implementing the effect.

2. The robotics system of claim 1, wherein the simulation of the robotics system describes physical components and a structured assembly of the robotics system and calculates interactions among the physical components and the structured assembly of the robotics system.

3. The robotics system of claim 2, wherein the operations comprise:
receiving descriptions of capabilities of the robotics system and an external environment where the robotics system is functioning, wherein the descriptions of the external environment are known to be accurate; and
updating the USM based on the descriptions of the capabilities and the external environment when at least one prediction dynamically generated by the USM is determined to be inaccurate.

4. The robotics system of claim 3, wherein the simulated environment is an approximation of the external environment, and wherein the external environment is described by the robot through a process of External Recognition, Description and Simulation (XRDS).

5. The robotics system of claim 3, wherein the simulation of the robotics system highlights discrepancies between aspects of the external environment and the simulated environment.

6. The robotics system of claim 5, wherein the robotics system further determines a cause for discrepancies between aspects of the external environment and the simulated environment.

7. The robotics system of claim 1, wherein the module is developed based on a model simulating joint human-robot projects and conducting the joint human-robot projects in a collaborative setting that involves roles played by humans and the robotics system.

8. The robotics system of claim 7, wherein the model simulating joint human-robot projects comprises delineation of emergency circumstances where ordinary roles are overridden.

9. The robotics system of claim 1, wherein the one or more processors further performs operation:
creating a human simulation model for a user, wherein the human simulation model is trained and updated by the interactions between the robotics system and the user.

10. The robotics system of claim 1, wherein the module hosting skills are knowledge is updated based on the implemented effect.

11. A computer-implemented method for implementing an effect with a robotics system based on a command, the method comprising:
providing, through an interface of a robotics system, a simulation of the robotics system defined by a Ubiquitous Simulation Model (USM) and depicted within a simulated environment;
receiving the command by the robotics system through the interface;
selecting a module hosting skills and knowledge for performing the command based on the USM and the simulated environment, wherein the skills and knowledge comprises a simulation capability corresponding to the command and/or a conceptual mapping capability support dialogue and understanding of interaction with a human;
processing the command with the module and the USM to determine an effect of the command, wherein the effect is determined based on a combined mode of conduct and self-presentation modeled for the robotics system, wherein the combined mode comprises modeling of views for the human and principles of integrity for the robotics system; and
implementing the effect with the robotic system.

12. The computer-implemented method of claim 11, wherein the simulation of the robotics system describes physical components and a structured assembly of the robotics system and calculates interactions among the physical components and the structured assembly of the robotics system.

13. The computer-implemented method of claim 12, comprising:
receiving descriptions of capabilities of the robot system and an external environment where the robotics system is functioning; and
updating the USM based on the descriptions of the capabilities and the external environment when at least one prediction dynamically generated by the USM is inaccurate.

14. The computer-implemented method of claim 13, wherein the simulated environment is an approximation of the external environment.

15. The computer-implemented method of claim 13, wherein the simulation of the robotics system highlights discrepancies between aspects of the external environment and the simulated environment.

16. The computer-implemented method of claim 15, wherein the method further comprises determining a cause discrepancies between aspects of the external environment and the simulated environment.

17. The computer-implemented method of claim 11, wherein the module is developed based on a model simulating joint projects and conducting the joint projects in a collaborative setting that involves roles played by humans and the robotics system.

18. The computer-implemented method of claim 17, wherein the model simulating joint projects comprises delineation of emergency circumstances where ordinary roles are overridden.

19. The computer-implemented method of claim 11, wherein the method further comprises creating a human simulation model for a user, wherein the human simulation model is trained and updated by the interactions between the robotics system and the user.

20. The computer-implemented method of claim 11, wherein the module hosting skills are knowledge is updated based on the implemented effect.

21. One or more non-transitory computer-readable storage media coupled to one or more processors and having instructions stored thereon which, when executed by the one or more processors, cause the one or more processors to perform operations comprising:
providing, through an interface of a robotics system, a simulation of a robotics system defined by a Ubiquitous Simulation Model (USM) and depicted within a simulated environment;
receiving a command by the robotics system through the interface;
selecting a module hosting skills and knowledge for performing the command based on the USM and the simulated environment, wherein the skills and knowledge comprises a simulation capability corresponding to the command and/or a conceptual mapping capability support dialogue and understanding of interaction with a human;
processing the command with the module and the USM to determine an effect of the command, wherein the effect is determined based on a combined mode of conduct and self-presentation modeled for the robotics system, wherein the combined mode comprises modeling of views for the human and principles of integrity for the robotics system; and
implementing the effect with the robotics system.

22. The one or more non-transitory computer-readable media of claim 21, wherein the simulation of the robotics system describes physical components and a structured assembly of the robotics system and calculates interactions among the physical components and the structured assembly of the robotics system.

23. The one or more non-transitory computer-readable media of claim 22, wherein the operations comprise:
receiving descriptions of capabilities of the robot system and an external environment where the robotics system is functioning; and
updating the USM based on the descriptions of the capabilities and the external environment when at least one prediction dynamically generated by the USM is inaccurate.

24. The one or more non-transitory computer-readable media of claim 23, wherein the simulation of the robotics system highlights discrepancies between aspects of the external environment and the simulated environment.

25. The one or more non-transitory computer-readable media of claim 24, wherein the operations further comprise determining a cause discrepancies between aspects of the external environment and the simulated environment.

26. The one or more non-transitory computer-readable media of claim 21, wherein the module is developed based on a model simulating joint projects and conducting the joint projects in a collaborative setting that involves roles played by humans and the robotics system.

27. The one or more non-transitory computer-readable media of claim 26, wherein the model simulating joint projects comprises delineation of emergency circumstances where ordinary roles are overridden.

28. The one or more non-transitory computer-readable media of claim 21, wherein the operations further comprise creating a human simulation model for a user, wherein the human simulation model is trained and updated by the interactions between the robotics system and the user.

29. The one or more non-transitory computer-readable media of claim 21, wherein the module hosting skills are knowledge is updated based on the implemented effect.

\* \* \* \* \*